United States Patent [19]

Raskin et al.

[11] Patent Number: 5,019,806
[45] Date of Patent: May 28, 1991

[54] METHOD AND APPARATUS FOR CONTROL OF AN ELECTRONIC DISPLAY

[75] Inventors: Jef Raskin, Cupertino; James Winter, Los Angeles, both of Calif.

[73] Assignee: Information Appliance, Inc., Palo Alto, Calif.

[21] Appl. No.: 338,413

[22] Filed: Apr. 11, 1989

Related U.S. Application Data

[63] Continuation of Ser. No. 30,277, Mar. 23, 1987, abandoned, which is a continuation of Ser. No. 605,448, Apr. 30, 1984, abandoned.

[51] Int. Cl.⁵ .............................................. G09G 5/00
[52] U.S. Cl. .................................. 340/706; 340/709; 340/711; 341/22
[58] Field of Search ............... 340/706, 709, 710, 711, 340/721, 723, 734; 382/34, 40; 364/523, 900; 400/61, 63; 341/22

[56] References Cited

U.S. PATENT DOCUMENTS

| | | | |
|---|---|---|---|
| 3,755,784 | 8/1973 | Greck, Jr. et al. | 364/900 |
| 4,094,001 | 6/1978 | Miller | 364/900 |
| 4,190,835 | 2/1980 | Buynak | 340/709 X |
| 4,228,430 | 10/1980 | Iwamura et al. | 340/709 |
| 4,330,845 | 5/1982 | Damerau | 382/34 |
| 4,354,185 | 10/1982 | Worborschil | 340/709 |
| 4,370,645 | 1/1983 | Cason et al. | 340/709 |
| 4,433,392 | 2/1984 | Beaven | 382/40 |
| 4,454,507 | 6/1984 | Srinivasan et al. | 340/709 X |
| 4,481,603 | 11/1984 | McCaskill et al. | 340/721 X |
| 4,500,876 | 2/1985 | English et al. | 340/709 |
| 4,503,427 | 3/1985 | Iida | 340/709 X |
| 4,507,753 | 3/1985 | McCaskill et al. | 340/709 X |
| 4,539,563 | 9/1985 | Sako et al. | 340/709 X |
| 4,542,376 | 9/1985 | Bass et al. | 340/721 X |
| 4,556,951 | 12/1985 | Dickman et al. | 382/40 |

OTHER PUBLICATIONS

Larry Tesler, "The Smalltalk Environment", BYTE Publications, Aug. 1981, pp. 90–147.
Stuart K. Card and Thomas P. Moran, "The Keystroke-Level Model for User Performance Time with Interactive Systems", Graphics and Image Processing, Jul. 1980, pp. 396–410.
Donald A. Norman, "Design Rules Based on Analyses of Human Error", Communications of the ACM, Apr. 1983, pp. 254–258.

*Primary Examiner*—Alvin E. Oberley
*Assistant Examiner*—Richard Hjerpe
*Attorney, Agent, or Firm*—Townsend and Townsend

[57] ABSTRACT

A method and apparatus are disclosed for controlling an electronic display using a keyboard to allow designation of desired regions on the display or in the memory of the system. A method of designating desired regions on the display under control of a keyboard which has at least one designation key includes the steps of positioning a cursor at a first location in fixed relationship to the desired region, activating a first designation key, and supplying through the keyboard signals to indicate a second location in fixed relationship to the selected region to cause a portion of the selected region between the first location and the desired location to be designated. The apparatus for designating a region on a display includes a processing unit coupled to the display, a keyboard connected to the processing unit to control the display, and first and second designation keys coupled to the processing unit for causing the processing unit to search the display for a pattern entered into the keyboard while at least one of the first or second keys is activated.

11 Claims, 3 Drawing Sheets

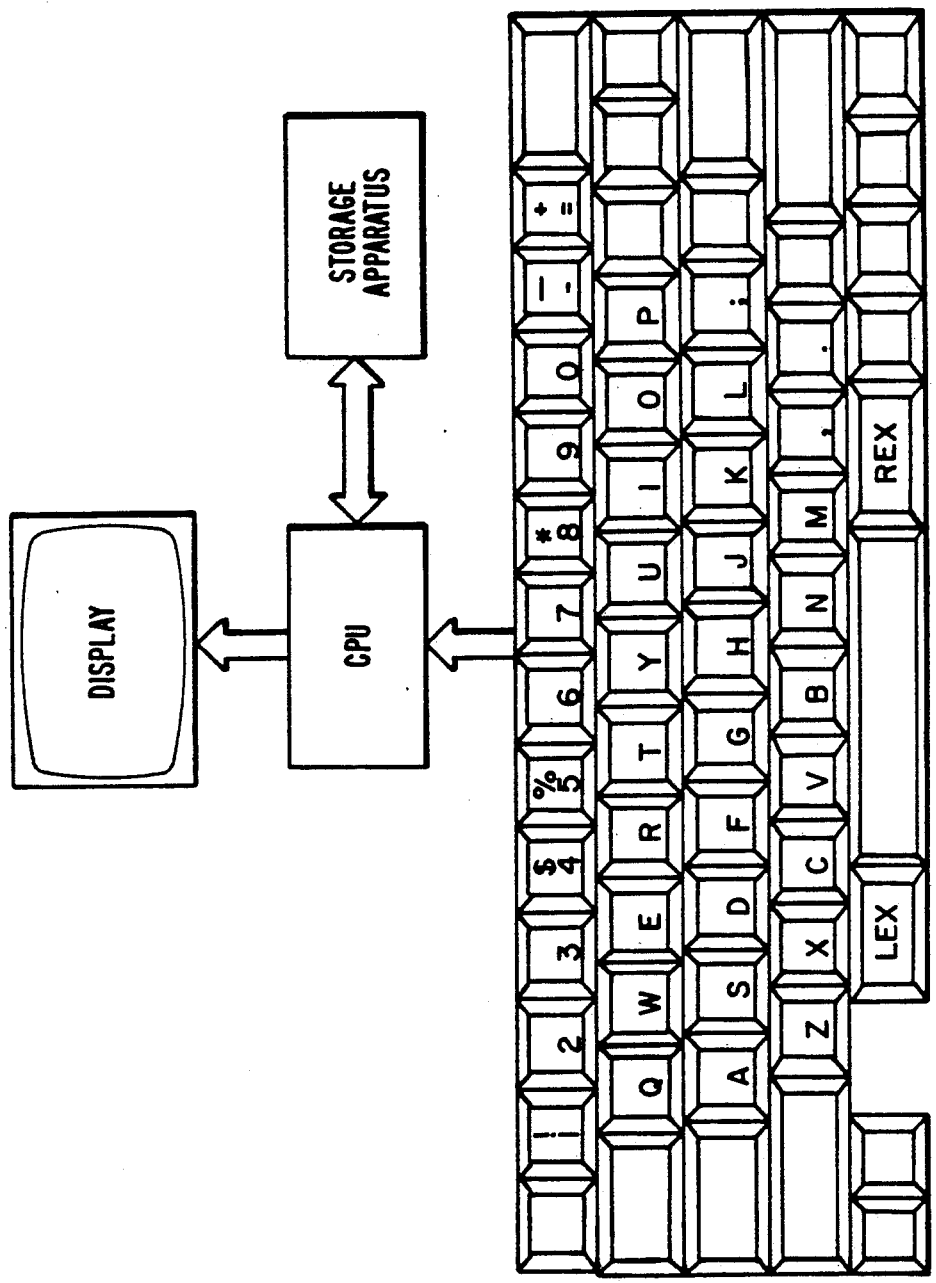
FIG._1.

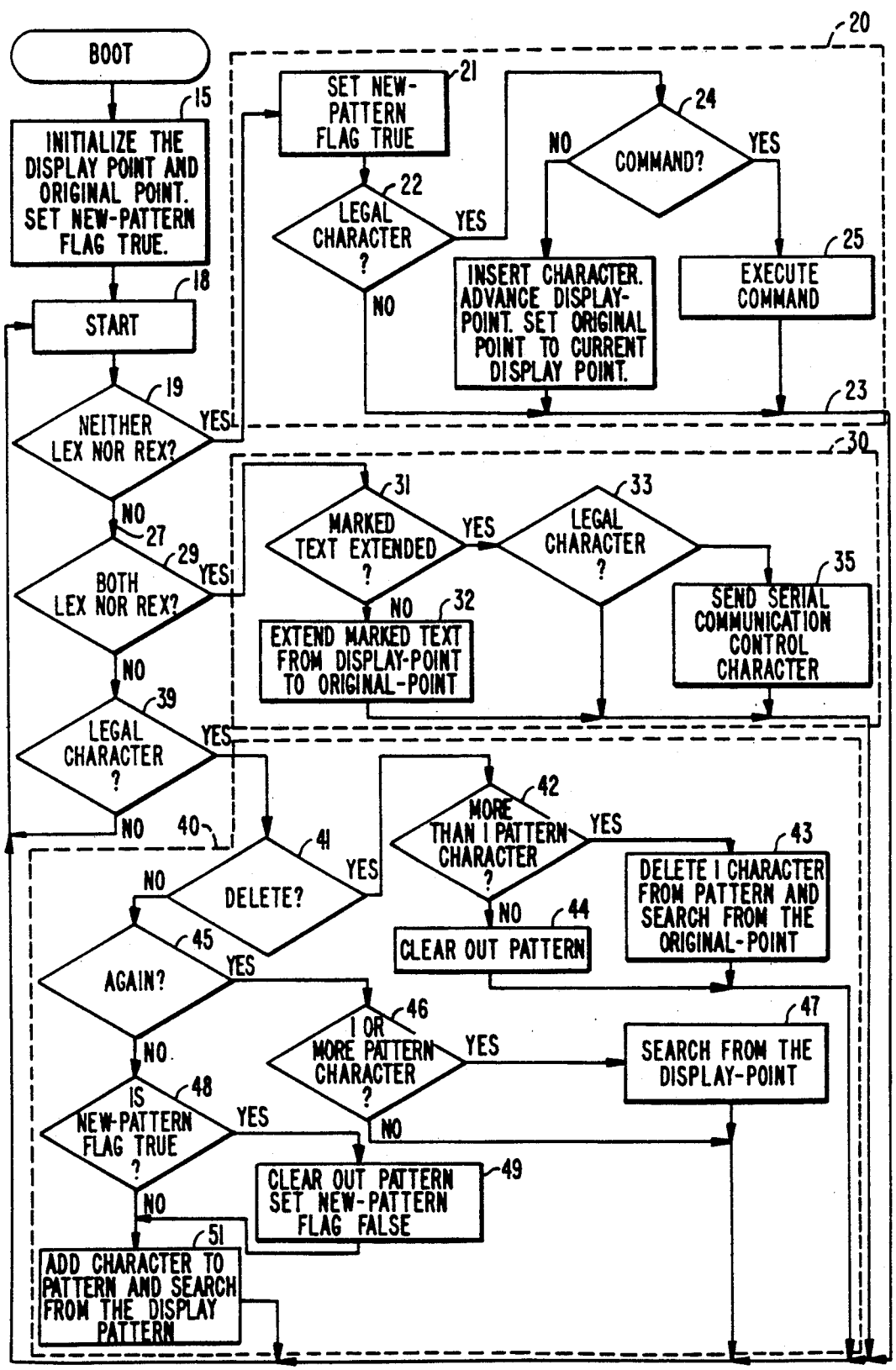
FIG._2.

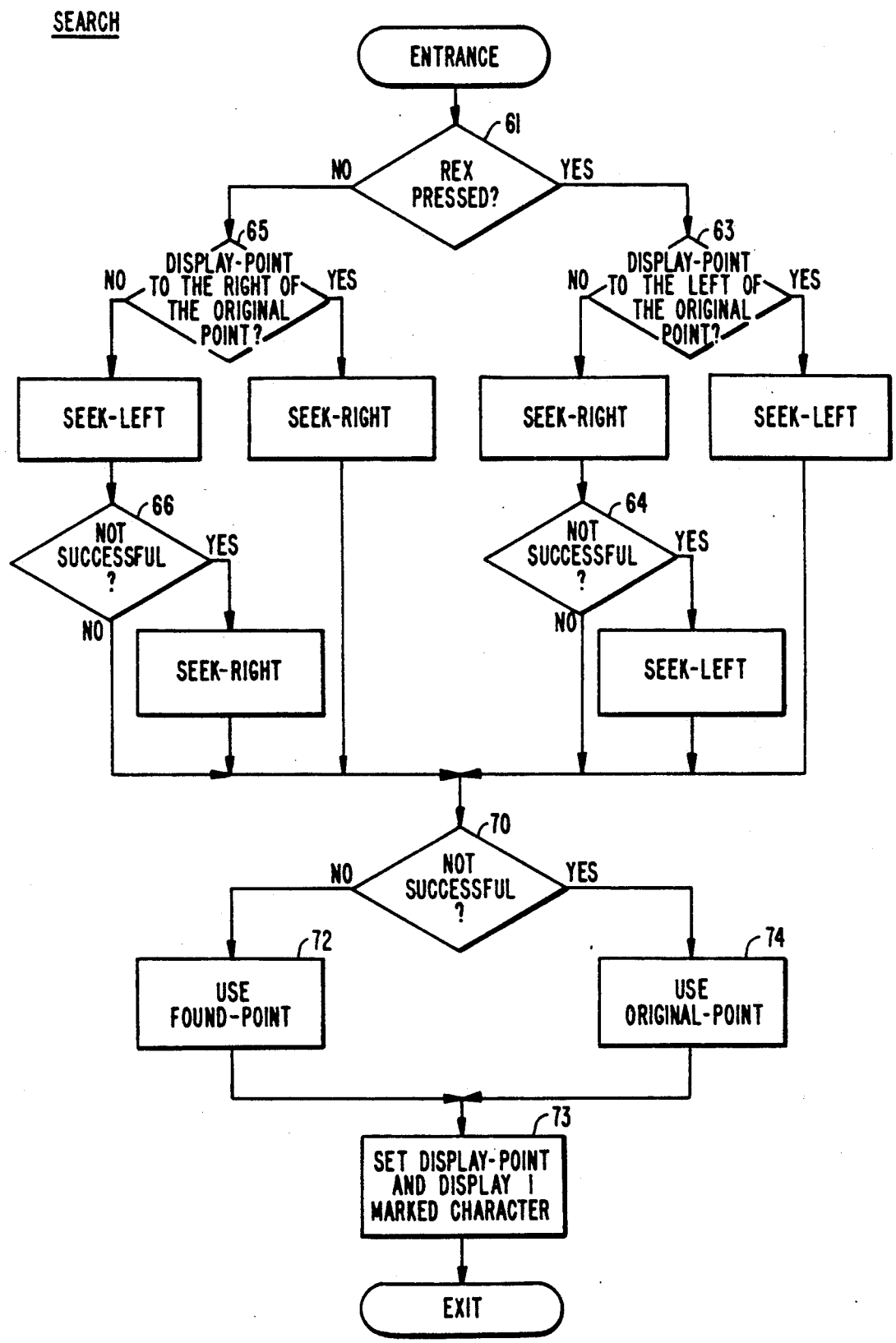
FIG._3.

METHOD AND APPARATUS FOR CONTROL OF AN ELECTRONIC DISPLAY

This is a continuation of Ser. No. 07/030,277, filed Mar. 23, 1987, now abandoned, which is a continuation of Ser. No. 06/605,488, filed Apr. 30, 1984 now abandoned.

BACKGROUND OF THE INVENTION

1. Field of the Invention

This invention relates generally to computer controlled displays, and in particular to a method and apparatus for designating a region on a display or stored in a memory which is under control of a keyboard, for example, during manipulation of information being displayed on such a display.

2. Description of the Prior Art

As the price for computer hardware continues to decline, the number and extent of applications for computers both in the home and in the workplace have increased enormously. In many such applications, notably the processing of textual material using so-called "word processing" techniques, the user of a computer system is called upon to designate locations or regions of the material displayed on a screen or stored in the memory of the system. For example, the user may wish to locate and display a particular sentence in a document stored in the computer system, when only a small portion of the document can be displayed on a CRT monitor coupled to the system at any one time. After locating or designating such locations or regions, the user of the system may enter additional information into the computer using a keyboard or other well known input device to modify the material displayed. For example, the user of the system may designate a location in text displayed on or off the screen, at which location additional text is to be inserted. Alternatively, a user may designate a portion of the text to be deleted or moved to another location.

Many mechanisms have been developed to allow a user of a computer system to designate such locations or regions. Conventionally available systems include joy sticks, cursor control keys, special function keys, and pointing devices such as "mice."

Cursor control keys, also known as "step" keys, are conventionally divided in sets of four or more on a keyboard, with the up/down keys used to move the cursor from one line to the next, and the right/left keys used to move the cursor along a given line. Cursor control keys, however, are among the slowest of all pointing mechanisms, primarily due to the large number of keystrokes required to move the cursor across large regions of the screen. For example, to position the cursor at a location 40 characters to the right on a given line requires either 40 keystrokes, or holding the key down for 40 cycles. Because this process is tedious, computer system hardware and software designers have provided alternative cursor control keys which move the cursor a word, a sentence, or a paragraph at a time. Unfortunately, each such alternative requires a separate key, or a separate set of keystrokes, resulting in a difficult to remember set of commands. Furthermore, for many operations the user must first mentally plan a path from the present to the desired cursor position. Such planning requires time and effort, frequently resulting in the user of such a system relying only upon the repeated actuation of the principle cursor control keys.

Another commonly used technique for designating locations or regions of text on a screen is by the use of graphic pointing devices, such as mice, graphics tablets, joy sticks, trackballs, touch pannels, touchsensitive screens, light pens, and the like. Graphic pointing devices, however, cannot point to regions not shown on the display. In addition to the added desk space required, the expense of these devices adds to the cost of the product with which they are used. Such devices are generally slow because of the time required for the operator to remove his or her hands from the keyboard, grasp or pick up the device, use the device, release it and then return to the keyboard in the correct position. Graphic pointing devices also require the user to maintain both the present and desired cursor positions in view and shift attention from one to the other.

Yet another technique for enabling a user to position a cursor to a desired location on a screen is the use of "find" commands. In conventional text processing equipment, a find command requires the user to enter a mode where keystrokes are interpreted as a pattern to be found, rather than as additional text or system commands. To use a find command the operator activates a switch where subsequent keystrokes are interpreted as the pattern to be found, enters the desired keystrokes, and then terminates the pattern using a delimiter which signals the end of the pattern and starts the search. Other systems require the user to end the pattern with a first signal, and then start the search with a second signal.

Find commands, however, have two major disadvantages. First, because the find command creates a separate mode of operation of the same keys, human errors and user irritation are prone to occur because the same keystrokes do not always represent the same activity. The user of such a system must always be aware of which mode it is in. The second major problem with find commands is the necessity of delimiting the pattern. The delimiter, of course, cannot be used in the pattern, meaning that any character chosen as the delimiter either must be excluded from the text or cannot be found by the find mechanism. Additionally, most implementations of the find command require that a portion of the display screen be reserved for displaying the pattern as it is entered. This reserved space consumes valuable display area, particularly on portable computers using smaller display areas. Additionally, with most implementations of find commands, the user cannot find a pattern prior to the current cursor position without either reversing the direction of the find command, using a separate command or yet another mode, or first moving the cursor to the beginning of the text or some other point ahead of the material to be searched.

SUMMARY OF THE INVENTION

The method and apparatus of this invention provide a technique for rapidly and accurately initiating a search of text or other information stored in computer storage apparatus or displayed on a screen without using cursor control keys, graphic pointing devices, or modal systems such as the find command. As a result the system of this invention is simpler and faster to use, and may be used with substantially fewer errors than prior art systems. At its simplest level the system allows the designation of a particular character on a display or in a real or virtual memory, even in the presence of other instances of that same character without removing the operator's hands from the keyboard or switching to a different mode.

In one embodiment a method of designating a desired region in a computer storage apparatus under control of a keyboard or other input means, having at least one designation means, includes the steps of positioning a cursor at a first location in fixed relationship to the desired region, activating a first designation key, and supplying through the keyboard signals to indicate a second location in fixed relationship to the desired region to thereby cause that portion of the desired region between the first location and the second location to be designated. In the preferred embodiment after the region is designated the first designation key is released or deactivated to return the keyboard to normal operation. In the preferred embodiment, the step of positioning the cursor at a first location consists of the steps of activating a second designation key and supplying through the keyboard signals to indicate the first location. Usually the steps of supplying through the keyboard signals to indicate a location consists of striking keys corresponding to the display or the contents of the memory at the desired location.

In one embodiment a method of designating a particular character on a display under control of a keyboard and a designation key not necessarily on the keyboard comprises activating the designation key and while the designation key is activated supplying through the keyboard signals consisting of the particular character, and if necessary other characters to provide a context to distinguish the particular character from other instances of the same character, whereupon an indication is given that the particular character has been designated.

In a preferred embodiment apparatus for designating a region on a display comprises a processing unit coupled to the display; a keyboard connected to the processing unit; and first and second switchable designation means coupled to the processing unit for causing the processing unit to search the display for a pattern entered into the keyboard while at least one of the first and second switchable designation means is activated, wherein the first designation means causes the processing unit to search for the pattern in a first direction from a selected location on the screen, and the second designation means causes the processing unit to search in an opposite direction. The first and second designation means usually are keys on the keyboard.

BRIEF DESCRIPTION OF THE DRAWINGS

FIG. 1 is a block diagram illustrating the apparatus of the preferred embodiment.

FIG. 2 is a flow-chart illustrating the method of the preferred embodiment.

FIG. 3 is a flow-chart illustrating in detail a step in the flow-chart of FIG. 2.

DETAILED DESCRIPTION OF THE PREFERRED EMBODIMENT

FIG. 1 is a block diagram of a system, including a keyboard illustrating one embodiment for the apparatus of this invention. The keyboard depicted is a standard keyboard with the exception of a "rex" and "lex" keys provided at opposite ends of the shortened space bar key. The "lex" and "rex" keys are electrically connected to the computer in such a way that the two states in which either may be at any instant of time—up or down—may be detected independently of the state or states of any other key or keys on the keyboard. The lex and rex keys are additional keyboard keys constructed in the same manner as the keys in a conventional keyboard, that is, as momentary contact push buttons labeled to reflect their function.

In the preferred embodiment activation (depression) of the lex key causes the computer system to search to the left of the present cursor location for whatever pattern is entered into the keyboard while the lex key is held depressed. Thus, to search for the first occurrence of the pattern "Je" to the left of the present cursor position, the user will depress the lex key, and enter a capital J. In the manner explained in detail below, the computer system will search its memory, including the portion of the text displayed, for the first occurrence of "J" to the left of the present cursor position. When found, that portion of text will be displayed with the cursor positioned at the newly found "J". As soon as the user enters "e" the system will search for the first occurrence of the pattern "Je" to the left of or at the present cursor position (now "J"). If the operator of the system desires to search for "Jef", the lex key will be held in an activated position and an "f" typed to continue the search. At the conclusion of the search the cursor will be positioned in a fixed relation to the first occurrence to the left of the previous cursor position at which the pattern "Jef" occurs. The user of the system may now proceed to edit the text at this location, for example, by inserting, deleting, or changing the display using other keys.

Next, assume that rather than designate only the first occurrence of the above pa&tern, the user of the system desires to designate the remainder of the sentence in which "Jef" occurs. This may be accomplished by depression of the rex key and entry through the keyboard of a ".". In the preferred embodiment this will cause the system to designate the entire segment of text beginning with "Jef" and ending with ".". In this manner desired segments or regions of textual or other material may be rapidly and accurately designated and displayed on the screen, without the disadvantages of the prior art systems described above. Once designated, well known additional manipulation may be performed on the specified regions, for example, deleting the designated material, movement of the designated material to other locations in the text, etc.

Although the rex and lex functions are depicted in FIG. 1 as being accomplished by extra keys on a keyboard, other well-known implementations may be readily employed to accomplish the same functions. For example, foot pedals or other switches may be used. All such alternative input devices are termed designation means herein.

In operation when either the lex or rex key is depressed, no immediate change occurs on the screen. When the first character of the pattern is typed, however, an internal pointer, which may be represented by a cursor, or other indicator on the screen, begins moving to the left or right, depending on whether the lex or rex key was depressed. Under control of the computing system, each character encountered as the cursor travels is inspected to determine whether it corresponds to the character entered into the keyboard. Because (in a conventional computing system) of the rapidity with which each character may be compared to the desired one, the inspection takes place too quickly to be observed. To the operator of the system the effect is as if the cursor suddenly moved to the position where the pattern was found. If the user continues to hold the lex or rex key depressed and types further characters, each character is added to the pattern, and as each is added the search proceeds for the entire pattern entered to that moment.

Although throughout this application reference is made to material being displayed on a screen, it should be understood that the extent to which the material is displayed on the screen is arbitrary, and not related to the invention. For example, in a typical word processing environment, the amount of text displayed on the screen at any given instant primarily will be determined by the size and type of display, and the software operating on the host computer. In application of this invention to such a system, the search performed by the processing unit will proceed through all (or a desired portion) of the text in the desired document, whether or not all such text is actually "displayed" on the screen at the instant the search begins.

In some embodiments of the invention to avoid having to know in advance where in the text the desired pattern occurs with respect to the present position of the cursor on the screen, the entire text may be treated as though the first character were concatenated to the last character. Thus, when the lex key is depressed the search will proceed to the left (or forward of the cursor position) and continue to the beginning of the text, and then pick up at the end of the text and continue back to the former cursor location until the desired pattern is found or not found.

In other embodiments of the invention to avoid having to know in advance where in the text the desired pattern occurs with respect to the present position of the cursor on the screen, the search may proceed in the direction indicated by the choice of either the lex key or the rex key, however if the search fails in the indicated direction, the search then automatically proceeds from the cursor location in the other direction. Thus, when the rex key is used to initiate a search to the right from the present cursor location and the pattern is not discovered between the present cursor location and the last character of the text, the search then automatically resumes from the left of the present cursor position up to and including the first character of the text if necessary.

FIG. 2 is a flow-chart illustrating a preferred embodiment of the method of this invention. As shown in FIG. 2 the method begins with "booting" the system and initializing it. If no textual matter is loaded into the system at this time, the display point, (the point displayed on the screen), and the original point (the last stored point to which the lex or rex keys caused the system to locate) are the same point and at the upper left hand corner of the display screen. During the initialization a flag referred to as the "newpattern" flag is set as true. See block 15 in FIG. 2. The new pattern flag is an indicator used to determine whether or not to erase a pattern to be searched for. Setting the new pattern flag causes the system to ignore any existing pattern, in effect indicating that any characters subsequently entered are the beginning of a new pattern.

If a program has been entered at the time the system is booted, then the original point, display point, and new pattern flag are set in accord with the instructions from the stored program. (The reference numerals associated with the locations in the flow-chart are not indicative of the order in which the steps on the flowchart are performed, but simply used for the convenience of explanation.)

The system is then placed at block 18 designated Begin. Under control of the host program, and using well-known apparatus, the condition of the keyboard is monitored with a desired frequency. Assuming that neither the lex nor rex keys are depressed, operation of the system proceeds as shown generally within block 20. Operation of the system in this manner is essentially the same as a conventional keyboard and display. The new pattern fag is set true at block 21 and then a test is made at block 22 to determine whether a legal character, that is, an ASCII character meaningful to the logic, has been entered through the keyboard. If not, as shown by path 23, the system returns to block 18. If a legal character has been entered through the keyboard, a test is made at block 24 to determine whether the character was a command. If the character is not a command it is inserted into the display, the display point is advanced, and the original point is set to the current display point. Operation of the system then proceeds along path 23 to return to bock 18, and the cycle repeated. If a command has been entered at block 24 the system then executes the command (block 25), and returns via path 23 to block 18.

If at block 19 either the lex or rex keys have been depressed, operation of the system proceeds along path 27 to decision block 29. As shown, at block 29 a test is performed to determine whether both the lex and rex keys have been depressed. If so, operation of the system proceeds into block 30. In this portion of system operation a test 31 is performed to determine whether "marked" text has been extended between the characters designated by both the lex and rex keys. Marked text is text made obvious by reverse video, blinking, brightness, color, or other well-known techniques. Of course, on the first pass through this loop there will not be any "marked" text unless the system has been operating in block 40, so the test will fail transferring the system to block 32. As shown by block 32 all text between the display point and the original point is then marked and system operation returns to block 18. If at block 31 text has already been marked, system operation passes to a determination of whether a legal character 33 has been entered. If so, the character is interpreted as a serial communication control character according to block 35. If not, system operation returns to bock 18.

If the decision at block 29 is false, that is, not both the lex and rex keys have been activated, then system operation proceeds to block 39 to determine whether or not a legal character has been entered. If a legal character has not been entered from the keyboard, for example, by keys on the keyboard simply not having been depressed during that cycle of operation, then system operation returns to block 18.

If a legal character has been entered a test is first made at block 41 to determine whether the character entered was the delete key. If the delete key is activated, a test is made at block 42 to determine whether the pattern typed while the lex or rex key was held includes more than one character. If it does, then as shown by block 43, one character is deleted from the pattern and a search is performed from the original point to locate other instances of the same pattern. The manner in which the search is performed at block 43 is discussed in further detail in conjunction with FIG. 3. System operation then returns to block 18. If at block 42 only a single character is found in the pattern, then as indicated by block 44 the entire pattern is deleted, and system operation returns to block 18.

If the delete key was not depressed at block 41, then system operation proceeds to block 45 to determine whether a key has been activated to indicate that the search should be repeated. (As explained below if a search has not been performed then the again key is effectively ignored.) If the again key is activated then a test is made at block 46 to determine whether one or more characters are in the pattern. If one or more characters are not in the pattern, then system operation returns to block 18. If one or more characters are found to be in the pattern, then a search is made as shown by block 47 from the display point for the pattern, and system operation returns to block 18. If the again key is not active, then at block 48 the system determines whether the new pattern fag has been set. If it has been set, the pattern is cleared and the flag reset as shown by block 49. If the new pattern flag is not set, the legal character entered at block 39 is added to the pattern and a search is made from the display point for the entire pattern.

The method by which the search referred to in blocks 43, 47, and 51 is conducted is shown in further detail in FIG. 3. As shown there, once the search is initiated a decision is made at block 61 as to whether the rex key is active. If so, the system passes to block 63 and a test is made to determine whether the display point is to the left of the original point. If that condition is true, then a search is conducted to the left. If that condition is found false, the search is conducted to the right. If the search to the right is unsuccessful, then as shown by block 64 a search is made to the left. At the end of searching in one or both directions, system operation passes to block 70.

If at block 61 the rex key is not depressed, and the display point is to the right of the original point after the test in block 65, a search is made to the right. If the display point is not to the right of the original point then a search is made to the left as shown by block 66. If this search is not successful, the search is made to the right as shown at blocks 66 and 67.

Whatever the outcome of the searches performed in the upper portion of FIG. 3, a new test is made at block 70 to determine whether the search is successful. If the search was successful then the found point 72 is used as the present display point (cursor location) 73. If the search was not successful, then the original point 74 is used as the display point 73.

In some embodiments of the invention the effect of activating the rex and lex keys will not be symmetrical. In one such embodiment the lex key will be used to skip to the designated pattern from the present cursor position in the manner explained above. Thus, entry of a pattern will not cause the entire region of text between the present cursor position and the entered pattern to be selected, but will rather cause selection of only the pattern or a portion of the pattern such as the first character. That is, no text will be selected but the cursor will be relocated in fixed relationship to the text matching the pattern, for example, immediately to the left or right of the text matching the pattern. In contrast, use of the rex key in such embodiments will cause the entire portion of the text between the present location of the cursor and the designated pattern to be selected. Using the lex and rex keys in this manner, if an entire sentence is to be selected, the lex key will be depressed and a pattern corresponding to the pattern at the beginning of the desired sentence entered. The lex key is then released and the rex key depressed. A pattern corresponding to the end of the sentence, for example, a "." is entered. This will cause the text selected to be the entire text material between the pattern entered with the lex key and the pattern entered with the rex key to be chosen. In such embodiments, the selected text usually will be presented in highlighted fashion, for example by underlining, reverse video, blinking, or other well known display techniques.

The method and apparatus of this invention have numerous applications beyond the editing of text in the manner described above. For example, the search techniques of the invention may be utilized with read only text such as published material, telephone directories, optical discs, etc. to quickly locate and view desired portions of such text. In such applications, as well as in the editing text, the particular direction which the search takes may be varied to suit the particular application. For example, if all searches are to proceed in a single direction, the provision of only a single rex or lex key will be necessary. In other applications it may be desirable to have the search proceed in alternating directions beginning with the direction in which the desired pattern is closest to the present cursor location.

In some embodiments of the invention both the lex key and the rex key may be simultaneously activated to cause the search to proceed in both directions simultaneously. Such embodiments are particularly useful for enabling selection of a single word by entering a blank while both keys are depressed, or selection of a sentence, by entry of a "." while both keys are depressed.

In the preferred embodiment the method of this invention is carried out by an Apple IIe computer operating under control of the program attached as an Appendix to this application.

The foregoing explanation of the preferred embodiments of the invention are intended to illustrate the invention, rather than limit it. The scope of the invention may be ascertained from the appended claims.

APPENDIX

| Address | Hexadecimal | ASCII |
|---|---|---|
| 0800 | EA 4C 41 1A EA 4C 55 1A 00 00 01 00 C9 61 08 00 | .LA..LU......a.. |
| 0810 | 50 02 FF 00 FF 01 00 01 1F 00 01 00 DC 61 DC 61 | P............a.a |
| 0820 | 0A 31 00 B8 08 00 83 4C 49 D4 00 00 2E 08 B1 18 | .1.....LI...... |
| 0830 | 48 E6 18 D0 02 E6 19 B1 18 E6 18 D0 02 E6 19 CA | H............... |
| 0840 | CA 95 01 68 95 00 A0 01 B1 18 85 0B 88 B1 18 85 | ...h............ |
| 0850 | 0A 18 A5 18 69 02 85 18 90 02 E6 19 4C 09 00 84 | ....i.......L... |
| 0860 | 43 4C 49 D4 26 08 68 08 B1 18 48 98 4C 39 08 0A | CLI.&.h...H.L9.. |
| 0870 | 85 0F B5 00 99 10 00 E8 C8 C4 0F D0 F5 A0 00 60 | ................ |
| 0880 | 87 45 58 45 43 55 54 C5 5F 08 8C 08 B5 00 85 0A | .EXECUT._....... |
| 0890 | B5 01 85 0B E8 E8 4C 09 00 85 52 44 52 4F D0 80 | ......L...RDRO.. |
| 08A0 | 08 A3 08 68 68 4C 46 08 86 42 52 41 4E 43 C8 99 | ...hhLF..BRANC.. |
| 08B0 | 08 B3 08 18 B1 18 65 18 48 C8 B1 18 65 19 85 19 | ......e.H...e... |
| 08C0 | 68 85 18 4C 48 08 87 30 42 52 41 4E 43 C8 A8 08 | h..LH..0BRANC... |
| 08D0 | D2 08 E8 E8 B5 FE 15 FF F0 D9 18 A5 18 69 02 85 | .............i.. |
| 08E0 | 18 90 02 E6 19 4C 46 08 86 28 4C 4F 4F 50 A9 C6 | .....LF..(LOOP.. |
| 08F0 | 08 F3 08 86 0E BA FE 01 01 D0 03 FE 02 01 18 BD | ................ |
| 0900 | 03 01 FD 01 01 BD 04 01 FD 02 01 A6 0E 0A 90 A3 | ................ |
| 0910 | 68 68 68 68 4C DA 08 87 28 2B 4C 4F 4F 50 A9 E8 | hhhhL...(+LOOP.. |
| 0920 | 08 23 09 E8 E8 86 0E B5 FF 48 48 B5 FE BA E8 E8 | .#.......HH..... |
| 0930 | 18 7D 01 01 9D 01 01 68 7D 02 01 9D 02 01 68 10 | .}.....h}.....h. |
| 0940 | BD 18 BD 01 01 FD 03 01 BD 02 01 FD 04 01 4C 0B | ..............L. |
| 0950 | 09 84 28 44 4F A9 17 09 5A 09 B5 03 48 B5 02 48 | ..(DO...Z...H..H |
| 0960 | B5 01 48 B5 00 48 E8 E8 E8 E8 4C 46 08 85 32 44 | ..H..H....LF..2D |
| 0970 | 52 4F D0 51 09 66 09 81 D2 6D 09 7D 09 86 0E BA | RO.Q.f...m.}.... |
| 0980 | BD 01 01 48 BD 02 01 A6 0E 4C 3F 08 81 C9 77 09 | ...H.....L?...w. |
| 0990 | 7D 09 85 52 50 49 43 CB 8C 09 9C 09 B5 00 0A E8 | }..RPIC......... |
| 09A0 | E8 85 10 86 0E BA 8A 18 65 10 AA 4C 80 09 81 CA | ........e..L.... |
| 09B0 | 92 09 B4 09 A9 04 D0 E9 81 CB AE 09 BE 09 A9 08 | ................ |
| 09C0 | D0 DF 85 44 49 47 49 D4 B8 09 CC 09 38 B5 02 E9 | ...DIGI.....8... |
| 09D0 | 30 30 18 C9 0A 30 07 38 E9 07 C9 0A 30 0D D5 00 | 00...0.8....0... |
| 09E0 | 10 09 95 02 A9 01 48 98 4C 41 08 98 48 E8 E8 4C | ......H.LA..H..L |
| 09F0 | 41 08 86 28 46 49 4E 44 A9 C2 09 FD 09 A9 02 20 | A..(FIND....... |
| 0A00 | 6F 08 86 0E A0 00 B1 10 51 12 29 3F D0 2D C8 B1 | o.......Q.)?.-.. |
| 0A10 | 10 51 12 0A D0 23 90 F6 A6 0E CA CA CA CA 18 98 | .Q...#.......... |
| 0A20 | 69 05 65 10 95 02 A0 00 98 65 11 95 03 94 01 B1 | i.e......e...... |
| 0A30 | 10 95 00 A9 01 48 4C 3F 08 B0 05 C8 B1 10 10 FB | .....HL?........ |
| 0A40 | C8 B1 10 AA C8 B1 10 85 11 86 10 05 10 D0 B5 A6 | ................ |
| 0A50 | 0E A9 00 48 4C 3F 08 87 45 4E 43 4C 4F 53 C5 F2 | ...HL?..ENCLOS.. |
| 0A60 | 09 63 0A A9 02 20 6F 08 8A 38 E9 08 AA 94 03 94 | .c... o..8...... |
| 0A70 | 01 B1 12 C5 10 D0 0E C8 D0 F7 E6 13 F6 05 F6 03 | ................ |
| 0A80 | F6 01 4C 71 0A 94 04 B1 12 D0 12 94 02 94 00 98 | ..Lq............ |
| 0A90 | D5 04 D0 06 F6 02 D0 02 F6 03 4C 46 08 94 02 C8 | ..........LF.... |
| 0AA0 | D0 06 E6 13 F6 03 F6 01 C5 10 D0 DB 94 00 4C 46 | ..............LF |
| 0AB0 | 08 86 2D 43 4D 4F 56 C5 57 0A BC 0A A9 03 20 6F | ..-CMOV.W..... o |
| 0AC0 | 08 98 18 E5 10 85 10 C6 13 C6 15 88 C4 10 D0 07 | ................ |
| 0AD0 | C6 11 10 03 4C 46 08 B1 14 91 12 C0 00 D0 EC F0 | ....LF.......... |
| 0AE0 | E6 85 43 4D 4F 56 C5 B1 0A EB 0A A9 03 20 6F 08 | ..CMOV....... o. |
| 0AF0 | B1 14 C4 10 D0 07 C6 11 10 03 4C 46 08 91 12 C8 | ..........LF.... |

| Address | Hexadecimal | ASCII |
|---|---|---|
| 0B00 | D0 EE E6 15 E6 13 4C F0 0A 84 46 49 4C CC E1 0A | ......L...FIL... |
| 0B10 | 12 0B B5 00 48 E8 E8 A9 02 20 6F 08 38 A5 12 E9 | ....H.... o.8... |
| 0B20 | 01 85 14 A5 13 E9 00 85 15 68 4C F2 0A 90 0B 18 | .........hL..... |
| 0B30 | 65 10 A8 A5 11 65 15 85 15 98 66 15 6A 66 13 66 | e....e....f.jf.f |
| 0B40 | 12 CA D0 E9 A6 0E 60 86 0E 84 15 B5 01 D0 1D B5 | ......`......... |
| 0B50 | 03 85 11 B5 02 85 10 B5 00 85 12 98 A2 09 20 3D | .............. = |
| 0B60 | 0B 95 03 A5 15 95 00 A5 13 95 02 60 94 01 85 11 | ...........`.... |
| 0B70 | B5 00 85 10 B5 02 85 12 B5 03 F0 E0 85 13 98 A2 | ................ |
| 0B80 | 17 20 3D 0B 95 00 A5 15 95 01 A5 12 95 02 A5 13 | . =............. |
| 0B90 | 95 03 60 82 55 AA 09 0B 9A 0B 20 47 0B 4C 46 08 | ..`.U..... G.LF. |
| 0BA0 | 81 AA 93 0B A6 0B 20 47 0B E8 E8 4C 46 08 82 55 | ...... G...LF..U |
| 0BB0 | AF A0 0B B5 0B B5 04 B4 02 94 04 0A 95 02 B5 05 | ................ |
| 0BC0 | B4 03 94 05 2A 95 03 A9 10 85 10 36 04 36 05 08 | ....*......6.6.. |
| 0BD0 | 38 B5 04 F5 00 A8 B5 05 F5 01 90 09 94 04 95 05 | 8............... |
| 0BE0 | 28 38 4C EC 0B 28 90 04 94 04 95 05 36 02 36 03 | (8L..(......6.6. |
| 0BF0 | C6 10 D0 D7 4C 68 09 83 41 4E C4 AE 0B FF 0B B5 | ....Lh..AN...... |
| 0C00 | 00 35 02 48 B5 01 35 03 E8 E8 4C 41 08 82 4F D2 | .5.H..5...LA..O. |
| 0C10 | F7 0B 14 0C B5 00 15 02 48 B5 01 15 03 E8 E8 4C | ........H......L |
| 0C20 | 41 08 83 58 4F D2 0D 0C 2A 0C B5 00 55 02 48 B5 | A..XO...*...U.H. |
| 0C30 | 01 55 03 E8 E8 4C 41 08 83 53 50 C0 22 0C 40 0C | .U...LA..SP.".@. |
| 0C40 | 8A 48 A9 00 4C 3F 08 81 B0 38 0C 4D 0C A9 00 F0 | .H..L?...8.M.... |
| 0C50 | F0 81 B1 47 0C 57 0C A9 01 D0 E6 83 53 50 A1 51 | ...G.W......SP.Q |
| 0C60 | 0C 63 0C A0 06 B1 0C AA 4C 46 08 83 52 50 A1 5B | .c......LF..RP.[ |
| 0C70 | 0C 73 0C 86 0E A0 08 B1 0C AA 9A A6 0E 4C 46 08 | .s...........LF. |
| 0C80 | 82 3B D3 6B 0C 87 0C 68 85 18 68 85 19 4C 46 08 | .;.k...h..h..LF. |
| 0C90 | 82 2F C3 80 0C 97 0C B5 01 94 01 4C 41 0C 85 4C | ./.........LA..L |
| 0CA0 | 45 41 56 C5 90 0C A8 0C 86 0E BA BD 01 01 9D 03 | EAV............. |
| 0CB0 | 01 BD 02 01 9D 04 01 A6 0E 4C 46 08 82 3E D2 9E | .........LF..).. |
| 0CC0 | 0C C3 0C B5 01 48 B5 00 48 E8 E8 4C 46 08 82 52 | .....H.H..LF..R |
| 0CD0 | BE BC 0C D5 0C CA CA 68 95 00 68 95 01 4C 46 08 | .......h..h..LF. |
| 0CE0 | 82 30 BD CE 0C E7 0C B5 00 15 01 94 01 D0 01 C8 | .0.............. |
| 0CF0 | 94 00 4C 46 08 83 4E 4F D4 E0 0C E7 0C 82 30 BC | ..LF..NO......0. |
| 0D00 | F5 0C 04 0D 16 01 98 2A 94 01 95 00 4C 46 08 82 | .......*....LF.. |
| 0D10 | 31 AB FD 0C 16 0D F6 00 D0 02 F6 01 4C 46 08 82 | 1...........LF.. |
| 0D20 | 32 AB 0F 0D 26 0D 18 B5 00 69 02 95 00 B0 EB 4C | 2...&....i.....L |
| 0D30 | 46 08 82 31 AD 1F 0D 39 0D 38 A9 FE 75 00 95 00 | F..1...9.8..u... |
| 0D40 | B0 02 D6 01 4C 46 08 82 32 AD 32 0D 4E 0D 18 90 | ....LF..2.2.N... |
| 0D50 | E9 82 32 AA 47 0D 58 0D 16 00 36 01 4C 46 08 82 | ..2.G.X...6.LF.. |
| 0D60 | 32 AF 51 0D 66 0D 56 01 76 00 4C 46 08 81 AB 5F | 2.Q.f.V.v.LF..._ |
| 0D70 | 0D 73 0D 18 B5 00 75 02 95 02 B5 01 75 03 95 03 | .s....u.....u... |
| 0D80 | E8 E8 4C 46 08 81 AD 6D 0D 8B 0D 38 B5 02 F5 00 | ..LF...m...8.... |
| 0D90 | 95 02 B5 03 F5 01 95 03 E8 E8 4C 46 08 82 44 AB | ..........LF..D. |
| 0DA0 | 85 0D A4 0D 18 B5 02 75 06 95 06 B5 03 75 07 95 | .......u.....u.. |
| 0DB0 | 07 B5 00 75 04 95 04 B5 01 75 05 95 05 4C 66 09 | ...u.....u...Lf. |
| 0DC0 | 85 4D 49 4E 55 D3 9D 0D CA 0D 38 98 F5 00 95 00 | .MINU.....8..... |
| 0DD0 | 98 F5 01 95 01 4C 46 08 86 44 4D 49 4E 55 D3 C0 | .....LF..DMINU.. |
| 0DE0 | 0D E3 0D 38 98 F5 02 95 02 98 F5 03 95 03 4C CB | ...8..........L |
| 0DF0 | 0D 84 4F 56 45 D2 D8 0D FA 0D B5 02 48 B5 03 4C | ..OVE.......H..L |

| Address | Hexadecimal | ASCII |
|---|---|---|
| 0E00 | 3F 08 83 52 4F D4 F1 0D 0A 0E B5 04 48 B4 05 B5 | ?..RO.......H... |
| 0E10 | 02 95 04 B5 03 95 05 B5 00 95 02 B5 01 95 03 98 | ................ |
| 0E20 | 4C 41 08 84 44 52 4F D0 02 0E 68 09 84 53 57 41 | LA..DRO...h..SWA |
| 0E30 | D0 23 0E 35 0E B5 00 B4 02 95 02 94 00 B5 01 B4 | .#.5............ |
| 0E40 | 03 95 03 94 01 4C 46 08 83 44 55 D0 2C 0E 50 0E | .....LF..DU.,.P. |
| 0E50 | B5 00 48 B5 01 4C 3F 08 84 2D 44 55 D0 48 0E 61 | ..H..L?..-DU.H.a |
| 0E60 | 0E B5 00 15 01 D0 E9 4C 46 08 82 2B A1 58 0E 71 | .......LF..+.X.q |
| 0E70 | 0E 18 A1 00 75 02 81 00 F6 00 D0 02 F6 01 A1 00 | ....u........... |
| 0E80 | 75 03 81 00 4C 66 09 86 54 4F 47 47 4C C5 6A 0E | u...Lf..TOGGL.j. |
| 0E90 | 92 0E A1 02 55 00 81 02 4C 66 09 81 C0 87 0E A1 | ....U...Lf...... |
| 0EA0 | 0E A1 00 48 F6 00 D0 02 F6 01 A1 00 4C 41 08 82 | ...H........LA.. |
| 0EB0 | 43 C0 9B 0E B6 0E A1 00 95 00 94 01 4C 46 08 81 | C...........LF.. |
| 0EC0 | A1 AF 0E C5 0E B5 02 81 00 F6 00 D0 02 F6 01 B5 | ................ |
| 0ED0 | 03 81 00 4C 66 09 82 43 A1 BF 0E DD 0E B5 02 81 | ...Lf..C........ |
| 0EE0 | 00 4C 66 09 C1 BA D6 0E FC 0E EF 12 AB 12 D0 10 | .Lf............. |
| 0EF0 | 9F 0E C2 10 C3 0E B0 17 70 13 BF 13 A5 19 48 A5 | ........p.....H. |
| 0F00 | 18 48 18 A5 0A 69 02 85 18 98 65 0B 85 19 4C 46 | .H...i....e...LF |
| 0F10 | 08 C1 BB E4 0E FC 0E 17 13 4C 13 85 0C 84 13 62 | .........L.....b |
| 0F20 | 13 85 0C 88 43 4F 4E 53 54 41 4E D4 11 0F FC 0E | ....CONSTAN..... |
| 0F30 | D7 13 58 11 BF 13 CA CA A0 02 B1 0A 95 00 C8 B1 | ..X............. |
| 0F40 | 0A 95 01 4C 46 08 88 56 41 52 49 41 42 4C C5 23 | ...LF..VARIABL.# |
| 0F50 | 0F FC 0E 2E 0F BF 13 CA CA 18 A5 0A 69 02 95 00 | ............i... |
| 0F60 | A5 0B 69 00 95 01 4C 46 08 84 55 53 45 D2 46 0F | ..i...LF..USE.F. |
| 0F70 | FC 0E 2E 0F BF 13 CA CA 18 A0 02 B1 0A 65 0C 95 | .............e.. |
| 0F80 | 00 C8 B1 0A 65 0D 95 01 4C 46 08 81 B2 69 0F 36 | ....e...LF...i.6 |
| 0F90 | 0F 02 00 81 B3 8B 0F 36 0F 03 00 81 B4 93 0F 36 | .......6.......6 |
| 0FA0 | 0F 04 00 82 2D B1 9B 0F 36 0F FF FF 82 42 CC A3 | ....-...6....B.. |
| 0FB0 | 0F 36 0F 20 00 83 43 2F CC AC 0F 36 0F 28 00 85 | .6. ..C/...6.(.. |
| 0FC0 | 46 49 52 53 D4 B5 0F 36 0F E0 97 85 4C 49 4D 49 | FIRS...6....LIMI |
| 0FD0 | D4 BF 0F 36 0F 00 B8 85 42 2F 42 55 C6 CB 0F 36 | ...6....B/BU...6 |
| 0FE0 | 0F 00 04 85 42 2F 53 43 D2 D7 0F 36 0F 01 00 85 | ....B/SC...6.... |
| 0FF0 | 43 2F 53 43 D2 E3 0F 36 0F C0 03 86 42 4C 4B 2F | C/SC...6....BLK/ |
| 1000 | 44 D2 EF 0F 36 0F 8C 00 87 53 45 43 2F 54 52 CB | D...6....SEC/TR. |
| 1010 | FB 0F 36 0F 10 00 87 2B 4F 52 49 47 49 CE 08 10 | ..6....+ORIGI... |
| 1020 | FC 0E 2C 08 00 08 71 0D 85 0C 82 53 B0 16 10 76 | ..,...q....S...v |
| 1030 | 0F 06 00 82 52 B0 2A 10 76 0F 08 00 83 54 49 C2 | ....R.*.v....TI. |
| 1040 | 33 10 76 0F 0A 00 85 57 49 44 54 C8 3C 10 76 0F | 3.v....WIDT.(.v. |
| 1050 | 0C 00 87 57 41 52 4E 49 4E C7 46 10 76 0F 0E 00 | ...WARNIN.F.v... |
| 1060 | 85 46 45 4E 43 C5 52 10 76 0F 10 00 82 44 D0 60 | .FENC.R.v....D.` |
| 1070 | 10 76 0F 12 00 88 56 4F 43 2D 4C 49 4E CB 6C 10 | .v....VOC-LIN.l. |
| 1080 | 76 0F 14 00 83 42 4C CB 75 10 76 0F 16 00 82 49 | v....BL.u.v....I |
| 1090 | CE 84 10 76 0F 18 00 83 4F 55 D4 8E 10 76 0F 1A | ...v....OU...v.. |
| 10A0 | 00 83 53 43 D2 97 10 76 0F 1C 00 86 4F 46 46 53 | ..SC...v....OFFS |
| 10B0 | 45 D4 A1 10 76 0F 1E 00 87 43 4F 4E 54 45 58 D4 | E...v....CONTEX. |
| 10C0 | AB 10 76 0F 20 00 87 43 55 52 52 45 4E D4 B8 10 | ..v. ..CURREN... |
| 10D0 | 76 0F 22 00 85 53 54 41 54 C5 C6 10 76 0F 24 00 | v."..STAT...v.$. |
| 10E0 | 84 42 41 53 C5 D4 10 76 0F 26 00 83 44 50 CC E0 | .BAS...v.&..DP.. |
| 10F0 | 10 76 0F 28 00 83 46 4C C4 EB 10 76 0F 2A 00 83 | .v.(..FL...v.*.. |

| Address | Hexadecimal | ASCII |
|---|---|---|
| 1100 | 43 53 D0 F5 10 76 0F 2C 00 82 52 A3 FF 10 76 0F | CS...v.,..R...v. |
| 1110 | 2E 00 83 48 4C C4 09 11 76 0F 30 00 85 45 52 52 | ...HL...v.0..ERR |
| 1120 | 49 CE 12 11 76 0F 32 00 86 45 52 52 42 4C CB 1C | I...v.2..ERRBL.. |
| 1130 | 11 76 0F 34 00 84 48 45 52 C5 28 11 FC 0E 71 10 | .v.4..HER.(...q. |
| 1140 | 9F 0E 85 0C 85 41 4C 4C 4F D4 35 11 FC 0E 71 10 | .....ALLO.5...q. |
| 1150 | 6F 0E 85 0C 81 AC 44 11 FC 0E 3C 11 C3 0E 8F 0F | o.....D...<..... |
| 1160 | 4C 11 85 0C 82 43 AC 54 11 FC 0E 3C 11 DB 0E 55 | L....C.T...<...U |
| 1170 | 0C 4C 11 85 0C 85 53 50 41 43 C5 64 11 FC 0E B1 | .L....SPAC.d.... |
| 1180 | 0F 6B 1F 85 0C 38 B5 00 F5 02 B5 01 F5 03 94 03 | .k...8.......... |
| 1190 | 60 38 B5 02 F5 00 B5 03 F5 01 94 03 60 82 55 BC | `8..........`.U. |
| 11A0 | 75 11 A4 11 20 91 11 B0 01 C8 94 02 E8 E8 4C 46 | u... .........LF |
| 11B0 | 08 82 55 BE 9D 11 B8 11 20 85 11 90 EC B0 EB 81 | ..U..... ....... |
| 11C0 | BC B1 11 C5 11 20 91 11 50 02 49 80 10 DC 30 D9 | ..... ..P.I...0. |
| 11D0 | 82 3C BD BF 11 D7 11 20 85 11 50 02 49 80 10 C9 | .<..... ..P.I... |
| 11E0 | 30 C8 81 BD D0 11 E8 11 B5 01 D5 03 D0 04 B5 00 | 0............... |
| 11F0 | D5 02 94 03 F0 B3 D0 B2 83 55 3C BD E2 11 00 12 | .........U<..... |
| 1200 | 20 85 11 90 A5 B0 A2 83 55 3E BD F8 11 0F 12 20 |  .......U>.....  |
| 1210 | 91 11 90 96 B0 93 81 BE 07 12 1C 12 20 85 11 4C | ............ ..L |
| 1220 | C8 11 82 3E BD 16 12 29 12 20 91 11 4C DA 11 88 | ...>...). ..L... |
| 1230 | 54 52 41 56 45 52 53 C5 22 12 FC 0E 33 0E F8 0D | TRAVERS."...3... |
| 1240 | 71 0D 66 08 7F F8 0D B4 0E C3 11 D0 08 F1 FF 33 | q.f.■.........3 |
| 1250 | 0E 2A 0E 85 0C 86 4C 41 54 45 53 D4 2F 12 FC 0E | .*....LATES./... |
| 1260 | D0 10 9F 0E 9F 0E 85 0C 83 4C 46 C1 55 12 FC 0E | .........LF.U... |
| 1270 | 9F 0F 89 0D 85 0C 83 43 46 C1 68 12 4E 0D 83 4E | .......CF.h.N..N |
| 1280 | 46 C1 76 12 FC 0E 66 08 05 89 0D A8 0F 3A 12 85 | F.v...f......:.. |
| 1290 | 0C 83 50 46 C1 7E 12 FC 0E 55 0C 3A 12 66 08 05 | ..PF.~...U.:.f.. |
| 12A0 | 71 0D 85 0C 84 21 43 53 D0 91 12 FC 0E 3E 0C 05 | q....!CS.....>.. |
| 12B0 | 11 C3 0E 85 0C 86 3F 45 52 52 4F D2 A4 12 FC 0E | ......?ERRO..... |
| 12C0 | 33 0E D0 08 08 00 43 17 B1 08 04 00 2A 0E 85 0C | 3.....C.....*... |
| 12D0 | 85 3F 43 4F 4D D0 B5 12 FC 0E DC 10 9F 0E E5 0C | .?COM........... |
| 12E0 | 66 08 11 BE 12 85 0C 85 3F 45 58 45 C3 D0 12 FC | f.......?EXE.... |
| 12F0 | 0E DC 10 9F 0E 66 08 12 BE 12 85 0C 86 3F 50 41 | .....f.......?PA |
| 1300 | 49 52 D3 E7 12 FC 0E 89 0D 66 08 13 BE 12 85 0C | IR.......f...... |
| 1310 | 84 3F 43 53 D0 FC 12 FC 0E 3E 0C 05 11 9F 0E 89 | .?CS.....>...... |
| 1320 | 0D 66 08 14 BE 12 85 0C 88 3F 4C 4F 41 44 49 4E | .f.......?LOADIN |
| 1330 | C7 10 13 FC 0E 8A 10 9F 0E E5 0C 66 08 16 BE 12 | ...........f.... |
| 1340 | 85 0C 87 43 4F 4D 50 49 4C C5 28 13 FC 0E D8 12 | ...COMPIL.(..... |
| 1350 | D3 0C 4E 0E 24 0D C1 0C 9F 0E 58 11 85 0C C1 DB | ..N.$.....X..... |
| 1360 | 42 13 FC 0E 4B 0C DC 10 C3 0E 85 0C 81 DD 5E 13 | B...K.........^. |
| 1370 | FC 0E 66 08 C0 DC 10 C3 0E 85 0C 86 53 4D 55 44 | ..f.........SMUD |
| 1380 | 47 C5 6C 13 FC 0E 5E 12 66 08 20 90 0E 85 0C 83 | G.l...^.f. ..... |
| 1390 | 48 45 D8 7B 13 FC 0E 66 08 10 E7 10 C3 0E 85 0C | HE.{...f........ |
| 13A0 | 87 44 45 43 49 4D 41 CC 8F 13 FC 0E 66 08 0A E7 | .DECIMA.....f... |
| 13B0 | 10 C3 0E 85 0C 87 28 3B 43 4F 44 45 A9 A0 13 FC | ......(;CODE.... |
| 13C0 | 0E D3 0C 5E 12 97 12 7C 12 C3 0E 85 0C 87 3C 42 | ...^...|.....<B |
| 13D0 | 55 49 4C 44 D3 B5 13 FC 0E B0 17 84 13 85 0C A5 | UILD............ |
| 13E0 | 19 48 A5 18 48 B1 0A 18 69 03 85 18 C8 B1 0A 69 | .H..H...i......i |
| 13F0 | 00 85 19 4C 57 0F C5 44 4F 45 53 BE CD 13 FC 0E | ...LW..DOES..... |

| Address | Hexadecimal | ASCII |
|---|---|---|
| 1400 | 4C 13 BF 13 66 08 4C 69 11 2C 08 DF 13 58 11 85 | L...f.Li.,...X.. |
| 1410 | 0C 85 43 4F 55 4E D4 F6 13 FC 0E 4E 0E 14 0D 33 | ..COUN.....N...3 |
| 1420 | 0E B4 0E 85 0C 84 54 59 50 C5 11 14 FC 0E 5F 0E | ......TYP......_. |
| 1430 | D0 08 18 00 F8 0D 71 0D 33 0E 58 09 90 09 B4 0E | ......q.3.X..... |
| 1440 | 6B 1F F1 08 F8 FF B1 08 04 00 2A 0E 85 0C 89 2D | k.........*....- |
| 1450 | 54 52 41 49 4C 49 4E C7 25 14 FC 0E 4E 0E 4B 0C | TRAILIN.%...N.K. |
| 1460 | 58 09 F8 0D F8 0D 71 0D 37 0D B4 0E B1 0F 89 0D | X.....q.7....... |
| 1470 | D0 08 08 00 A6 0C B1 08 04 00 37 0D F1 08 E4 FF | ..........7..... |
| 1480 | 85 0C 84 28 2E 22 A9 4E 14 FC 0E 7B 09 19 14 4E | ...(.".N...{...N |
| 1490 | 0E 14 0D D3 0C 71 0D C1 0C 2C 14 85 0C C2 2E A2 | .....q...,...... |
| 14A0 | 82 14 FC 0E 66 08 22 DC 10 9F 0E D0 08 14 00 4C | ....f."........L |
| 14B0 | 13 89 14 EC 15 3C 11 B4 0E 14 0D 4C 11 B1 08 0A | .....<.....L.... |
| 14C0 | 00 EC 15 3C 11 19 14 2C 14 85 0C 86 45 58 50 45 | ...<...,....EXPE |
| 14D0 | 43 D4 9D 14 FC 0E F8 0D 71 0D F8 0D 58 09 54 1F | C.......q...X.T. |
| 14E0 | 4E 0E 66 08 08 E6 11 D0 08 18 00 F8 0D 90 09 E6 | N.f............. |
| 14F0 | 11 4E 0E D3 0C 4C 0D 71 0D C1 0C 71 0D B1 08 72 | .N...L.q...q...r |
| 1500 | 00 4E 0E 66 08 18 E6 11 D0 08 17 00 2A 0E D3 0C | .N.f........*... |
| 1510 | 2A 0E 4E 0E 37 0D C1 0C 66 08 07 8B 1F B1 08 52 | *.N.7...f......R |
| 1520 | 00 4E 0E 66 08 0D E6 11 D0 08 0E 00 A6 0C 2A 0E | .N.f..........*. |
| 1530 | B1 0F 4B 0C B1 08 04 00 4E 0E D3 0C 4E 0E 90 09 | ..K.....N...N... |
| 1540 | E6 11 33 0E C1 0C D0 08 1D 00 D0 08 17 00 2A 0E | ..3...........*. |
| 1550 | 66 08 07 D3 0C 37 0D 4E 0E 9F 0E 33 0E C1 0C B1 | f....7.N...3.... |
| 1560 | 08 04 00 4B 0C 90 09 DB 0E 4B 0C 90 09 14 0D C3 | ...K.....K...... |
| 1570 | 0E 6B 1F F1 08 69 FF 2A 0E 85 0C 85 51 55 45 52 | .k...i.*....QUER |
| 1580 | D9 CB 14 FC 0E 42 10 9F 0E 66 08 50 D4 14 4B 0C | .....B...f.P..K. |
| 1590 | 93 10 C3 0E 85 0C C1 80 7B 15 87 0C 85 45 52 41 | ........{....ERA |
| 15A0 | 53 C5 96 15 FC 0E 4B 0C 10 0B 85 0C 86 42 4C 41 | S.....K......BLA |
| 15B0 | 4E 4B D3 9C 15 FC 0E B1 0F 10 0B 85 0C 84 48 4F | NK............HO |
| 15C0 | 4C C4 AC 15 FC 0E A8 0F 18 11 6F 0E 18 11 9F 0E | L.........o..... |
| 15D0 | DB 0E 85 0C 83 50 41 C4 BD 15 FC 0E 3C 11 66 08 | .....PA.....<.f. |
| 15E0 | 44 71 0D 85 0C 84 57 4F 52 C4 D4 15 FC 0E 8A 10 | Dq....WOR....... |
| 15F0 | 9F 0E 5F 0E D0 08 08 00 CC 1C B1 08 06 00 42 10 | .._...........B. |
| 1600 | 9F 0E 93 10 9F 0E 71 0D 33 0E 61 0A 3C 11 66 08 | ......q.3.a.<.f. |
| 1610 | 22 B5 15 93 10 6F 0E F8 0D 89 0D C1 0C 7B 09 3C | "....o.......{.< |
| 1620 | 11 DB 0E 71 0D 3C 11 14 0D D3 0C E9 0A 85 0C 88 | ...q.<.......... |
| 1630 | 28 4E 55 4D 42 45 52 A9 E5 15 FC 0E 14 0D 4E 0E | (NUMBER.......N. |
| 1640 | C1 0C B4 0E E7 10 9F 0E CA 09 D0 08 2C 00 33 0E | ............,.3. |
| 1650 | E7 10 9F 0E 98 0B 2A 0E 08 0E E7 10 9F 0E 98 0B | ......*......... |
| 1660 | A2 0D F1 10 9F 0E 14 0D D0 08 08 00 55 0C F1 10 | ............U... |
| 1670 | 6F 0E D3 0C B1 08 C6 FF D3 0C 85 0C 87 4E 55 4D | o............NUM |
| 1680 | 42 45 52 BF 2F 16 FC 0E 4B 0C 4B 0C 08 0E 4E 0E | BER./...K.K...N. |
| 1690 | 14 0D B4 0E 66 08 2D E6 11 4E 0E C1 0C 71 0D 4E | ....f.-..N...q.N |
| 16A0 | 0E C1 0C A8 0F F1 10 C3 0E A1 08 4E 0E C1 0C 3A | ...........N...: |
| 16B0 | 16 4E 0E B4 0E 66 08 2C 89 0D 97 0F B6 11 4E 0E | .N...f.,......N. |
| 16C0 | D0 08 E3 FF D3 0C 71 0D F8 0D E6 11 33 0E B4 0E | ......q.....3... |
| 16D0 | B1 0F 89 0D 12 0C D0 08 0A 00 75 09 A1 08 55 0C | ..........u...U. |
| 16E0 | 85 0C D3 0C D0 08 04 00 E1 0D 4B 0C 85 0C 86 4E | ..........K....N |
| 16F0 | 55 4D 42 45 D2 7C 16 FC 0E 86 16 4B 0C BE 12 85 | UMBE.|.....K.... |

| Address | Hexadecimal | ASCII |
|---|---|---|
| 1700 | 0C 85 2D 46 49 4E C4 EE 16 FC 0E B1 0F EC 15 3C | ..-FIN.........< |
| 1710 | 11 C2 10 9F 0E 9F 0E FB 09 4E 0E E5 0C D0 08 0A | .........N...... |
| 1720 | 00 2A 0E 3C 11 5E 12 FB 09 85 0C 87 28 41 42 4F | .*.<.^......(ABO |
| 1730 | 52 54 A9 01 17 FC 0E D3 19 85 0C 85 45 52 52 4F | RT..........ERRO |
| 1740 | D2 2B 17 FC 0E 5C 10 9F 0E 02 0D D0 08 04 00 35 | .+...\.........5 |
| 1750 | 17 3C 11 19 14 2C 14 89 14 04 20 07 3F 20 89 1D | .<...,.... .? .. |
| 1760 | 61 0C 93 10 9F 0E 24 11 C3 0E 8A 10 9F 0E 31 11 | a.....$.......1. |
| 1770 | C3 0E A3 19 85 0C 83 49 44 AE 3B 17 FC 0E DA 15 | .......ID.;..... |
| 1780 | 66 08 20 66 08 5F 10 0B 4E 0E 97 12 6E 12 F8 0D | f. f._..N...n... |
| 1790 | 89 0D DA 15 33 0E E9 0A DA 15 19 14 66 08 1F FD | ....3.......f... |
| 17A0 | 0B 2C 14 7D 11 85 0C 86 43 52 45 41 54 C5 76 17 | .,.}....CREAT.v. |
| 17B0 | FC 0E 42 10 4B 0C 66 08 A0 71 0D A2 11 8F 0F BE | ..B.K.f..q...... |
| 17C0 | 12 09 17 D0 08 0E 00 2A 0E 84 12 7C 17 9F 0F 89 | .......*...|.... |
| 17D0 | 1D 7D 11 3C 11 4E 0E B4 0E 4E 10 9F 0E D1 1A 14 | .}.<.N...N...... |
| 17E0 | 0D 4C 11 71 10 B4 0E 66 08 FD E6 11 4C 11 4E 0E | .L.q...f....L.N. |
| 17F0 | 66 08 A0 90 0E 3C 11 37 0D 66 08 80 90 0E 5E 12 | f....<.7.f....^. |
| 1800 | 58 11 D0 10 9F 0E C3 0E 3C 11 24 0D 58 11 85 0C | X.......<.$.X... |
| 1810 | C9 5B 43 4F 4D 50 49 4C 45 DD A7 17 FC 0E 09 17 | .[COMPILE....... |
| 1820 | E5 0C 4B 0C BE 12 2A 0E 7C 12 58 11 85 0C C7 4C | ..K...*.|.X....L |
| 1830 | 49 54 45 52 41 CC 10 18 FC 0E DC 10 9F 0E D0 08 | ITERA........... |
| 1840 | 08 00 4C 13 2C 08 58 11 85 0C C8 43 4C 49 54 45 | ..L.,.X....CLITE |
| 1850 | 52 41 CC 2E 18 FC 0E DC 10 9F 0E D0 08 08 00 4C | RA.............L |
| 1860 | 13 66 08 69 11 85 0C C8 44 4C 49 54 45 52 41 CC | .f.i....DLITERA. |
| 1870 | 4A 18 FC 0E DC 10 9F 0E D0 08 08 00 33 0E 38 18 | J...........3.8. |
| 1880 | 38 18 85 0C 86 3F 53 54 41 43 CB 67 18 AA 18 66 | 8....?STAC.g...f |
| 1890 | 08 FF 3E 0C 24 0D A2 11 55 0C BE 12 3E 0C 66 08 | ..>.$...U...>.f. |
| 18A0 | 54 A2 11 66 08 07 BE 12 85 0C E0 54 90 03 4C 46 | T..f.......T..LF |
| 18B0 | 08 4C FC 0E 89 49 4E 54 45 52 50 52 45 D4 84 18 | .L...INTERPRE... |
| 18C0 | FC 0E 09 17 D0 08 1E 00 DC 10 9F 0E C3 11 D0 08 | ................ |
| 18D0 | 0A 00 7C 12 58 11 B1 08 06 00 7C 12 8A 08 8D 18 | ..|.X.....|..... |
| 18E0 | B1 08 2E 00 3C 11 F7 16 F1 10 9F 0E 14 0D D0 08 | ....<........... |
| 18F0 | 08 00 72 18 B1 08 18 00 2A 0E 4E 0E 2C 08 00 01 | ..r.....*.N.,... |
| 1900 | A2 11 D0 08 08 00 55 18 B1 08 04 00 38 18 8D 18 | ......U.....8... |
| 1910 | B1 08 B0 FF 85 0C 89 49 4D 4D 45 44 49 41 54 C5 | .......IMMEDIAT. |
| 1920 | B4 18 FC 0E 5E 12 66 08 40 90 0E 85 0C 8A 56 4F | ....^.f.@.....VO |
| 1930 | 43 41 42 55 4C 41 52 D9 16 19 FC 0E D7 13 2C 08 | CABULAR.......,. |
| 1940 | 81 A0 58 11 D0 10 9F 0E 7C 12 58 11 3C 11 80 10 | ..X.....|.X.<... |
| 1950 | 9F 0E 58 11 80 10 C3 0E BF 13 4C DF 13 24 0D C2 | ..X.......L..$.. |
| 1960 | 10 C3 0E 85 0C C5 46 4F 52 54 C8 2D 19 5A 19 81 | ......FORT.-.Z.. |
| 1970 | A0 C9 61 00 00 8B 44 45 46 49 4E 49 54 49 4F 4E | ..a...DEFINITION |
| 1980 | D3 65 19 FC 0E C2 10 9F 0E D0 10 C3 0E 85 0C C1 | .e.............. |
| 1990 | A8 75 19 FC 0E 66 08 29 EC 15 85 0C 84 51 55 49 | .u...f.).....QUI |
| 19A0 | D4 8F 19 FC 0E 4B 0C 8A 10 C3 0E 62 13 71 0C 8B | .....K.....b.q.. |
| 19B0 | 1F 83 15 C0 18 DC 10 9F 0E E5 0C D0 08 08 00 89 | ................ |
| 19C0 | 14 03 20 4F 4B B1 08 E6 FF 85 0C 85 41 42 4F 52 | .. OK.......ABOR |
| 19D0 | D4 9C 19 FC 0E 71 0C 61 0C D0 61 8B 1F 89 14 0E | .....q.a..a..... |
| 19E0 | 07 46 4F 52 54 48 20 52 45 53 54 41 52 54 3C 28 | .FORTH RESTART<( |
| 19F0 | 6D 19 83 19 A3 19 85 0C 61 0C 66 08 22 20 10 9F | m.......a.f." .. |

| Address | Hexadecimal | ASCII |
|---|---|---|
| 1A00 | 0E 4E 0E 2C 08 D5 0F C3 0E 66 08 24 20 10 9F 0E | .N.,.....f.$... |
| 1A10 | DF 0F 9F 0F 71 0D A4 0B 89 0D 2C 08 C9 0F C3 0E | ....q.....,..... |
| 1A20 | 1C 1C 8B 1F 71 0C 8C 61 55 46 46 45 52 53 20 45 | ....q..aUFFERS E |
| 1A30 | 4D 50 54 49 45 44 D3 19 84 43 4F 4C C4 CB 19 41 | MPTIED...COL...A |
| 1A40 | 1A AD 0C 08 8D 71 19 AD 0D 08 8D 72 19 A2 19 A9 | .....q.....r.... |
| 1A50 | F8 A0 15 D0 06 A2 19 A9 D5 A0 0F 86 19 85 18 AD | ................ |
| 1A60 | 10 08 85 0C AD 11 08 85 0D B9 0C 08 91 0C 88 10 | ................ |
| 1A70 | F8 A9 6C 85 09 4C 73 0C 84 53 2D 3E C4 38 1A 81 | ..l..Ls..S-).8.. |
| 1A80 | 1A B5 01 10 01 88 98 48 4C 3F 08 82 2B AD 78 1A | .......HL?..+.x. |
| 1A90 | FC 0E 02 0D D0 08 04 00 C8 0D 85 0C 83 44 2B AD | .............D+. |
| 1AA0 | 8B 1A FC 0E 02 0D D0 08 04 00 E1 0D 85 0C 83 41 | ...............A |
| 1AB0 | 42 D3 9C 1A FC 0E 4E 0E 90 1A 85 0C 84 44 41 42 | B.....N......DAB |
| 1AC0 | D3 AE 1A FC 0E 4E 0E A2 1A 85 0C 83 4D 49 CE BC | .....N......MI.. |
| 1AD0 | 1A FC 0E F8 0D F8 0D 1A 12 D0 08 04 00 33 0E 2A | .............3.* |
| 1AE0 | 0E 85 0C 83 4D 41 D8 CB 1A FC 0E F8 0D F8 0D C3 | ....MA.......... |
| 1AF0 | 11 D0 08 04 00 33 0E 2A 0E 85 0C 82 4D AA E3 1A | .....3.*....M... |
| 1B00 | FC 0E F8 0D F8 0D 28 0C C1 0C B4 1A 33 0E B4 1A | ......(.....3... |
| 1B10 | 98 0B D3 0C A2 1A 85 0C 82 4D AF FB 1A FC 0E F8 | .........M...... |
| 1B20 | 0D C1 0C C1 0C C3 1A 7B 09 B4 1A B3 0B D3 0C 7B | .......{.......{ |
| 1B30 | 09 28 0C 90 1A 33 0E D3 0C 90 1A 33 0E 85 0C 84 | .(...3.....3.... |
| 1B40 | 2F 4D 4F C4 18 1B FC 0E C1 0C 7F 1A D3 0C 1D 1B | /MO............. |
| 1B50 | 85 0C 81 AF 3F 1B FC 0E 46 1B 33 0E 2A 0E 85 0C | ....?...F.3.*... |
| 1B60 | 85 2A 2F 4D 4F C4 52 1B FC 0E C1 0C 00 1B D3 0C | .*/MO.R......... |
| 1B70 | 1D 1B 85 0C 82 2A AF 60 1B FC 0E 68 1B 33 0E 2A | .....*.`...h.3.* |
| 1B80 | 0E 85 0C 85 4D 2F 4D 4F C4 74 1B FC 0E C1 0C 4B | ....M/MO.t.....K |
| 1B90 | 0C 7B 09 B3 0B D3 0C 33 0E C1 0C B3 0B D3 0C 85 | .{.....3........ |
| 1BA0 | 0C 83 4D 4F C4 83 1B FC 0E 46 1B 2A 0E 85 0C 83 | ..MO.....F.*.... |
| 1BB0 | 55 53 C5 A1 1B 57 0F E0 97 84 50 52 45 D6 AF 1B | US...W....PRE... |
| 1BC0 | 57 0F E0 97 84 2B 42 55 C6 B9 1B FC 0E DF 0F 9F | W....+BU........ |
| 1BD0 | 0F 71 0D 71 0D 4E 0E D3 0F E6 11 D0 08 06 00 2A | .q.q.N.........* |
| 1BE0 | 0E C7 0F 4E 0E C0 1B 9F 0E 89 0D 85 0C 86 55 50 | ...N..........UP |
| 1BF0 | 44 41 54 C5 C4 1B FC 0E C0 1B 9F 0E 9F 0E 2C 08 | DAT...........,. |
| 1C00 | 00 80 12 0C C0 1B 9F 0E C3 0E 85 0C 8D 45 4D 50 | .............EMP |
| 1C10 | 54 59 2D 42 55 46 46 45 52 D3 ED 1B FC 0E C7 0F | TY-BUFFER....... |
| 1C20 | 4E 0E C0 1B C3 0E 4E 0E B5 1B C3 0E D3 0F F8 0D | N.....N......... |
| 1C30 | 89 0D A4 15 85 0C 85 45 42 55 46 D3 0C 1C FC 0E | .......EBUF..... |
| 1C40 | 1C 1C 85 0C 83 44 52 B0 36 1C FC 0E 4B 0C B4 10 | .....DR.6...K... |
| 1C50 | C3 0E 85 0C 83 44 52 B1 44 1C FC 0E 04 10 B4 10 | .....DR.D....... |
| 1C60 | C3 0E 85 0C 84 57 42 55 C6 54 1C FC 0E C1 0C 7B | .....WBU.T.....{ |
| 1C70 | 09 24 0D 7B 09 9F 0E 2C 08 FF 7F FD 0B 4E 0E D3 | .$.{...,.....N. |
| 1C80 | 0C C3 0E 4B 0C A1 20 85 0C 86 42 55 46 46 45 D2 | ...K.. ...BUFFE. |
| 1C90 | 64 1C FC 0E B5 1B 9F 0E 4E 0E C1 0C CB 1B D0 08 | d.......N....... |
| 1CA0 | FC FF B5 1B C3 0E 7B 09 9F 0E 02 0D D0 08 06 00 | ......{......... |
| 1CB0 | 7B 09 6B 1C 7B 09 C3 0E 7B 09 C0 1B C3 0E D3 0C | {.k.{...{....... |
| 1CC0 | 24 0D 85 0C 85 42 4C 4F 43 CB 89 1C FC 0E B4 10 | $....BLOC....... |
| 1CD0 | 9F 0E 71 0D C1 0C C0 1B 9F 0E 4E 0E 9F 0E 7B 09 | ..q.......N...{. |
| 1CE0 | 89 0D 4E 0E 71 0D D0 08 32 00 CB 1B E5 0C D0 08 | ..N.q...2....... |
| 1CF0 | 12 00 2A 0E 7B 09 92 1C 4E 0E 7B 09 55 0C A1 20 | ..*.{...N.{.U.. |

| Address | Hexadecimal | ASCII |
|---|---|---|
| 1D00 | 4C 0D 4E 0E 9F 0E 7B 09 89 0D 4E 0E 71 0D E5 0C | L.N...(...N.q... |
| 1D10 | D0 08 D8 FF 4E 0E C0 1B C3 0E D3 0C 2A 0E 24 0D | ....N.......*.$. |
| 1D20 | 85 0C 85 46 4C 55 53 C8 C4 1C FC 0E C0 1B 9F 0E | ...FLUS......... |
| 1D30 | 4E 0E 9F 0E 02 0D D0 08 06 00 4E 0E 6B 1C CB 1B | N.........N.k... |
| 1D40 | E5 0C D0 08 EC FF 2A 0E 85 0C 86 28 4C 49 4E 45 | ......*....(LINE |
| 1D50 | A9 22 1D FC 0E C1 0C BB 0F DF 0F 68 1B D3 0C EB | ."........h.... |
| 1D60 | 0F A4 0B 71 0D CC 1C 71 0D BB 0F 85 0C 85 2E 4C | ...q...q......L |
| 1D70 | 49 4E C5 4A 1D FC 0E 53 1D 5A 14 2C 14 85 0C 87 | IN.J...S.Z.,.... |
| 1D80 | 4D 45 53 53 41 47 C5 6D 1D FC 0E 5C 10 9F 0E D0 | MESSAG.m...\.... |
| 1D90 | 08 1A 00 5F 0E D0 08 10 00 9F 0F B4 10 9F 0E EB | ..._............ |
| 1DA0 | 0F 56 1B 89 0D 75 1D B1 08 0D 00 89 14 06 4D 53 | .V...u........MS |
| 1DB0 | 47 20 23 20 D4 23 85 0C 84 4C 4F 41 C4 7F 1D FC | G # .#...LOA.... |
| 1DC0 | 0E 8A 10 9F 0E C1 0C 93 10 9F 0E C1 0C 4B 0C 93 | .............K.. |
| 1DD0 | 10 C3 0E 8A 10 C3 0E C0 18 D3 0C 93 10 C3 0E D3 | ................ |
| 1DE0 | 0C 8A 10 C3 0E 85 0C C3 2D 2D BE B8 1D FC 0E 33 | ........--.....3 |
| 1DF0 | 13 4B 0C 93 10 C3 0E 55 0C 8A 10 6F 0E 85 0C 84 | .K.....U...o.... |
| 1E00 | 3F 4B 45 D9 E7 1D 08 1E AD 00 C0 10 03 29 7F A8 | ?KE..........).. |
| 1E10 | 98 4C 41 0C 84 58 4B 45 D9 FF 1D 1D 1E 20 0C FD | .LA..XKE........ |
| 1E20 | 29 7F D0 02 A9 5C C9 1D D0 02 A9 5B 4C 41 0C 84 | )....\.....[LA.. |
| 1E30 | 42 45 4C CC 14 1E 38 1E 20 DD FB 4C 46 08 83 2D | BEL...8. ..LF..- |
| 1E40 | 42 D3 2F 1E 46 1E A9 C1 38 20 2C FC 4C 46 08 82 | B./.F...8 ,.LF.. |
| 1E50 | 42 D3 3E 1E 56 1E A9 C2 D0 EE 82 4C C6 4F 1E 61 | B.).V......L.O.a |
| 1E60 | 1E A9 C3 D0 E3 83 2D 4C C6 5A 1E 6D 1E A9 C4 D0 | ......-L.Z.m.... |
| 1E70 | D7 84 43 45 4F CC 65 1E 7A 1E A9 C5 D0 CA 84 43 | ..CEO.e.z......C |
| 1E80 | 45 4F D0 71 1E 87 1E A9 C6 D0 BD 85 43 4C 45 41 | EO.q........CLEA |
| 1E90 | D2 7E 1E 95 1E A9 C0 D0 AF 85 58 45 4D 49 D4 8B | .~........XEMI.. |
| 1EA0 | 1E A3 1E B5 00 C9 20 90 02 09 80 A4 24 91 28 4C | ...... .....$.(L |
| 1EB0 | 68 09 85 53 45 4D 49 D4 99 1E BC 1E A9 01 20 6F | h..SEMI....... o |
| 1EC0 | 08 98 86 0E 85 12 48 A9 04 85 13 A2 08 A0 00 B1 | ......H......... |
| 1ED0 | 10 C9 20 90 02 09 80 91 12 C8 C0 28 D0 F1 18 A5 | .. ........(.... |
| 1EE0 | 12 69 80 85 12 90 02 E6 13 18 A5 10 69 28 85 10 | .i..........i(.. |
| 1EF0 | 90 02 E6 11 CA D0 D6 68 18 69 28 C9 78 D0 C5 A6 | .......h.i(.x... |
| 1F00 | 0E 4C 46 08 87 4F 55 54 50 55 54 A1 B2 1E FC 0E | .LF..OUTPUT..... |
| 1F10 | 66 08 36 2C 08 F0 FD 08 0E 5F 0E D0 08 11 00 66 | f.6,....._.....f |
| 1F20 | 08 C0 71 0D 2C 08 00 01 A4 0B 33 0E 2A 0E 33 0E | ..q.,.....3.*.3. |
| 1F30 | C3 0E 85 0C 86 49 4E 50 55 54 A1 04 1F FC 0E 66 | .....INPUT.....f |
| 1F40 | 08 38 2C 08 1B FD 2C 08 17 1F C1 0C 85 0C 83 4B | .8,...,........K |
| 1F50 | 45 D9 34 1F 56 1F 20 35 FD C9 95 D0 04 A4 24 B1 | E.4.V. 5......$. |
| 1F60 | 28 4C 20 1E 84 45 4D 49 D4 4E 1F 6D 1F 98 38 A0 | (L ..EMI.N.m..8. |
| 1F70 | 1A 71 0C 91 0C C8 A9 00 71 0C 91 0C B5 00 09 80 | .q......q....... |
| 1F80 | 20 ED FD 4C 68 09 82 43 D2 64 1F FC 0E 66 08 0D |  ..Lh..C.d...f.. |
| 1F90 | 6B 1F 85 0C F9 20 8E FD 4C 46 08 49 83 F0 F6 AD | k.... ..LF.I.... |
| 1FA0 | 10 C0 B0 F1 38 B0 E7 89 3F 54 45 52 4D 49 4E 41 | ....8...?TERMINA |
| 1FB0 | CC 86 1F B5 1F AD 00 C0 10 08 C9 83 D0 04 AD 10 | ................ |
| 1FC0 | C0 C8 98 4C 41 0C 83 4D 4F CE A7 1F CE 1F 86 0E | ...LA..MO....... |
| 1FD0 | 00 84 52 2F 57 C4 C6 1F 57 0F 01 60 01 00 0C FF | ..R/W...W..`.... |
| 1FE0 | EB 1F 00 B3 00 00 01 20 FE 60 01 00 01 EF D8 84 | ....... .`...... |
| 1FF0 | 52 2F 57 A1 D1 1F FC 0E D8 1F 71 0D DB 0E 85 0C | R/W.......q..... |

| Address | Hexadecimal | ASCII |
|---|---|---|
| 2000 | A9 1F A0 DA 78 20 00 BD 58 90 05 A6 0E 4C D5 0C | ....x ..X....L.. |
| 2010 | 60 85 28 52 2F 57 A9 EF 1F 1B 20 8A 18 69 0A 85 | `.(R/W.... ..i.. |
| 2020 | 0E B5 00 8D DE 1F B5 04 8D DC 1F C8 B5 06 D0 01 | ................ |
| 2030 | C8 8C E6 1F B5 08 8D E2 1F B4 09 A9 04 85 10 B5 | ................ |
| 2040 | 02 AE 14 10 E0 0D D0 25 8D DF 1F 8C E3 1F 20 00 | .......%...... . |
| 2050 | 20 EE E3 1F AC DF 1F C8 C0 0D D0 05 A0 00 EE DE | ................ |
| 2060 | 1F 8C DF 1F C6 10 D0 E6 A6 0E 4C 4D 0C 18 69 03 | ..........LM..i. |
| 2070 | 8D DF 1F C8 C8 C8 8C E3 1F 20 00 20 CE E3 1F CE | ......... . .... |
| 2080 | DF 1F C6 10 D0 F3 F0 E0 84 52 57 54 D3 11 20 91 | .........RWT.. . |
| 2090 | 20 86 0E 20 00 20 A6 0E 4C 4D 0C 83 52 2F D7 88 |  .. . ..LM..R/.. |
| 20A0 | 20 FC 0E 33 0E 04 10 F8 0D C3 11 D0 08 0E 00 8F |  ..3............ |
| 20B0 | 0F 33 0E 04 10 89 0D B1 08 06 00 55 0C 33 0E 37 | .3.........U.3.7 |
| 20C0 | 0D 4E 0E 04 10 B6 11 66 08 06 BE 12 56 0D 56 0D | .N.....f....V.V. |
| 20D0 | 12 10 46 1B 19 20 66 08 08 BE 12 85 0C 89 45 52 | ..F.. f.......ER |
| 20E0 | 41 53 45 44 49 53 CB 9B 20 FC 0E 66 08 FE 97 0F | ASEDIS.. ..f.... |
| 20F0 | F6 1F 9F 0F 66 08 0C F6 1F 8F 0F B4 10 9F 0E E5 | ....f........... |
| 2100 | 0C 89 0D 8F 0F F6 1F 8F 20 4B 0C 97 0F F6 1F 66 | ........ K.....f |
| 2110 | 08 08 BE 12 12 10 66 08 0D E6 11 D0 08 1E 00 DA | ......f......... |
| 2120 | 15 DF 0F B1 0F 10 0B 04 10 14 0D 55 0C 58 09 DA | ...........U.X.. |
| 2130 | 15 90 09 4B 0C A1 20 F1 08 F6 FF 85 0C C1 A7 DD | ...K.. ......... |
| 2140 | 20 FC 0E 09 17 E5 0C 4B 0C BE 12 2A 0E 38 18 85 |  ......K...*.8.. |
| 2150 | 0C 88 28 46 4F 52 47 45 54 A9 3D 21 FC 0E 4E 0E | ..(FORGET.=!..N. |
| 2160 | 68 10 9F 0E A2 11 66 08 15 BE 12 C1 0C 80 10 9F | h.....f......... |
| 2170 | 0E 7B 09 F8 0D A2 11 D0 08 12 00 6D 19 83 19 9F | .{.........m.... |
| 2180 | 0E 4E 0E 80 10 C3 0E B1 08 E8 FF 4E 0E 9F 0F 89 | .N.........N.... |
| 2190 | 0D 97 12 6E 12 9F 0E 4E 0E 7B 09 A2 11 D0 08 F2 | ...n...N.{...... |
| 21A0 | FF F8 0D 4C 0D C3 0E 9F 0E 5F 0E E5 0C D0 08 DC | ...L....._...... |
| 21B0 | FF D3 0C 71 10 C3 0E 85 0C 86 46 4F 52 47 45 D4 | ...q......FORGE. |
| 21C0 | 51 21 FC 0E 41 21 84 12 5C 21 85 0C 84 42 41 43 | Q!..A!..\!...BAC |
| 21D0 | CB B9 21 FC 0E 3C 11 89 0D 58 11 85 0C C5 42 45 | ..!..<...X....BE |
| 21E0 | 47 49 CE CC 21 FC 0E D8 12 3C 11 55 0C 85 0C C5 | GI..!....<.U.... |
| 21F0 | 45 4E 44 49 C6 DD 21 FC 0E D8 12 8F 0F 05 13 3C | ENDI..!........< |
| 2200 | 11 F8 0D 89 0D 33 0E C3 0E 85 0C C4 54 48 45 CE | .....3......THE. |
| 2210 | EF 21 FC 0E F7 21 85 0C C2 44 CF 0B 22 FC 0E 4C | .!...!...D.."..L |
| 2220 | 13 58 09 3C 11 97 0F 85 0C C4 4C 4F 4F D0 18 22 | .X.<......LOO.." |
| 2230 | FC 0E 97 0F 05 13 4C 13 F1 08 D3 21 85 0C C5 2B | ......L....!...+ |
| 2240 | 4C 4F 4F D0 29 22 FC 0E 97 0F 05 13 4C 13 21 09 | LOO.)"......L.!. |
| 2250 | D3 21 85 0C C5 55 4E 54 49 CC 3E 22 FC 0E 55 0C | .!...UNTI.>"..U. |
| 2260 | 05 13 4C 13 D0 08 D3 21 85 0C C3 45 4E C4 54 22 | ..L....!...EN.T" |
| 2270 | FC 0E 5C 22 85 0C C5 41 47 41 49 CE 6A 22 FC 0E | ..\"...AGAI.j".. |
| 2280 | 55 0C 05 13 4C 13 B1 08 D3 21 85 0C C6 52 45 50 | U...L....!...REP |
| 2290 | 45 41 D4 76 22 FC 0E C1 0C C1 0C 7E 22 D3 0C D3 | EA.v".......~"... |
| 22A0 | 0C 8F 0F 89 0D F7 21 85 0C C2 49 C6 8C 22 FC 0E | ......!...I..".. |
| 22B0 | 4C 13 D0 08 3C 11 4B 0C 58 11 8F 0F 85 0C C4 45 | L...<.K.X......E |
| 22C0 | 4C 53 C5 A9 22 FC 0E 8F 0F 05 13 4C 13 B1 08 3C | LS.."......L...< |
| 22D0 | 11 4B 0C 58 11 33 0E 8F 0F F7 21 8F 0F 85 0C C5 | .K.X.3....!..... |
| 22E0 | 57 48 49 4C C5 BE 22 FC 0E AE 22 24 0D 85 0C 86 | WHIL.."..."$.... |
| 22F0 | 53 50 41 43 45 D3 DF 22 FC 0E 4B 0C E9 1A 5F 0E | SPACE.."..K..._. |

| Address | Hexadecimal | ASCII |
|---|---|---|
| 2300 | D0 08 0C 00 4B 0C 58 09 7D 11 F1 08 FC FF 85 0C | ....K.X.}....... |
| 2310 | 82 3C A3 EF 22 FC 0E DA 15 18 11 C3 0E 85 0C 82 | .<.."........... |
| 2320 | 23 BE 10 23 FC 0E 2A 0E 2A 0E 18 11 9F 0E DA 15 | #..#..*.*....... |
| 2330 | F8 0D 89 0D 85 0C 84 53 49 47 CE 1F 23 FC 0E 08 | .......SIG..#... |
| 2340 | 0E 02 0D D0 08 07 00 66 08 2D C4 15 85 0C 81 A3 | .......f.-...... |
| 2350 | 36 23 FC 0E E7 10 9F 0E 8B 1B 08 0E 66 08 09 F8 | 6#..........f... |
| 2360 | 0D C3 11 D0 08 07 00 66 08 07 71 0D 66 08 30 71 | .......f..q.f.0q |
| 2370 | 0D C4 15 85 0C 82 23 D3 4E 23 FC 0E 52 23 F8 0D | ......#.N#..R#.. |
| 2380 | F8 0D 12 0C E5 0C D0 08 F4 FF 85 0C 83 44 2E D2 | .............D.. |
| 2390 | 75 23 FC 0E C1 0C 33 0E F8 0D C3 1A 15 23 7A 23 | u#....3......#z# |
| 23A0 | 3D 23 24 23 D3 0C F8 0D 89 0D F8 22 2C 14 85 0C | =#$#.......",... |
| 23B0 | 82 44 AE 8C 23 FC 0E 4B 0C 92 23 7D 11 85 0C 82 | .D..#..K..#}.... |
| 23C0 | 2E D2 B0 23 FC 0E C1 0C 7F 1A D3 0C 92 23 85 0C | ...#.........#.. |
| 23D0 | 81 AE BF 23 FC 0E 7F 1A B5 23 85 0C 81 BF D0 23 | ...#.....#.....# |
| 23E0 | FC 0E 9F 0E D4 23 85 0C 82 55 AE DC 23 FC 0E 4B | .....#...U..#..K |
| 23F0 | 0C B5 23 85 0C 84 4C 49 53 D4 E8 23 FC 0E AA 13 | ..#...LIS..#.... |
| 2400 | 8B 1F 4E 0E A7 10 C3 0E 89 14 06 53 43 52 20 23 | ..N........SCR # |
| 2410 | 20 D4 23 F7 0F BB 0F 56 1B 4B 0C 58 09 8B 1F 90 | .#.....V.K.X.... |
| 2420 | 09 97 0F C4 23 7D 11 90 09 A7 10 9F 0E 75 1D F1 | ....#}.......u.. |
| 2430 | 08 EC FF 8B 1F 85 0C 85 49 4E 44 45 D8 F5 23 FC | ........INDE..#. |
| 2440 | 0E 66 08 0C 6B 1F 8B 1F 14 0D 33 0E 58 09 8B 1F | .f..k.....3.X... |
| 2450 | 90 09 97 0F C4 23 7D 11 4B 0C 90 09 75 1D B3 1F | .....#).K...u... |
| 2460 | D0 08 04 00 A6 0C F1 08 E6 FF 85 0C 85 52 4C 49 | .............RLI |
| 2470 | 53 D4 37 24 FC 0E 14 0D 33 0E 58 09 90 09 FC 23 | S.7$....3.X....# |
| 2480 | F1 08 FA FF 85 0C 85 56 4C 49 53 D4 6C 24 FC 0E | .......VLIS.l$.. |
| 2490 | 66 08 80 9D 10 C3 0E C2 10 9F 0E 9F 0E 9D 10 9F | f............... |
| 24A0 | 0E BB 0F 1A 12 D0 08 0A 00 8B 1F 4B 0C 9D 10 C3 | ...........K.... |
| 24B0 | 0E 4E 0E 7C 17 7D 11 7D 11 97 12 6E 12 9F 0E 4E | .N.|.}.}...n...N |
| 24C0 | 0E E5 0C B3 1F 12 0C D0 08 D4 FF 2A 0E 85 0C 84 | ...........*.... |
| 24D0 | 44 55 4D D0 86 24 FC 0E F8 0D 71 0D 33 0E 58 09 | DUM..$....q.3.X. |
| 24E0 | 8B 1F 90 09 ED 23 89 14 02 3D 20 90 09 B4 0E D4 | .....#...= ..... |
| 24F0 | 23 B3 1F D0 08 04 00 A6 0C F1 08 E5 FF 85 0C 84 | #............... |
| 2500 | 50 49 43 CB CF 24 08 25 16 00 18 8A 75 00 A8 B9 | PIC..$.%....u... |
| 2510 | 00 00 95 00 B9 01 00 95 01 4C 46 08 84 52 4F 4C | .........LF..ROL |
| 2520 | CC FF 24 25 25 16 00 18 8A 75 00 E8 E8 86 0E AA | ..$%%....u...... |
| 2530 | B5 00 48 B5 01 48 E4 0E F0 0E B5 FF 95 01 B5 FE | ..H..H.......... |
| 2540 | 95 00 CA CA E4 0E D0 F2 68 4C 41 08 85 53 48 49 | ........hLA..SHI |
| 2550 | 46 D4 1C 25 56 25 E8 E8 B4 FE F0 13 10 0A 56 01 | F..%V%........V. |
| 2560 | 76 00 C8 D0 F9 4C 46 08 16 00 36 01 88 D0 F9 4C | v....LF...6....L |
| 2570 | 46 08 89 32 56 41 52 49 41 42 4C C5 4C 25 FC 0E | F..2VARIABL.L%.. |
| 2580 | 51 0F 58 11 85 0C 89 32 43 4F 4E 53 54 41 4E D4 | Q.X....2CONSTAN. |
| 2590 | 72 25 FC 0E 2E 0F 58 11 BF 13 A0 05 CA B1 0A 95 | r%....X......... |
| 25A0 | 00 88 C0 01 D0 F6 4C 46 08 84 32 44 55 D0 86 25 | ......LF..2DU..% |
| 25B0 | B2 25 A9 04 86 0E 18 65 0E A8 CA 88 B9 00 00 95 | .%.....e........ |
| 25C0 | 00 C4 0E D0 F5 4C 46 08 82 32 C0 A9 25 CF 25 A0 | .....LF..2..%.%. |
| 25D0 | 03 B5 00 85 10 B5 01 85 11 E8 E8 CA B1 10 95 00 | ................ |
| 25E0 | 88 10 F8 4C 46 08 82 32 A1 C8 25 ED 25 A9 04 85 | ...LF..2..%.%... |
| 25F0 | 12 B5 00 85 10 B5 01 85 11 E8 E8 B5 00 91 10 E8 | ................ |

| Address | Hexadecimal | ASCII |
|---|---|---|
| 2600 | C8 C4 12 D0 F6 4C 46 08 85 32 53 57 41 D0 E6 25 | .....LF..2SWA..% |
| 2610 | 12 26 A9 04 86 0E 18 65 0E A8 84 10 B5 00 48 B9 | .&.....e......H. |
| 2620 | 00 00 95 00 68 99 00 00 E8 C8 E4 10 D0 EE A6 0E | ....h........... |
| 2630 | 4C 46 08 85 32 4F 56 45 D2 08 26 3D 26 A9 04 85 | LF..2OVE..&=&... |
| 2640 | 10 8A 18 65 10 85 0E 65 10 A8 CA 88 B9 00 00 95 | ...e...e........ |
| 2650 | 00 C4 0E D0 F5 4C 46 08 84 32 52 4F D4 33 26 61 | .....LF..2RO.3&a |
| 2660 | 26 A9 04 85 10 84 11 86 0E 18 65 0E AA 65 10 A8 | &.........e..e.. |
| 2670 | 88 CA B1 10 48 B9 00 00 91 10 B5 00 99 00 00 68 | ....H..........h |
| 2680 | 95 00 E4 0E D0 EA 4C 46 08 83 44 30 BC 58 26 91 | ......LF..D0.X&. |
| 2690 | 26 16 01 E8 E8 4C 06 0D 83 44 30 BD 89 26 FC 0E | &....L...D0..&.. |
| 26A0 | 12 0C E5 0C 85 0C 82 44 AD 98 26 FC 0E E1 0D A2 | .......D..&..... |
| 26B0 | 0D 85 0C 82 44 BC A6 26 FC 0E AB 26 8F 26 85 0C | ....D..&...&.&.. |
| 26C0 | 82 44 BD B3 26 FC 0E AB 26 9E 26 85 0C 82 44 BE | .D..&...&.&...D. |
| 26D0 | C0 26 FC 0E 10 26 B8 26 85 0C 83 44 3C BD CD 26 | .&...&.&...D<..& |
| 26E0 | FC 0E D2 26 FB 0C 85 0C 83 44 3E BD DA 26 FC 0E | ...&.....D)..&.. |
| 26F0 | B8 26 FB 0C 85 0C 84 54 48 52 D5 E8 26 FC 0E 14 | .&.....THR..&... |
| 2700 | 0D 33 0E 58 09 90 09 BF 1D E7 10 9F 0E AA 13 90 | .3.X............ |
| 2710 | 09 D4 23 E7 10 C3 0E F1 08 EC FF 85 0C 84 44 55 | ..#...........DU |
| 2720 | 4D D0 F6 26 FC 0E E7 10 9F 0E 08 0E 08 0E 95 13 | M..&............ |
| 2730 | F8 0D 71 0D 33 0E 58 09 8B 1F 90 09 4B 0C 9F 0F | ..q.3.X.....K... |
| 2740 | 92 23 90 09 66 08 08 71 0D 90 09 58 09 90 09 B4 | .#..f..q...X.... |
| 2750 | 0E 97 0F C4 23 F1 08 F6 FF 8F 0F F8 22 90 09 66 | ....#......."..f |
| 2760 | 08 08 71 0D 90 09 B3 1F D0 08 04 00 A6 0C 58 09 | ..q...........X. |
| 2770 | 90 09 B4 0E 66 08 7F FD 0B 4E 0E 66 08 20 C3 11 | ....f....N.f. .. |
| 2780 | D0 08 07 00 2A 0E 66 08 2E 6B 1F F1 08 E3 FF 66 | ....*.f..k.....f |
| 2790 | 08 08 21 09 A4 FF 8B 1F E7 10 C3 0E 85 0C 88 28 | ..!............( |
| 27A0 | 41 42 4F 52 54 22 A9 1D 27 FC 0E D0 08 16 00 7D | ABORT"..'......} |
| 27B0 | 11 61 0C 3C 11 19 14 2C 14 7D 11 90 09 19 14 2C | .a.<...,.}....., |
| 27C0 | 14 A3 19 90 09 B4 0E 14 0D D3 0C 71 0D C1 0C 85 | ...........q.... |
| 27D0 | 0C 84 57 4F 52 C4 9E 27 FC 0E EC 15 3C 11 85 0C | ..WOR..'....<... |
| 27E0 | C6 41 42 4F 52 54 A2 D1 27 FC 0E 4C 13 A9 27 66 | .ABORT..'..L..'f |
| 27F0 | 08 22 D8 27 B4 0E 14 0D 4C 11 85 0C 86 46 52 45 | ."."....L....FRE |
| 2800 | 45 5A C5 E0 27 FC 0E 5E 12 66 08 0C 20 10 C3 0E | EZ..'..^.f.. ... |
| 2810 | 3C 11 66 08 1E 20 10 C3 0E 3C 11 66 08 1C 20 10 | <.f.. ...<.f.. . |
| 2820 | C3 0E 80 10 9F 0E 66 08 20 20 10 C3 0E 85 0C 8A | ......f.  ...... |
| 2830 | 4E 45 57 2D 53 59 53 54 45 CD FC 27 FC 0E 4B 0C | NEW-SYSTE..'..K. |
| 2840 | 5C 10 C3 0E 2C 08 05 08 2C 08 F2 03 C3 0E 66 08 | \...,...,.....f. |
| 2850 | AD 2C 08 F4 03 DB 0E 85 0C 8A 53 41 56 45 2D 49 | .,........SAVE-I |
| 2860 | 4D 41 47 C5 2F 28 FC 0E 55 0C CC 1C C1 0C 3C 11 | MAG./(..U.....<. |
| 2870 | 2C 08 00 08 89 0D 2C 08 00 01 56 1B 14 0D 4E 0E | ,.....,...V...N. |
| 2880 | 7B 09 2C 08 E0 01 71 0D DB 0E 4E 0E 66 08 08 71 | {.,...q...N.f..q |
| 2890 | 0D 7B 09 2C 08 E7 01 71 0D DB 0E 2C 08 00 08 7B | .{.,...q...,...{ |
| 28A0 | 09 2C 08 48 01 71 0D C3 0E 66 08 0B 71 0D 66 08 | .,.H.q...f..q.f. |
| 28B0 | 10 46 1B 7B 09 2C 08 15 01 71 0D DB 0E D3 0C 2C | .F.{.,...q....., |
| 28C0 | 08 1A 01 71 0D DB 0E F6 1B 2A 1D 05 28 3C 11 2C | ...q.....*..(<., |
| 28D0 | 08 00 08 58 09 90 09 90 09 2C 08 00 08 89 0D 2C | ...X.....,....., |
| 28E0 | 08 00 04 56 1B 9F 0F 71 0D 4B 0C A1 20 2C 08 00 | ...V...q.K.. ,.. |
| 28F0 | 04 21 09 E2 FF 85 0C 84 43 4F 50 D9 59 28 FC 0E | .!......COP.Y(.. |

| Address | Hexadecimal | ASCII |
|---|---|---|
| 2900 | 3C 11 08 0E 55 0C A1 20 3C 11 33 0E 4B 0C A1 20 | <...U.. <.3.K.. |
| 2910 | 85 0C 87 42 4C 4B 43 4F 50 D9 F7 28 FC 0E C1 0C | ...BLKCOP..(.... |
| 2920 | F8 0D 89 0D 33 0E D3 0C F8 0D 71 0D 33 0E 58 09 | ....3.....q.3.X. |
| 2930 | 90 09 4E 0E D4 23 F8 0D 90 09 71 0D 4E 0E D4 23 | ..N..#....q.N.# |
| 2940 | 7D 11 FE 28 F1 08 EA FF 2A 0E 85 0C 83 4C 4F CE | }..(....*....LO. |
| 2950 | 12 29 FC 0E 2C 08 00 C1 66 08 36 C3 0E 85 0C 84 | .)..,...f.6..... |
| 2960 | 4C 4F 46 C6 4C 29 FC 0E 2C 08 F0 FD 66 08 36 C3 | LOF.L)..,...f.6. |
| 2970 | 0E 85 0C 84 46 4F 52 CD 5F 29 FC 0E 66 08 36 9F | ....FOR._)..f.6. |
| 2980 | 0E 52 29 66 08 0C 6B 1F 66 08 36 C3 0E 85 0C 86 | .R)f..k.f.6..... |
| 2990 | 4C 49 53 54 45 D2 73 29 FC 0E 14 0D 33 0E 52 29 | LISTE.s)....3.R) |
| 29A0 | 58 09 90 09 FC 23 90 09 14 0D FC 23 7A 29 B3 1F | X....#.....#z).. |
| 29B0 | D0 08 04 00 A6 0C 8F 0F 21 09 E8 FF 66 29 85 0C | ........!...f).. |
| 29C0 | 88 56 41 52 49 41 42 4C C5 8F 29 FC 0E 4B 0C 51 | .VARIABL..)..K.Q |
| 29D0 | 0F 85 0C 85 41 52 52 41 D9 C0 29 FC 0E CB 29 2C | ....ARRA..)...); |
| 29E0 | 08 FE FF 4C 11 85 0C 83 43 2F CC D3 29 57 0F 28 | ...L....C/..)W.( |
| 29F0 | 00 85 56 4C 49 53 D4 E7 29 FC 0E 66 08 80 9D 10 | ..VLIS..)..f.... |
| 2A00 | C3 0E C2 10 9F 0E 9F 0E 4E 0E 19 14 66 08 1F FD | ........N...f... |
| 2A10 | 0B 4E 0E 9D 10 9F 0E 71 0D ED 29 9F 0E 37 0D C3 | .N.....q..)..7.. |
| 2A20 | 11 E5 0C D0 08 0A 00 4B 0C 9D 10 C3 0E 8B 1F 2C | .......K......., |
| 2A30 | 14 7D 11 97 12 6E 12 9F 0E 4E 0E E5 0C B3 1F 12 | .)...n...N...... |
| 2A40 | 0C D0 08 C5 FF 2A 0E 85 0C 86 4E 45 47 41 54 C5 | .....*....NEGAT. |
| 2A50 | F1 29 FC 0E C8 0D 85 0C 87 44 4E 45 47 41 54 C5 | .).......DNEGAT. |
| 2A60 | 49 2A FC 0E E1 0D 85 0C 83 4E 4F D0 58 2A FC 0E | I*.......NO.X*.. |
| 2A70 | 85 0C C9 41 53 53 45 4D 42 4C 45 D2 68 2A 5A 19 | ...ASSEMBLE.h*Z. |
| 2A80 | 81 A0 08 30 73 19 82 58 B0 6F 19 36 0F 8E 00 82 | ...0s..X.o.6.... |
| 2A90 | 58 B1 86 2A 36 0F 90 00 82 58 B2 8F 2A 36 0F 92 | X..*6....X..*6.. |
| 2AA0 | 00 82 58 B3 98 2A 36 0F 94 00 85 58 53 41 56 C5 | ..X..*6....XSAV. |
| 2AB0 | A1 2A 36 0F 98 00 87 41 2E 50 4C 41 43 C5 AA 2A | .*6....A.PLAC..* |
| 2AC0 | 57 0F 0F 5F 86 41 2E 4D 4F 44 C5 B6 2A 57 0F 00 | W.._.A.MOD.*W.. |
| 2AD0 | 00 84 42 55 4D D0 C4 2A FC 0E 3C 11 C0 2A C3 0E | ..BUM..*..<..*.. |
| 2AE0 | 4B 0C 69 11 85 0C 83 54 41 C4 D1 2A FC 0E D8 2A | K.i....TA..*...* |
| 2AF0 | 4E 0E 2C 08 00 01 A2 11 D0 08 08 00 69 11 B1 08 | N.,.........i... |
| 2B00 | 0A 00 58 11 97 0F CD 2A 6F 0E 85 0C 88 3F 54 4F | ..X....*o....?TO |
| 2B10 | 4F 2D 42 49 C7 E6 2A FC 0E F8 0D 33 0E A2 11 E5 | O-BI..*....3.... |
| 2B20 | 0C A9 27 07 54 4F 4F 20 42 49 47 85 0C 83 54 4C | ..'.TOO BIG...TL |
| 2B30 | CE 0C 2B FC 0E D8 2A 2C 08 00 01 17 2B 69 11 85 | ..+...*,....+i.. |
| 2B40 | 0C 85 41 2E 4F 50 D3 2D 2B 57 0F 04 14 FE 0C 1C | ..A.OP.-+W...... |
| 2B50 | 18 00 10 08 FF 00 10 FF 08 18 FF FF FF FF 04 00 | ................ |
| 2B60 | FF FF 08 FF FF FF FF FF 04 FF FF 0C FF FF FF | ................ |
| 2B70 | FF 00 FF 00 10 FF 08 18 FF FF FF FF FF 04 FF 14 | ................ |
| 2B80 | 0C FF 1C FF FF 00 FF 04 14 FF 0C 1C FF FF FF 00 | ................ |
| 2B90 | FF 04 14 FE 0C 1C 18 00 10 FF FF 00 FF 10 08 FF | ................ |
| 2BA0 | FF FF FF FF FF 00 10 FF 08 FF FF FF FF FF FF 82 | ................ |
| 2BB0 | 2C D8 41 2B FC 0E 55 0C CD 2A C3 0E EC 2A 85 0C | ,.A+..U..*...*.. |
| 2BC0 | 82 2C D9 AF 2B FC 0E 8F 0F CD 2A C3 0E EC 2A 85 | .,..+.....*...*. |
| 2BD0 | 0C 82 58 A9 C0 2B FC 0E 66 08 06 CD 2A C3 0E 33 | ..X..+..f...*..3 |
| 2BE0 | 2B 85 0C 82 29 D9 D1 2B FC 0E 66 08 07 CD 2A C3 | +...)..+..f...*. |
| 2BF0 | 0E 33 2B 85 0C 82 23 C2 E3 2B FC 0E 66 08 08 CD | .3+...#..+..f... |

| Address | Hexadecimal | ASCII |
|---|---|---|
| 2C00 | 2A C3 0E 33 2B 85 0C 82 2E C1 F5 2B FC 0E 66 08 | *..3+......+..f. |
| 2C10 | 09 CD 2A C3 0E D8 2A 85 0C 84 4A 4D 50 AC 07 2C | ..*...*...JMP.., |
| 2C20 | FC 0E 66 08 4C 69 11 58 11 85 0C 85 29 4A 4D 50 | ..f.Li.X....)JMP |
| 2C30 | AC 19 2C FC 0E 66 08 6C 69 11 58 11 85 0C 84 4A | ..,..f.li.X....J |
| 2C40 | 53 52 AC 2B 2C FC 0E 66 08 20 69 11 58 11 85 0C | SR.+,..f. i.X... |
| 2C50 | 83 53 50 A9 3E 2C FC 0E 2C 08 00 01 17 2B B4 2B | .SP.).,..,...+.+ |
| 2C60 | 85 0C 83 52 50 A9 50 2C FC 0E 2C 08 00 01 17 2B | ...RP.P,..,....+ |
| 2C70 | 2C 08 01 01 71 0D B4 2B 85 0C 82 4F D0 62 2C FC | ,...q..+...O.b,. |
| 2C80 | 0E D7 13 69 11 69 11 BF 13 4C DF 13 CD 2A 9F 0E | ...i.i...L...*.. |
| 2C90 | E5 0C D0 08 06 00 33 0E EC 2A 4E 0E 14 0D B4 0E | ......3..*N..... |
| 2CA0 | CD 2A 9F 0E 71 0D 49 2B 71 0D B4 0E 4E 0E 66 08 | .*..q.I+q...N.f. |
| 2CB0 | FF E6 11 A9 27 07 49 4C 4C 45 47 41 4C 4E 0E 66 | ....'.ILLEGALN.f |
| 2CC0 | 08 FE E6 11 D0 08 0B 00 4B 0C 69 11 2A 0E 66 08 | ........K.i.*.f. |
| 2CD0 | 18 33 0E B4 0E 71 0D C0 2A 9F 0E DB 0E CD 2A 4B | .3...q..*.....*K |
| 2CE0 | 0C 33 0E C3 0E 85 0C 84 41 44 43 AC 7A 2C 89 2C | .3......ADC.z,., |
| 2CF0 | 61 00 84 41 4E 44 AC E7 2C 89 2C 21 00 84 43 4D | a..AND..,.,!..CM |
| 2D00 | 50 AC F2 2C 89 2C C1 00 84 45 4F 52 AC FD 2C 89 | P..,.,...EOR..,. |
| 2D10 | 2C 41 00 84 4C 44 41 AC 08 2D 89 2C A1 00 84 53 | ,A..LDA..-.,...S |
| 2D20 | 42 43 AC 13 2D 89 2C E1 00 84 4F 52 41 AC 1E 2D | BC..-.,...ORA..- |
| 2D30 | 89 2C 01 00 84 41 53 4C AC 29 2D 89 2C 06 0A 84 | .,...ASL.)-.,... |
| 2D40 | 4C 53 52 AC 34 2D 89 2C 46 0A 84 52 4F 4C AC 3F | LSR.4-.,F..ROL.? |
| 2D50 | 2D 89 2C 26 0A 84 52 4F 52 AC 4A 2D 89 2C 66 0A | -.,&..ROR.J-.,f. |
| 2D60 | 84 42 49 54 AC 55 2D 89 2C 24 14 84 43 50 58 AC | .BIT.U-.,$..CPX. |
| 2D70 | 60 2D 89 2C E0 1E 84 43 50 59 AC 6B 2D 89 2C C0 | `-.,...CPY.k-.,. |
| 2D80 | 1E 84 44 45 43 AC 76 2D 89 2C C6 28 84 49 4E 43 | ..DEC.v-.,.(.INC |
| 2D90 | AC 81 2D 89 2C E6 28 84 4C 44 58 AC 8C 2D 89 2C | ..-.,.(.LDX..-., |
| 2DA0 | A2 32 84 4C 44 59 AC 97 2D 89 2C A0 3C 84 53 54 | .2.LDY..-.,<.ST |
| 2DB0 | 41 AC A2 2D 89 2C 81 46 84 53 54 58 AC AD 2D 89 | A..-.,.F.STX..-. |
| 2DC0 | 2C 86 50 84 53 54 59 AC B8 2D 89 2C 84 5A 83 55 | ,.P.STY..-.,.Z.U |
| 2DD0 | 4E C9 C3 2D FC 0E D7 13 69 11 BF 13 4C DF 13 B4 | N..-....i...L... |
| 2DE0 | 0E 69 11 85 0C 84 42 52 4B AC CE 2D DC 2D 00 84 | .i....BRK..-.-.. |
| 2DF0 | 43 4C 43 AC E5 2D DC 2D 18 84 43 4C 44 AC EF 2D | CLC..-.-..CLD..- |
| 2E00 | DC 2D D8 84 43 4C 49 AC F9 2D DC 2D 58 84 43 4C | .-..CLI..-.-X.CL |
| 2E10 | 56 AC 03 2E DC 2D B8 84 44 45 58 AC 0D 2E DC 2D | V....-..DEX....- |
| 2E20 | CA 84 44 45 59 AC 17 2E DC 2D 88 84 49 4E 58 AC | ..DEY....-..INX. |
| 2E30 | 21 2E DC 2D E8 84 49 4E 59 AC 2B 2E DC 2D C8 84 | !..-..INY.+..-.. |
| 2E40 | 52 54 49 AC 35 2E DC 2D 40 84 52 54 53 AC 3F 2E | RTI.5.-@.RTS.?. |
| 2E50 | DC 2D 60 84 53 45 43 AC 49 2E DC 2D 38 84 53 45 | .-`.SEC.I..-8.SE |
| 2E60 | 44 AC 53 2E DC 2D F8 84 53 45 49 AC 5D 2E DC 2D | D.S..-..SEI.]..- |
| 2E70 | 78 84 54 41 58 AC 67 2E DC 2D AA 84 54 41 59 AC | x.TAX.g..-..TAY. |
| 2E80 | 71 2E DC 2D A8 84 54 53 58 AC 7B 2E DC 2D BA 84 | q..-..TSX.{..-.. |
| 2E90 | 4E 4F 50 AC 85 2E DC 2D EA 84 50 48 41 AC 8F 2E | NOP....-..PHA... |
| 2EA0 | DC 2D 48 84 50 48 50 AC 99 2E DC 2D 08 84 50 4C | .-H.PHP....-..PL |
| 2EB0 | 41 AC A3 2E DC 2D 68 84 50 4C 50 AC AD 2E DC 2D | A....-h.PLP....- |
| 2EC0 | 28 84 54 58 41 AC B7 2E DC 2D 8A 84 54 58 53 AC | (.TXA....-..TXS. |
| 2ED0 | C1 2E DC 2D 9A 84 54 59 41 AC CB 2E DC 2D 98 82 | ...-..TYA....-.. |
| 2EE0 | 4D C9 D5 2E 36 0F 10 00 82 50 CC DF 2E 36 0F 30 | M...6....P...6.0 |
| 2EF0 | 00 82 56 D3 E8 2E 36 0F 50 00 82 56 43 A0 F1 2E | ..V...6.P..VC... |

| Address | Hexadecimal | ASCII |
|---|---|---|
| 2F00 | 36 0F 70 00 82 43 D3 FA 2E 36 0F 90 00 82 4E C3 | 6.p..C...6....N. |
| 2F10 | 04 2F 36 0F B0 00 82 45 D1 0D 2F 36 0F D0 00 82 | ./6....E../6.... |
| 2F20 | 4E C5 16 2F 36 0F F0 00 86 42 45 47 49 4E AC 1F | N../6....BEGIN.. |
| 2F30 | 2F FC 0E 3C 11 85 0C 86 55 4E 54 49 4C AC 28 2F | /..<....UNTIL.(/ |
| 2F40 | FC 0E 69 11 3C 11 14 0D 89 0D 69 11 85 0C 83 49 | ..i.<.....i....I |
| 2F50 | 46 AC 37 2F FC 0E 69 11 3C 11 4B 0C 69 11 85 0C | F.7/..i.<.K.i... |
| 2F60 | 85 54 48 45 4E AC 4E 2F FC 0E 3C 11 F8 0D 14 0D | .THEN.N/..<..... |
| 2F70 | 89 0D 33 0E DB 0E 85 0C 85 45 4C 53 45 AC 60 2F | ..3......ELSE.`/ |
| 2F80 | FC 0E 14 2E 66 08 50 58 11 3C 11 F8 0D 14 0D 89 | ....f.PX.<...... |
| 2F90 | 0D 33 0E DB 0E 3C 11 37 0D 85 0C 87 52 45 50 45 | .3...<.7....REPE |
| 2FA0 | 41 54 AC 78 2F FC 0E 2C 08 B8 50 58 11 3C 11 14 | AT.x/..,.PX.<.. |
| 2FB0 | 0D 89 0D 69 11 3C 11 F8 0D 14 0D 89 0D 33 0E DB | ...i.<.......3.. |
| 2FC0 | 0E 85 0C 86 41 47 41 49 4E AC 9B 2F FC 0E 14 2E | ....AGAIN../.... |
| 2FD0 | F6 2E 40 2F 85 0C 86 45 4E 44 49 46 AC C3 2F FC | ..@/...ENDIF../. |
| 2FE0 | 0E 68 2F 85 0C 86 57 48 49 4C 45 AC D6 2F FC 0E | .h/...WHILE../.. |
| 2FF0 | 54 2F 33 0E 85 0C 85 4E 45 58 54 AC E5 2F FC 0E | T/3....NEXT../.. |
| 3000 | 2C 08 46 08 20 2C 85 0C 84 50 4F 50 AC F6 2F FC | ,.F. ,...POP../. |
| 3010 | 0E 4B 0C 56 2C 1A 2D 4E 0E B4 2D 32 2E 4B 0C 56 | .K.V,.-N..-2.K.V |
| 3020 | 2C 1A 2D 14 0D B4 2D 32 2E 85 0C 84 43 4F 44 C5 | ,.-...-2....COD. |
| 3030 | 72 2A FC 0E 7E 2A B0 17 CD 2A 4B 0C 33 0E C3 0E | r*..~*...*K.3... |
| 3040 | 84 13 85 0C 84 53 57 41 C2 2B 30 4D 30 B5 00 48 | .....SWA.+0M0..H |
| 3050 | B5 01 95 00 68 95 01 4C 46 08 83 4B 45 D9 44 30 | ....h..LF..KE.D0 |
| 3060 | 62 30 A4 24 B1 28 48 29 3F 09 40 91 28 68 2C 00 | b0.$.(H)?.@.(h,. |
| 3070 | C0 10 FB 91 28 AD 00 C0 29 7F 8D 10 C0 D0 02 A9 | ....(...)....... |
| 3080 | 5C C9 1D D0 02 A9 5B C9 1E D0 02 A9 5F CA CA 95 | \.....[....._... |
| 3090 | 00 A9 00 95 01 4C 46 08 86 2D 43 4D 4F 56 C5 5A | .....LF..-CMOV.Z |
| 30A0 | 30 A3 30 18 B5 01 85 92 75 05 85 8F 18 B5 03 65 | 0.0.....u......e |
| 30B0 | 92 85 91 B5 04 85 8E B5 02 85 90 B5 00 F0 0F A8 | ................ |
| 30C0 | 88 F0 07 B1 8E 91 90 88 D0 F9 B1 8E 91 90 A5 92 | ................ |
| 30D0 | F0 15 A0 FF C6 8F C6 91 B1 8E 91 90 88 D0 F9 B1 | ................ |
| 30E0 | 8E 91 90 C6 92 D0 EB 18 8A 69 06 AA 4C 46 08 84 | .........i..LF.. |
| 30F0 | 42 4F 4F D4 98 30 F8 30 4C 00 C6 C6 45 44 49 54 | BOO..0.0L...EDIT |
| 3100 | 4F D2 EF 30 5A 19 81 A0 13 35 84 2A 85 50 4F 53 | O..0Z....5.*.POS |
| 3110 | 49 D4 6F 19 16 31 B5 00 85 25 B5 02 85 24 E8 E8 | I.o..1...%...$.. |
| 3120 | E8 E8 20 22 FC 4C 46 08 85 42 2F 53 43 D2 0C 31 | .. ".LF..B/SC..1 |
| 3130 | 57 0F C0 03 86 53 43 52 45 45 CE 28 31 3F 31 B5 | W....SCREE.(1?1. |
| 3140 | 00 85 8E E8 B5 00 85 8F E8 86 98 A9 00 85 90 48 | ...............H |
| 3150 | A9 04 85 91 A2 08 A0 00 B1 8E 49 80 91 90 C8 C0 | ..........I..... |
| 3160 | 28 D0 F5 18 A5 90 69 80 85 90 90 02 E6 91 18 A5 | (.....i......... |
| 3170 | 8E 69 28 85 8E 90 02 E6 8F CA D0 DA 68 18 69 28 | .i(.........h.i( |
| 3180 | C9 78 D0 C9 A6 98 4C 46 08 83 52 23 B0 34 31 57 | .x....LF..R#.41W |
| 3190 | 0F E2 97 83 52 23 CC 89 31 57 0F A2 9B 86 43 55 | ....R#..1W....CU |
| 31A0 | 52 53 4F D2 93 31 FC 0E 4E 0E 8F 31 9F 0E 71 0D | RSO..1..N..1..q. |
| 31B0 | 0E 11 C3 0E ED 29 9F 0E 46 1B 14 31 85 0C 84 48 | .....)..F..1...H |
| 31C0 | 4F 4D C5 9D 31 FC 0E 4B 0C A6 31 85 0C 84 3C 46 | OM..1..K..1...<F |
| 31D0 | 53 BE BE 31 FC 0E 0E 11 9F 0E 14 0D 4E 0E 99 31 | S..1........N..1 |
| 31E0 | 9F 0E E6 11 D0 08 04 00 37 0D 8F 31 9F 0E 89 0D | ........7..1.... |
| 31F0 | A6 31 85 0C 84 3C 42 53 BE CD 31 FC 0E 0E 11 9F | .1...<BS..1..... |

| Address | Hexadecimal | ASCII |
|---|---|---|
| 3200 | 0E 37 0D 8F 31 9F 0E E9 1A 8F 31 9F 0E 89 0D A6 | .7..1.....1..... |
| 3210 | 31 85 0C 84 3C 55 50 BE F4 31 FC 0E 0E 11 9F 0E | 1...<UP..1...... |
| 3220 | ED 29 9F 0E 89 0D 4E 0E 8F 31 9F 0E A2 11 D0 08 | .)....N..1...... |
| 3230 | 08 00 ED 29 9F 0E 71 0D 8F 31 9F 0E 89 0D A6 31 | ...)..q..1.....1 |
| 3240 | 85 0C 84 3C 4C 46 BE 13 32 FC 0E 0E 11 9F 0E ED | ...<LF..2....... |
| 3250 | 29 9F 0E 71 0D 4E 0E 99 31 9F 0E A2 11 E5 0C D0 | )..q.N..1....... |
| 3260 | 08 08 00 ED 29 9F 0E 89 0D 8F 31 9F 0E 89 0D A6 | ....)......1..... |
| 3270 | 31 85 0C 84 3C 43 52 BE 42 32 FC 0E 0E 11 9F 0E | 1...<CR.B2...... |
| 3280 | 8F 31 9F 0E 89 0D ED 29 9F 0E A7 1B 52 2A 0E 11 | .1.....).....R*.. |
| 3290 | 6F 0E 49 32 85 0C 86 3C 45 4D 49 54 BE 73 32 FC | o.I2...<EMIT.s2. |
| 32A0 | 0E 4E 0E 0E 11 9F 0E DB 0E 66 08 80 28 0C 66 08 | .N.......f..(.f. |
| 32B0 | 28 9F 0E 66 08 24 B4 0E 71 0D DB 0E D4 31 85 0C | (..f.$..q....1.. |
| 32C0 | 83 45 4F CC 96 32 FC 0E 0E 11 9F 0E 4E 0E 8F 31 | .EO..2......N..1 |
| 32D0 | 9F 0E 89 0D ED 29 9F 0E A7 1B 89 0D ED 29 9F 0E | .....)......)... |
| 32E0 | 71 0D 85 0C 84 3C 49 43 BE C0 32 FC 0E 0E 11 9F | q....<IC..2..... |
| 32F0 | 0E 4E 0E 14 0D C6 32 F8 0D 89 0D A1 30 0E 11 9F | .N....2.....0... |
| 3300 | 0E DB 0E 8F 31 9F 0E 3D 31 85 0C 84 3C 44 43 BE | ....1..=1...<DC. |
| 3310 | E4 32 FC 0E 0E 11 9F 0E 4E 0E 14 0D 33 0E C6 32 | .2......N...3..2 |
| 3320 | F8 0D 89 0D E9 0A B1 0F C6 32 37 0D DB 0E 8F 31 | .........27....1 |
| 3330 | 9F 0E 3D 31 85 0C 84 3C 49 4C BE 0B 33 FC 0E C6 | ..=1...<IL..3... |
| 3340 | 32 4E 0E ED 29 9F 0E 89 0D 4E 0E C1 0C 33 0E 99 | 2N..)....N...3.. |
| 3350 | 31 9F 0E F8 0D 89 0D A1 30 D3 0C ED 29 9F 0E B5 | 1.......0...)... |
| 3360 | 15 8F 31 9F 0E 3D 31 85 0C 84 3C 44 4C BE 36 33 | ..1..=1...<DL.63 |
| 3370 | FC 0E C6 32 4E 0E ED 29 9F 0E 89 0D F8 0D 99 31 | ...2N..)........1 |
| 3380 | 9F 0E 33 0E 89 0D E9 0A 99 31 9F 0E ED 29 9F 0E | ..3......1...).. |
| 3390 | 89 0D ED 29 9F 0E B5 15 8F 31 9F 0E 3D 31 85 0C | ...)....1..=1... |
| 33A0 | 85 3C 53 41 56 BE 69 33 FC 0E F6 1B 2A 1D 85 0C | .<SAV.i3....*... |
| 33B0 | 85 3C 42 53 44 BE A0 33 FC 0E FB 31 B1 0F 9F 32 | .<BSD..3...1...2 |
| 33C0 | FB 31 85 0C 84 43 45 4F CC B0 33 FC 0E 0E 11 9F | .1...CEO..3..... |
| 33D0 | 0E C6 32 F8 0D 89 0D B5 15 8F 31 9F 0E 3D 31 85 | ..2......1..=1.. |
| 33E0 | 0C 85 3C 52 45 53 BE C4 33 FC 0E 8F 31 9F 0E A7 | ..<RES..3...1... |
| 33F0 | 10 9F 0E 55 0C A1 20 8F 31 9F 0E 3D 31 85 0C 86 | ...U.. .1..=1... |
| 3400 | 45 2E 4D 4F 44 C5 E1 33 57 0F 00 00 85 3C 49 4E | E.MOD..3W....<IN |
| 3410 | 53 BE FF 33 FC 0E 08 34 55 0C 33 0E C3 0E 85 0C | S..3...4U.3..... |
| 3420 | 86 3C 4E 49 4E 53 BE 0C 34 FC 0E 08 34 4B 0C 33 | .<NINS..4...4K.3 |
| 3430 | 0E C3 0E 85 0C 84 3C 52 54 BE 20 34 FC 0E C6 32 | ......<RT. 4...2 |
| 3440 | 37 0D 4E 0E B4 0E 66 08 20 E6 11 E5 0C F8 0D 0E | 7.N...f. ....... |
| 3450 | 11 9F 0E E6 11 12 0C D0 08 E7 FF 14 0D 8F 31 9F | ..............1. |
| 3460 | 0E 89 0D A6 31 85 0C 86 45 2E 49 4E 49 D4 35 34 | ....1...E.INI.54 |
| 3470 | FC 0E 4E 0E A7 10 C3 0E 29 34 CC 1C 4E 0E 8F 31 | ..N.....)4..N..1 |
| 3480 | C3 0E 4E 0E 3D 31 30 31 9F 0E 71 0D 99 31 C3 0E | ..N.=101..q..1.. |
| 3490 | A7 10 9F 0E 4B 0C 2C 08 F8 07 18 11 C3 0E 7A 23 | ....K.,.......z# |
| 34A0 | 24 23 75 09 4B 0C A6 31 85 0C 84 3C 4E 58 BE 67 | s#u.K..1...<NX.g |
| 34B0 | 34 FC 0E A7 10 9F 0E 14 0D 70 34 85 0C 84 3C 50 | 4........p4...<P |
| 34C0 | 52 BE AA 34 FC 0E A7 10 9F 0E 37 0D 70 34 85 0C | R..4......7.p4.. |
| 34D0 | 85 3C 45 52 52 BE BD 34 FC 0E 24 11 9F 0E A7 10 | .<ERR..4..$..... |
| 34E0 | 9F 0E CC 1C 89 0D 30 31 9F 0E D1 1A A6 31 85 0C | ......01.....1.. |
| 34F0 | 84 3C 43 4C BE D0 34 FC 0E 0E 11 9F 0E 8F 31 9F | .<CL..4.......1. |

| Address | Hexadecimal | ASCII |
|---|---|---|
| 3500 | 0E DF 0F 71 0D F8 0D 89 0D B5 15 8F 31 9F 0E 3D | ...q........1..= |
| 3510 | 31 85 0C 84 4B 45 59 D3 F0 34 57 0F 6E 2A FB 31 | 1...KEY..4W.n*.1 |
| 3520 | 3D 33 6E 2A 12 33 6E 2A 6E 2A 6E 2A B8 33 14 34 | =3n*.3n*n*n*.3.4 |
| 3530 | 6E 2A 70 33 CB 33 7A 32 B1 34 E9 33 A8 33 C5 31 | n*p3.3z2.4.3.3.1 |
| 3540 | C4 34 D4 31 6E 2A 3C 34 F7 34 1A 32 D8 34 29 34 | .4.1n*<4.4.2.4)4 |
| 3550 | 49 32 84 45 44 49 D4 FB 30 FC 0E 70 34 60 30 4E | I2.EDI..0..p4`0N |
| 3560 | 0E 66 08 1B E6 11 E5 0C D0 08 31 00 4E 0E 66 08 | .f........1.N.f. |
| 3570 | 1C C3 11 D0 08 10 00 56 0D 1A 35 71 DD 9F 0E 8A | .......V..5q.... |
| 3580 | 08 B1 08 14 00 08 34 9F 0E D0 08 0A 00 EB 32 D4 | ......4.......2. |
| 3590 | 31 B1 08 04 00 9F 32 B1 08 C4 FF 2A 0E 2C 08 00 | 1.....2....*.,.. |
| 35A0 | 04 2C 08 00 04 66 08 A0 10 0B 4B 0C 4B 0C 14 31 | .,...f....K.K..1 |
| 35B0 | 85 0C 85 52 45 44 49 D4 52 35 FC 0E A7 10 9F 0E | ...REDI.R5...... |
| 35C0 | 59 35 85 0C 85 45 52 52 45 C4 B2 35 FC 0E 31 11 | Y5...ERRE..5..1. |
| 35D0 | 9F 0E 59 35 85 0C 83 52 41 CD C4 35 36 0F 00 68 | ..Y5...RA..56..h |
| 35E0 | 83 45 4F D6 D6 35 36 0F 00 B7 86 57 49 4E 44 4F | .EO..56....WINDO |
| 35F0 | D7 E0 35 36 0F 00 68 83 42 4F D3 EA 35 36 0F 62 | ..56..h.BO..56.b |
| 3600 | 68 83 45 4F D3 F7 35 36 0F 64 68 84 43 4C 49 CE | h.EO..56.dh.CLI. |
| 3610 | 01 36 36 0F 66 68 84 4F 4C 49 CE 0B 36 36 0F 67 | .66.fh.OLI..66.g |
| 3620 | 68 83 42 4F D4 16 36 36 0F 68 68 84 42 45 4F D4 | h.BO..66.hh.BEO. |
| 3630 | 21 36 36 0F 6A 68 83 45 4F D4 2B 36 36 0F 6C 68 | !66.jh.EO.+66.lh |
| 3640 | 87 57 52 41 50 41 44 D2 36 36 0F 6E 68 85 50 | .WRAPAD.666.nh.P |
| 3650 | 46 4C 41 C7 40 36 36 0F 70 68 83 50 43 D4 4E 36 | FLA.@66.ph.PC.N6 |
| 3660 | 36 0F 71 68 83 4C 43 D4 5A 36 36 0F 73 68 84 4C | 6.qh.LC.Z66.sh.L |
| 3670 | 4D 41 D8 64 36 36 0F 75 68 84 44 45 4F D3 6E 36 | MA.d66.uh.DEO.n6 |
| 3680 | 36 0F 76 68 84 44 42 4F D3 79 36 36 0F 78 68 86 | 6.vh.DBO.y66.xh. |
| 3690 | 50 46 4F 52 4D D4 84 36 36 0F 7A 68 84 43 55 52 | PFORM..66.zh.CUR |
| 36A0 | D2 8F 36 36 0F 80 68 84 50 41 54 D4 9C 36 36 0F | ..66..h.PAT..66. |
| 36B0 | D1 68 84 56 45 43 D4 A7 36 36 0F 20 69 83 2E 4C | .h.VEC..66. i..L |
| 36C0 | C6 B2 36 36 0F 22 69 86 57 52 41 50 43 D4 BD 36 | ..66."i.WRAPC..6 |
| 36D0 | 36 0F 23 69 83 2E 42 CC C7 36 36 0F 24 69 83 2E | 6.#i..B..66.$i.. |
| 36E0 | 4C D0 D4 36 36 0F 25 69 83 51 49 CE DE 36 36 0F | L..66.%i.QI..66. |
| 36F0 | 40 69 84 51 4F 55 D4 E8 36 36 0F 41 69 83 50 47 | @i.QOU..66.Ai.PG |
| 3700 | D3 F2 36 36 0F 42 69 85 4C 49 4E 45 D3 FD 36 36 | ..66.Bi.LINE..66 |
| 3710 | 0F 43 69 83 42 4F D7 07 37 36 0F 45 69 84 4C 43 | .Ci.BO..76.Ei.LC |
| 3720 | 54 D2 13 37 36 0F 47 69 86 4C 52 46 4C 41 C7 1D | T..76.Gi.LRFLA.. |
| 3730 | 37 36 0F 49 69 84 4C 52 41 D9 28 37 36 0F 4B 69 | 76.Ii.LRA.(76.Ki |
| 3740 | 85 45 46 4C 41 C7 35 37 36 0F 51 69 86 46 4E 44 | .EFLA.576.Qi.FND |
| 3750 | 4C 49 CE 40 37 36 0F 52 69 86 46 4E 44 50 4F D3 | LI.@76.Ri.FNDPO. |
| 3760 | 4C 37 36 0F 53 69 85 58 46 4C 41 C7 59 37 36 0F | L76.Si.XFLA.Y76. |
| 3770 | 55 69 86 4E 55 46 4C 41 C7 66 37 36 0F 56 69 85 | Ui.NUFLA.f76.Vi. |
| 3780 | 4F 4C 44 45 A3 72 37 36 0F 58 69 83 42 4F C3 7F | OLDE.r76.Xi.BO.■ |
| 3790 | 37 36 0F 5A 69 83 45 4F C3 8B 37 36 0F 5C 69 83 | 76.Zi.EO..76.\i. |
| 37A0 | 4C 54 A3 95 37 36 0F 68 69 83 52 54 A3 9F 37 36 | LT..76.hi.RT..76 |
| 37B0 | 0F 6A 69 85 4C 44 45 4F D3 A9 37 36 0F 6C 69 85 | .ji.LDEO..76.li. |
| 37C0 | 52 44 45 4F D3 B3 37 36 0F 6E 69 85 4F 4C 44 42 | RDEO..76.ni.OLDB |
| 37D0 | A3 BF 37 36 0F 70 69 82 45 A3 CB 37 36 0F 74 69 | ..76.pi.E..76.ti |
| 37E0 | 82 42 A3 D7 37 36 0F 76 69 84 42 59 54 C5 E0 37 | .B..76.vi.BYT..7 |
| 37F0 | 36 0F 78 69 82 43 D4 E9 37 36 0F 7A 69 84 52 45 | 6.xi.C..76.zi.RE |

| Address | Hexadecimal | ASCII |
|---|---|---|
| 3800 | 54 CE F4 37 36 0F 7C 69 87 52 45 54 4E 43 48 D2 | T..76.\|i.RETNCH. |
| 3810 | FD 37 36 0F 7D 69 84 43 4F 4C A3 08 38 36 0F 7E | .76.}i.COL..86.~ |
| 3820 | 69 87 50 52 49 4E 54 45 D2 16 38 36 0F 7F 69 84 | i.PRINTE..86..i. |
| 3830 | 4F 45 4F D3 21 38 36 0F 81 69 84 58 50 4F D3 2F | OEO.!86..i.XPO./ |
| 3840 | 38 36 0F 83 69 84 59 50 4F D3 3A 38 36 0F 84 69 | 86..i.YPO.:86..i |
| 3850 | 85 58 42 41 4E CB 45 38 36 0F 85 69 88 53 41 56 | .XBAN.E86..i.SAV |
| 3860 | 45 43 48 41 D2 50 38 36 0F 86 69 83 42 4C B0 5C | ECHA.P86..i.BL.\ |
| 3870 | 38 36 0F 87 69 83 42 4C B1 6B 38 36 0F 89 69 83 | 86..i.BL.k86..i. |
| 3880 | 43 54 D2 75 38 36 0F 8B 69 84 4B 51 55 C5 7F 38 | CT.u86..i.KQU..8 |
| 3890 | 36 0F F0 69 85 50 41 47 45 D3 89 38 36 0F 00 6A | 6..i.PAGE..86..j |
| 38A0 | 85 53 41 56 45 C4 94 38 36 0F 00 6B 85 4C 4F 4D | .SAVE..86..k.LOM |
| 38B0 | 45 CD A0 38 36 0F 00 6E 83 42 4F D6 AC 38 36 0F | E..86..n.BO..86. |
| 38C0 | 00 72 87 44 45 46 41 55 4C D4 B8 38 57 0F 4C 3C | .r.DEFAUL..8W.L( |
| 38D0 | D4 4C 3A DB 00 00 FF 6C 4C 99 E1 02 00 6B 20 00 | .L:....lL....k . |
| 38E0 | E0 04 00 B7 7F 00 E0 14 00 00 FF FF 00 10 00 28 | ...............( |
| 38F0 | 00 18 00 17 00 F8 D0 07 D0 07 F8 06 00 FE FF 00 | ................ |
| 3900 | FF AA 0F 28 F0 FD 1B FD 00 00 3C 00 FF 00 00 00 | ...(......<..... |
| 3910 | 42 70 00 70 DC D8 00 B7 00 00 FF FF 8E B3 69 FF | Bp.p..........i. |
| 3920 | 55 00 00 FF 00 00 FF FF 00 00 FF FF 38 DE FF FF | U...........8... |
| 3930 | 00 00 FF FF 00 01 6E 03 6E 18 6E 18 6E 00 72 FF | ......n.n.n.n.r. |
| 3940 | 00 00 72 FF FF 00 FF FF 00 00 FF 00 08 00 FF FF | ..r............. |
| 3950 | 00 00 FF FF 00 FF FF 00 00 00 FF FF 00 03 4C FF | ..............L. |
| 3960 | 00 00 FF FF 00 00 FF 00 00 00 00 88 FF FF FF 69 | ...............i |
| 3970 | FF 00 00 D0 D1 01 00 00 00 00 00 09 00 03 6E E6 | ..............n. |
| 3980 | B8 D0 02 E6 B9 AD 05 02 C9 3A B0 0A C9 20 F0 EF | .........:... .. |
| 3990 | 38 E9 30 38 E9 D0 60 80 4F C7 52 FF 00 00 FF FF | 8.08..`.O.R..... |
| 39A0 | 00 00 FF FF 00 00 7F FF 00 00 FF FF 00 00 FF FF | ................ |
| 39B0 | 00 00 FF FF 00 00 FF FF 00 00 FF FF 00 00 FF 01 | ................ |
| 39C0 | 00 00 FF FF 00 DF 19 00 01 00 40 00 00 FF 00 00 | ..........@..... |
| 39D0 | 00 CD C1 00 00 00 00 00 D0 D2 00 FF 00 00 00 D2 | ................ |
| 39E0 | CF 02 01 00 00 00 00 00 00 00 00 00 00 00 00 00 | ................ |
| 39F0 | 82 49 D0 C2 38 36 0F 18 00 82 43 C8 F0 39 36 0F | .I..86....C..96. |
| 3A00 | 24 00 84 41 53 41 D6 F9 39 36 0F FB 00 84 50 53 | $..ASA..96....PS |
| 3A10 | 41 D6 02 3A 36 0F FC 00 84 58 53 41 D6 0D 3A 36 | A..:6....XSA..:6 |
| 3A20 | 0F FD 00 84 59 53 41 D6 18 3A 36 0F FE 00 84 53 | ....YSA..:6....S |
| 3A30 | 53 41 D6 23 3A 36 0F FF 00 83 46 3E C2 2E 3A 41 | SA.#:6....F)..:A |
| 3A40 | 3A 86 62 84 63 BA 86 64 A2 00 B5 00 9D 00 6C BD | :.b.c..d......l. |
| 3A50 | 00 6B 95 00 E8 D0 F3 A2 C0 BD 00 01 9D 80 6C BD | .k............l. |
| 3A60 | 40 6C 9D 00 01 E8 D0 F1 A6 FF 9A AD 7C 69 10 07 | @l..........\|i.. |
| 3A70 | A2 FF A0 01 4C 44 D4 A9 FF 8D 7C 69 A6 FD A4 FE | ....LD....\|i.... |
| 3A80 | A5 FC 48 A5 FB 28 60 83 42 3E C6 39 3A 8F 3A 08 | ..H..(`.B).9:.:. |
| 3A90 | 85 FB 68 85 FC 86 FD 84 FE BA 86 FF A2 00 B5 00 | ..h............. |
| 3AA0 | 9D 00 6B BD 00 6C 95 00 E8 D0 F3 A2 C0 BD 00 01 | ..k..l.......... |
| 3AB0 | 9D 40 6C BD 80 6C 9D 00 01 E8 D0 F1 A6 64 9A A4 | .@l..l.......d.. |
| 3AC0 | 63 A6 62 4C 46 08 84 43 48 3E C6 87 3A CF 3A 29 | c.bLF..CH)..:.:) |
| 3AD0 | 7F 8D 7D 69 38 A5 24 ED 7E 69 8D 7C 69 AD 7D 69 | ..}i8.$.~i.\|i.}i |
| 3AE0 | C9 0D D0 0A A9 00 85 24 8D 7E 69 B8 50 07 E6 24 | .......$.~i.P..$ |
| 3AF0 | A5 24 8D 7E 69 AD 7D 69 4C 8F 3A 8A 49 4E 49 54 | .$.~i.}iL.:.INIT |

| Address | Hexadecimal | ASCII |
|---|---|---|
| 3B00 | 2D 42 41 53 49 C3 C6 3A FC 0E CC 38 A8 38 2C 08 | -BASI..:...8.8,. |
| 3B10 | 00 01 E9 0A CC 38 2C 08 00 01 71 0D B4 38 66 08 | .....8,...q..8f. |
| 3B20 | 50 E9 0A 85 0C 87 44 49 53 50 4C 41 D9 FB 3A 57 | P.....DISPLA..:W |
| 3B30 | 0F 00 04 80 04 00 05 80 05 00 06 80 06 00 07 80 | ................ |
| 3B40 | 07 28 04 A8 04 28 05 A8 05 28 06 A8 06 28 07 A8 | .(...(...(...(.. |
| 3B50 | 07 50 04 D0 04 50 05 D0 05 50 06 D0 06 50 07 D0 | .P...P...P...P.. |
| 3B60 | 07 86 4F 4E 2F 4F 46 C6 25 3B 6C 3B AD 84 69 C9 | ..ON/OF.%;l;..i. |
| 3B70 | 18 90 07 A9 28 8D 83 69 A9 17 0A A8 B9 31 3B 85 | ....(..i.....1;. |
| 3B80 | 8E B9 32 3B 85 8F AD 19 C0 30 FB AC 83 69 AD 85 | ..2;.....0...i.. |
| 3B90 | 69 D0 09 8D 01 C0 8D 55 C0 B8 50 06 8D 00 C0 8D | i......U..P..... |
| 3BA0 | 54 C0 60 82 4F CE 61 3B AA 3B 20 6C 3B B1 8E 8D | T.`.O.a;.; l;... |
| 3BB0 | 86 69 A9 FF 91 8E 8D 00 C0 8D 54 C0 4C 46 08 83 | .i........T.LF.. |
| 3BC0 | 4F 46 C6 A3 3B C7 3B 20 6C 3B AD 86 69 91 8E 8D | OF..;.; l;..i... |
| 3BD0 | 00 C0 8D 54 C0 4C 46 08 86 3F 42 4C 49 4E CB BF | ...T.LF..?BLIN.. |
| 3BE0 | 3B FC 0E A8 0F 85 38 6F 0E 85 38 9F 0E D0 08 16 | ;.....8o..8..... |
| 3BF0 | 00 85 38 9F 0E 7B 38 9F 0E E6 11 D0 08 04 00 C5 | ..8..{8......... |
| 3C00 | 3B B1 08 0C 00 A8 3B 71 38 9F 0E 85 38 C3 0E 85 | ;.....;q8...8... |
| 3C10 | 0C 84 3C 43 52 BE D8 3B FC 0E 66 08 0D 6B 1F 85 | ..<CR..;..f..k.. |
| 3C20 | 0C 84 55 4D 41 D8 11 3C FC 0E B0 25 A2 11 D0 08 | ..UMA..<...%.... |
| 3C30 | 04 00 33 0E 2A 0E 85 0C 84 55 4D 49 CE 21 3C FC | ..3.*....UMI.!<. |
| 3C40 | 0E B0 25 A2 11 D0 08 08 00 2A 0E B1 08 06 00 33 | ..%......*.....3 |
| 3C50 | 0E 2A 0E 85 0C 84 42 45 45 D0 38 3C FC 0E 2C 08 | .*....BEE.8<..,. |
| 3C60 | AA 01 4B 0C 58 09 55 0C 55 0C A4 0B 2C 08 30 C0 | ..K.X.U.U...,.0. |
| 3C70 | DB 0E F1 08 F2 FF 85 0C 84 45 58 49 D4 55 3C FC | .........EXI.U<. |
| 3C80 | 0E D3 0C 2A 0E 85 0C 84 58 4C 41 D4 78 3C 57 0F | ...*....XLA.x<W. |
| 3C90 | 01 04 02 00 00 00 00 00 0B 00 00 00 0D 00 00 | ................ |
| 3CA0 | 08 00 05 00 00 00 00 00 07 00 0C 06 03 00 00 | ................ |
| 3CB0 | 85 3C 51 55 45 BE 87 3C BA 3C C9 FF 69 00 29 7F | .<QUE..<.<..i.). |
| 3CC0 | C9 20 B0 04 A8 B9 90 3C AC 40 69 99 F0 69 88 10 | . .....<.@i..i.. |
| 3CD0 | 02 A0 04 8C 40 69 8D 10 C0 60 83 51 55 C5 B0 3C | ....@i...`.QU..< |
| 3CE0 | E2 3C AD 00 C0 10 03 20 BA 3C 4C 46 08 83 3C 51 | .<..... .<LF..<Q |
| 3CF0 | BE DA 3C F5 3C AD 00 C0 10 07 C9 83 F0 03 20 BA | ..<.<......... . |
| 3D00 | 3C CA CA A9 00 95 01 95 00 AC 41 69 CC 40 69 60 | <.........Ai.@i` |
| 3D10 | 82 40 CB ED 3C 17 3D CA CA AC 41 69 B9 F0 69 88 | .@..<.=...Ai..i. |
| 3D20 | 10 02 A0 04 8C 41 69 95 00 A9 00 95 01 4C 46 08 | .....Ai......LF. |
| 3D30 | 84 3F 41 53 C3 10 3D 39 3D 20 F5 3C F0 11 B9 F0 | .?AS..=9= .<.... |
| 3D40 | 69 C9 0B 90 04 A0 01 94 00 C9 01 D0 02 95 00 4C | i..............L |
| 3D50 | 46 08 82 3F CB 30 3D 59 3D 20 F5 3C F0 04 A9 01 | F..?.0=Y= .<.... |
| 3D60 | 95 00 4C 46 08 84 3F 44 55 D0 52 3D FC 0E 5F 0E | ..LF..?DU.R=.._. |
| 3D70 | 85 0C 84 4E 4F 4F D0 65 3D FC 0E 85 0C 82 58 B4 | ...NOO.e=.....X. |
| 3D80 | 72 3D 36 0F 96 00 82 58 B5 7D 3D 36 0F 9A 00 85 | r=6....X.}=6.... |
| 3D90 | 59 53 41 56 C5 86 3D 36 0F 9C 00 84 53 49 5A C5 | YSAV..=6....SIZ. |
| 3DA0 | 8F 3D 36 0F 50 00 87 52 45 56 45 52 53 C5 9B 3D | .=6.P..REVERS..= |
| 3DB0 | B2 3D B5 00 85 8E B5 01 85 8F B5 02 85 90 B5 03 | .=.............. |
| 3DC0 | 85 91 E8 E8 E8 E8 86 98 A2 00 A5 8F C9 02 90 52 | ...............R |
| 3DD0 | C6 8F 18 A5 90 65 8E 85 92 A5 91 65 8F 85 93 C6 | .....e.....e.... |
| 3DE0 | 8F A0 FF B1 90 85 94 A1 92 91 90 A5 94 81 92 88 | ................ |
| 3DF0 | E6 92 D0 EF E6 93 C0 FF F0 23 C0 00 F0 11 B1 90 | .........#...... |

| Address | Hexadecimal | ASCII |
|---|---|---|
| 3E00 | 85 94 A1 92 91 90 A5 94 81 92 E6 92 88 D0 EF B1 | ................ |
| 3E10 | 90 85 94 A1 92 91 90 91 90 A5 94 81 92 E6 91 B8 | ................ |
| 3E20 | 50 A8 A5 8E 4A 18 A4 8F F0 02 69 80 A8 65 90 85 | P...J.....i..e.. |
| 3E30 | 92 A9 00 65 91 85 93 46 8E 90 06 E6 92 D0 02 E6 | ...e...F........ |
| 3E40 | 93 88 C0 FF F0 15 B1 90 85 94 A1 92 91 90 A5 94 | ................ |
| 3E50 | 81 92 E6 92 D0 02 E6 93 B8 50 E6 A6 98 4C 46 08 | .........P...LF. |
| 3E60 | 84 46 4C 49 D0 A6 3D FC 0E 08 0E C1 0C B0 25 71 | .FLI..=.......%q |
| 3E70 | 0D 90 09 33 0E B0 3D 90 09 F8 0D B0 3D D3 0C 71 | ...3..=.....=..q |
| 3E80 | 0D 33 0E B0 3D 85 0C 89 46 4C 49 50 2F 54 52 49 | .3..=...FLIP/TRI |
| 3E90 | CD 60 3E EC 0E B0 25 33 0E C1 0C C1 0C 71 0D 71 | .`>...%3.....q.q |
| 3EA0 | 0D F8 0D C1 0C B0 3D D3 0C 4E 0E 90 09 B0 3D D3 | ......=..N....=. |
| 3EB0 | 0C 71 0D D3 0C B0 3D 85 0C 83 43 4C D2 87 3E C1 | .q....=...CL..>. |
| 3EC0 | 3E 86 98 A2 2E BD 31 3B 85 8E BD 32 3B 85 8F A0 | >.....1;...2;... |
| 3ED0 | 27 A9 A0 8D 01 C0 8D 55 C0 91 8E 88 10 FB 8D 00 | '......U........ |
| 3EE0 | C0 8D 54 C0 A0 27 91 8E 88 10 FB CA CA 10 D6 A6 | ..T..'.......... |
| 3EF0 | 98 4C 46 08 85 4D 41 54 43 C8 B9 3E FE 3E 84 94 | .LF..MATC..>.>.. |
| 3F00 | 98 18 6D D1 68 A8 AE D1 68 88 CA 30 2B BD D2 68 | ..m.h...h..0+..h |
| 3F10 | C9 61 90 1A C9 7B 90 0A D1 8E F0 03 A4 94 60 B8 | .a...{........`. |
| 3F20 | 50 09 51 8E 29 DF F0 03 A4 94 60 B8 50 07 D1 8E | P.Q.).....`.P... |
| 3F30 | F0 03 A4 94 60 B8 50 D1 68 68 A6 98 18 A5 94 65 | ....`.P.hh.....e |
| 3F40 | 8E 95 00 A9 00 65 8F 95 01 4C 46 08 85 53 45 45 | .....e...LF..SEE |
| 3F50 | 4B BE F4 3E 56 3F 38 B5 02 85 8E F5 00 85 9A B5 | K..>V?8......... |
| 3F60 | 03 85 8F F5 01 85 9B E8 E8 A9 00 95 00 95 01 90 | ................ |
| 3F70 | 03 4C 46 08 86 98 38 A9 00 E5 9A 85 9A A9 00 E5 | .LF...8......... |
| 3F80 | 9B 85 9B AD D2 68 29 DF 85 90 AD D3 68 29 DF 85 | .....h).....h).. |
| 3F90 | 92 A5 9A C9 90 A5 9B E9 00 90 60 AC D1 68 88 D0 | ..........`..h.. |
| 3FA0 | 11 B1 8E 29 DF C5 90 D0 03 20 FE 3E C8 10 F2 B8 | ...)......>..... |
| 3FB0 | 50 30 A0 01 B1 8E 29 DF C5 92 D0 11 88 B1 8E 29 | P0....)........) |
| 3FC0 | DF C5 90 D0 03 20 FE 3E C8 B1 8E 29 DF C8 C5 90 | .....>...)..... |
| 3FD0 | D0 0D B1 8E 29 DF C5 92 D0 05 88 20 FE 3E C8 C8 | ....)........>.. |
| 3FE0 | 10 D2 18 A5 8E 69 80 85 8E 90 02 E6 8F 38 A5 9A | .....i.......8.. |
| 3FF0 | E9 80 85 9A B0 02 C6 9B B8 50 96 A0 00 B1 8E 29 | .........P.....) |
| 4000 | DF C5 90 D0 03 20 FE 3E C8 C4 9A D0 F0 A6 98 4C | .....>........L |
| 4010 | 46 08 85 53 45 45 4B BC 4C 3F 1C 40 38 B5 00 85 | F..SEEK.L?.@8... |
| 4020 | 8E F5 02 85 9A B5 01 85 8F F5 03 85 9B E8 E8 A0 | ................ |
| 4030 | 00 94 00 94 01 B0 03 4C 46 08 05 9A D0 03 4C 46 | .......LF.....LF |
| 4040 | 08 86 98 AD D2 68 29 DF 85 90 AD D3 68 29 DF 85 | .....h).....h).. |
| 4050 | 92 A5 9A C9 90 A5 9B E9 00 90 5D A5 8E E9 80 85 | ..........]..... |
| 4060 | 8E B0 03 C6 8F 38 A5 9A E9 80 85 9A B0 02 C6 9B | .....8.......... |
| 4070 | A0 7F AE D1 68 CA D0 11 B1 8E 29 DF C5 90 D0 03 | ....h.....)..... |
| 4080 | 20 FE 3E 88 10 F2 B8 50 2C B1 8E 29 DF C5 90 D0 | .>...P,..)..... |
| 4090 | 11 C8 B1 8E 29 DF 88 C5 92 D0 03 20 FE 3E B1 8E | ....).......>.. |
| 40A0 | 29 DF 88 C5 92 D0 0B B1 8E 29 DF C5 90 D0 03 20 | ).......).....  |
| 40B0 | FE 3E 88 10 D4 B8 50 99 A5 8E E5 9A 85 8E B0 02 | .>....P........ |
| 40C0 | C6 8F A4 9A B1 8E 29 DF C5 90 D0 03 20 FE 3E 88 | ......)......>. |
| 40D0 | D0 F2 A6 98 4C 46 08 84 57 52 41 D0 12 40 E0 40 | ....LF..WRA..@.@ |
| 40E0 | A0 00 8C 70 68 AD 6E 68 85 8E AD 6F 68 85 8F CD | ...ph.nh...oh... |
| 40F0 | 6D 68 90 10 8C 23 69 A9 A0 A0 4F 99 80 68 88 10 | mh...#i...O..h.. |

| Address | Hexadecimal | ASCII |
|---|---|---|
| 4100 | FA 4C 46 08 B1 8E C9 0C D0 14 C8 8C 23 69 A9 BD | .LF.........#i.. |
| 4110 | 8C 70 68 A0 4F 99 80 68 88 10 FA 4C 46 08 AD 73 | .ph.O..h...LF..s |
| 4120 | 68 CD 75 68 90 14 8C 23 69 A9 AD C8 8C 70 68 A0 | h.uh...#i....ph. |
| 4130 | 4F 99 80 68 88 10 FA 4C 46 08 B1 8E 49 80 C9 8E | O..h...LF...I... |
| 4140 | B0 1C C9 8D D0 08 C8 8C 23 69 88 B8 50 03 8C 23 | ........#i..P..# |
| 4150 | 69 A9 A0 99 80 68 C8 C0 50 90 F8 4C 46 08 99 80 | i....h..P..LF... |
| 4160 | 68 C8 C0 51 D0 D4 A9 20 88 10 08 A9 50 8D 23 69 | h..Q... ....P.#i |
| 4170 | 4C 46 08 D1 8E F0 F1 88 10 08 A9 50 8D 23 69 4C | LF.........P.#iL |
| 4180 | 46 08 D1 8E D0 F1 C8 8C 23 69 A9 A0 99 80 68 C8 | F.......#i....h. |
| 4190 | C0 50 90 FB 4C 46 08 86 41 44 4A 55 53 D4 D7 40 | .P..LF..ADJUS..@ |
| 41A0 | A2 41 AD 6F 68 CD 6D 68 D0 03 4C 46 08 AC 23 69 | .A.oh.mh..LF..#i |
| 41B0 | C0 50 F0 19 AD 6E 68 85 8E AD 6F 68 85 8F B1 8E | .P...nh...oh.... |
| 41C0 | C9 0C D0 09 88 B1 8E C9 0E 90 01 C8 C8 84 8F AD | ................ |
| 41D0 | 78 68 85 90 AD 79 68 85 91 AD 76 68 85 92 AD 77 | xh...yh...vh...w |
| 41E0 | 68 85 93 38 AD 6E 68 ED 6A 68 AD 6F 68 ED 6B 68 | h..8.nh.jh.oh.kh |
| 41F0 | B0 44 38 AD 78 68 ED 6A 68 85 94 AD 79 68 ED 6B | .D8.xh.jh...yh.k |
| 4200 | 68 85 95 90 0F 18 A5 94 6D 64 68 85 90 A5 95 6D | h.......mdh....m |
| 4210 | 65 68 85 91 38 AD 76 68 ED 6A 68 85 94 AD 77 68 | eh..8.vh.jh...wh |
| 4220 | ED 6B 68 85 95 90 0F 18 A5 94 6D 64 68 85 92 A5 | .kh.......mdh... |
| 4230 | 95 6D 65 68 85 93 38 A5 90 ED 6E 68 A8 A5 91 ED | .meh..8...nh.... |
| 4240 | 6F 68 10 05 A0 00 B8 50 0D F0 03 4C 46 08 98 C5 | oh.....P...LF... |
| 4250 | 8F 90 03 4C 46 08 38 A5 92 ED 6E 68 85 8E A5 93 | ...LF.8...nh.... |
| 4260 | ED 6F 68 F0 0A 10 03 4C 46 08 A9 50 B8 50 14 A5 | .oh....LF..P.P.. |
| 4270 | 8F C5 8E 90 0C D0 05 A9 50 B8 50 02 A5 8E B8 50 | ........P.P....P |
| 4280 | 02 A9 50 85 8E C4 8E 90 03 4C 46 08 B9 80 68 49 | ..P......LF...hI |
| 4290 | 80 99 80 68 C8 C4 8E 90 F3 4C 46 08 87 3F 55 50 | ...h.....LF..?UP |
| 42A0 | 44 41 54 C5 97 41 A8 42 B5 00 A0 01 94 00 0A 0A | DAT..A.B........ |
| 42B0 | A8 AD 6F 68 D9 01 68 D0 1F AD 6E 68 D9 00 68 D0 | ..oh..h...nh..h. |
| 42C0 | 17 AD 73 68 D9 02 68 D0 0F AD 71 68 D9 03 68 D0 | ..sh..h...qh..h. |
| 42D0 | 07 A9 00 95 00 4C 46 08 AD 6E 68 99 00 68 AD 6F | .....LF..nh..h.o |
| 42E0 | 68 99 01 68 AD 73 68 99 02 68 AD 71 68 99 03 68 | h..h.sh..h.qh..h |
| 42F0 | 4C 46 08 87 45 4E 44 57 52 41 D0 9C 42 FF 42 AC | LF..ENDWRA..B.B. |
| 4300 | 70 68 D0 06 EE 73 68 B8 50 0A 88 8C 73 68 8C 70 | ph...sh.P...sh.p |
| 4310 | 68 EE 71 68 18 AD 23 69 6D 6E 68 8D 6E 68 90 03 | h.qh..#imnh.nh.. |
| 4320 | EE 6F 68 38 ED 64 68 AD 6F 68 ED 65 68 CA CA 94 | .oh8.dh.oh.eh... |
| 4330 | 01 C8 90 01 88 94 00 AD 6F 68 CD 6D 68 D0 05 A9 | ........oh.mh... |
| 4340 | 00 8D 6E 68 4C 46 08 88 54 45 53 54 50 41 47 C5 | ..nhLF..TESTPAG. |
| 4350 | F3 42 54 43 AD 73 68 D0 2C AD 71 68 0A 0A A8 AD | .BTC.sh.,.qh.... |
| 4360 | 6F 68 99 01 6A AD 6E 68 99 00 6A AD 47 69 99 02 | oh..j.nh..j.Gi.. |
| 4370 | 6A AD 48 69 99 03 6A A9 FF 99 04 6A 99 05 6A 99 | j.Hi..j....j..j. |
| 4380 | 06 6A 99 07 6A EE 66 68 EE 47 69 D0 03 EE 48 69 | .j..j.fh.Gi...Hi |
| 4390 | 4C 46 08 84 44 49 53 D0 47 43 9C 43 B5 00 0A A8 | LF..DIS.GC.C.... |
| 43A0 | E8 E8 86 98 B9 31 3B 85 8E B9 32 3B 85 8F A2 4E | .....1;...2;...N |
| 43B0 | A0 27 8D 01 C0 8D 55 C0 BD 80 68 CA CA 91 8E 88 | .'....U...h..... |
| 43C0 | 10 F6 AD 19 C0 30 FB 8D 00 C0 8D 54 C0 A2 4F A0 | .....0.....T..O. |
| 43D0 | 27 BD 80 68 CA CA 91 8E 88 10 F6 A6 98 4C 46 08 | '..h.........LF. |
| 43E0 | 86 3C 57 52 41 50 BE 93 43 EB 43 A0 00 8C 70 68 | .<WRAP..C.C...ph |
| 43F0 | AD 6E 68 85 8E AD 6F 68 85 8F CD 6D 68 90 06 8C | .nh...oh...mh... |

| Address | Hexadecimal | ASCII |
|---|---|---|
| 4400 | 23 69 4C 46 08 B1 8E C9 0C D0 0A C8 8C 23 69 8C | #iLF.........#i. |
| 4410 | 70 68 4C 46 08 AD 73 68 CD 75 68 90 0A 8C 23 69 | phLF..sh.uh...#i |
| 4420 | C8 8C 70 68 4C 46 08 B1 8E C9 0E B0 0B C9 0D D0 | ..phLF.......... |
| 4430 | 01 C8 8C 23 69 4C 46 08 C8 C0 51 D0 EA A9 20 88 | ...#iLF...Q.... |
| 4440 | 10 08 A9 50 8D 23 69 4C 46 08 D1 8E F0 F1 88 10 | ...P.#iLF....... |
| 4450 | 08 A9 50 8D 23 69 4C 46 08 D1 8E D0 F1 C8 8C 23 | ..P.#iLF.......# |
| 4460 | 69 4C 46 08 86 53 43 52 4F 4C CC E0 43 6F 44 A0 | iLF..SCROL..CoD. |
| 4470 | 00 86 98 B9 04 68 99 00 68 C8 C0 60 D0 F5 A9 00 | .....h..h..`.... |
| 4480 | 8D 5E 68 8D 5F 68 AA BD 31 3B 85 8E E8 BD 31 3B | .^h._h..1;....1; |
| 4490 | 85 8F E8 BD 31 3B 85 90 E8 BD 31 3B 85 91 A0 27 | ....1;....1;...' |
| 44A0 | 8D 01 C0 8D 55 C0 B1 90 91 8E 88 10 F9 AD 19 C0 | ....U........... |
| 44B0 | 30 FB 8D 00 C0 8D 54 C0 A0 27 B1 90 91 8E 88 10 | 0.....T..'...... |
| 44C0 | F9 CA E0 2E D0 C1 A6 98 4C 46 08 84 3F 45 4E C4 | ........LF..?EN. |
| 44D0 | 64 44 FC 0E 12 36 B4 0E 66 08 18 E6 11 D0 08 34 | dD...6..f......4 |
| 44E0 | 00 07 36 9F 0E F3 35 66 08 5C 71 0D 9F 0E 89 0D | ..6...5f.\q..... |
| 44F0 | 66 08 4F 1A 12 4A 36 9F 0E 32 36 9F 0E E6 11 12 | f.O..J6..26..... |
| 4500 | 0C D0 08 10 00 6D 44 A8 0F 12 36 6F 0E 55 0C 19 | .....mD...6o.U.. |
| 4510 | 37 6F 0E 85 0C 86 28 46 50 4F 53 A9 CB 44 FC 0E | 7o....(FPOS..D.. |
| 4520 | 66 08 18 4B 0C 58 09 4E 0E F3 35 66 08 17 90 09 | f..K.X.N..5f.... |
| 4530 | 89 0D 56 0D 56 0D 71 0D 9F 0E A2 11 E5 0C D0 08 | ..V.V.q......... |
| 4540 | 3D 00 F3 35 66 08 17 90 09 89 0D 56 0D 56 0D 71 | =..5f......V.V.q |
| 4550 | 0D 9F 0E 89 0D 66 08 80 F8 0D A2 11 D0 08 0E 00 | .....f.......... |
| 4560 | 07 36 9F 0E 71 0D 32 36 9F 0E 89 0D 66 08 17 90 | .6..q.26....f... |
| 4570 | 09 89 0D D3 0C 2A 0E D3 0C 2A 0E 85 0C F1 08 A8 | .....*...*...... |
| 4580 | FF 2A 0E 66 08 50 66 08 17 85 0C 84 46 50 4F D3 | .*.f.Pf.....FPO. |
| 4590 | 15 45 FC 0E 4E 0E B4 0E 66 08 0C E6 11 F8 0D 4E | .E..N...f......N |
| 45A0 | 0E 32 36 9F 0E E6 11 D0 08 08 00 2A 0E 07 36 9F | .26........*..6. |
| 45B0 | 0E 37 0D E4 0E 66 08 0D 1A 12 FD 0B D0 08 10 00 | .7...f.......... |
| 45C0 | 37 0D 1E 45 33 0E 14 0D 33 0E B1 08 04 00 1E 45 | 7..E3...3......E |
| 45D0 | 55 37 DB 0E 4E 0E 66 08 50 E6 11 D0 08 0C 00 2A | U7..N.f.P......* |
| 45E0 | 0E 4B 0C 55 0C 55 37 6F 0E 62 37 DB 0E 85 0C 86 | .K.U.U7o.b7..... |
| 45F0 | 46 4E 44 43 55 D2 8B 45 FC 0E 80 36 9F 0E 37 0D | FNDCU..E...6..7. |
| 4600 | 1E 45 33 0E 14 0D F8 0D 66 08 17 A2 11 F8 0D 66 | .E3.....f......f |
| 4610 | 08 50 E6 11 FD 0B 80 36 9F 0E 37 0D B4 0E 66 08 | .P.....6..7...f. |
| 4620 | 0E A2 11 12 0C D0 08 08 00 2A 0E 14 0D 4B 0C 66 | .........*...K.f |
| 4630 | 08 4F F8 0D A2 11 D0 08 18 00 66 08 17 4C 38 DB | .O........f..L8. |
| 4640 | 0E 66 08 28 41 38 DB 0E 2A 0E 2A 0E B1 08 16 00 | .f.(A8..*.*..... |
| 4650 | 4E 0E 64 0D 41 38 DB 0E 55 0C FD 0B 58 38 DB 0E | N.d.A8..U...X8.. |
| 4660 | 4C 38 DB 0E 71 38 9F 0E 85 38 C3 0E A8 3B 85 0C | L8..q8...8...;.. |
| 4670 | 86 53 45 54 2E 55 D0 EF 45 7B 46 AD 67 68 8D 66 | .SET.U..E(F.gh.f |
| 4680 | 68 C9 02 B0 08 A0 00 8C 66 68 B8 50 14 CE 66 68 | h.......fh.P..fh |
| 4690 | 0A 0A A8 B9 02 68 D0 03 CE 66 68 AD 66 68 0A 0A | .....h...fh.fh.. |
| 46A0 | A8 B9 00 68 8D 6E 68 B9 01 68 8D 6F 68 B9 02 68 | ...h.nh..h.oh..h |
| 46B0 | 8D 73 68 B9 03 68 8D 71 68 18 AD 66 68 6D 45 69 | .sh..h.qh..fhmEi |
| 46C0 | 8D 47 69 A9 00 6D 46 69 8D 48 69 AD 64 68 85 8E | .Gi..mFi.Hi.dh.. |
| 46D0 | AD 65 68 85 8F AD 6A 68 85 90 AD 6B 68 85 91 A0 | .eh...jh...kh... |
| 46E0 | 51 B1 90 91 8E 88 10 F9 4C 46 08 83 42 4D D0 70 | Q.......LF..BM.p |
| 46F0 | 46 F3 46 98 18 65 90 85 90 A5 91 69 00 85 91 38 | F.F..e.....i...8 |

| Address | Hexadecimal | ASCII |
|---|---|---|
| 4700 | A5 90 ED 64 68 A5 91 ED 65 68 B0 01 60 AD 6A 68 | ...dh...eh..`.jh |
| 4710 | E5 90 AD 6B 68 E5 91 90 1E 38 A5 90 ED 64 68 85 | ...kh....8...dh. |
| 4720 | 90 A5 91 ED 65 68 85 91 18 A5 90 6D 6A 68 85 90 | ....eh.....mjh.. |
| 4730 | A5 91 6D 6B 68 85 91 60 83 4C 2E C1 EB 46 40 47 | ..mkh..`.L...F@G |
| 4740 | A9 0C A0 00 D1 90 D0 02 C8 60 A9 0E D1 90 90 08 | .........`...... |
| 4750 | A9 0D D1 90 D0 01 C8 60 C8 C0 51 D0 EF A9 20 88 | .......`..Q.... |
| 4760 | 10 03 A0 50 60 D1 90 F0 F6 88 10 03 A0 50 60 D1 | ...P`........P`. |
| 4770 | 90 D0 F6 C8 60 87 4C 4F 43 2E 41 44 D2 38 47 81 | ....`.LOC.AD.8G. |
| 4780 | 47 B5 00 85 8E B5 01 85 8F E8 E8 AD 42 69 0A 0A | G...........Bi.. |
| 4790 | 69 04 A8 88 88 88 88 38 A5 8E F9 00 6A A5 8F F9 | i......8....j... |
| 47A0 | 01 6A 90 EF B9 00 6A 85 90 B9 01 6A 85 91 B9 02 | .j....j....j.... |
| 47B0 | 6A 8D 4F 69 B9 03 6A 8D 50 69 98 4A 4A 8D 4E 69 | j.Oi..j.Pi.JJ.Ni |
| 47C0 | A0 00 84 94 E6 94 20 40 47 A5 90 85 92 A5 91 85 | ...... @G....... |
| 47D0 | 93 20 F3 46 38 A5 90 E5 8E 85 95 A5 91 E5 8F 90 | . .F8........... |
| 47E0 | E3 05 95 D0 0A A5 90 8D 4B 69 A5 91 B8 50 09 A5 | ........Ki...P.. |
| 47F0 | 92 8D 4B 69 A5 93 C6 94 8D 4C 69 18 A5 94 8D 4D | ..Ki.....Li....M |
| 4800 | 69 6D 4F 69 8D 4F 69 A9 00 6D 50 69 8D 50 69 4C | imOi.Oi..mPi.PiL |
| 4810 | 46 08 87 4C 4F 43 2E 4E 55 CD 75 47 1E 48 B5 00 | F..LOC.NU.uG.H.. |
| 4820 | 85 8E B5 01 85 8F E8 E8 AD 42 69 0A 0A 69 04 A8 | .........Bi..i.. |
| 4830 | 88 88 88 88 38 A5 8E F9 02 6A A5 8F F9 03 6A 90 | ....8....j....j. |
| 4840 | EF B9 00 6A 85 90 B9 01 6A 85 91 38 A5 8E F9 02 | ...j....j..8.... |
| 4850 | 6A 8D 4D 69 98 4A 4A 8D 4E 69 A0 FF 84 94 E6 94 | j.Mi.JJ.Ni...... |
| 4860 | A5 94 CD 4D 69 F0 07 20 40 47 20 F3 46 18 90 EE | ...Mi.. @G .F... |
| 4870 | A5 90 8D 4B 69 A5 91 8D 4C 69 4C 46 08 82 3F C4 | ...Ki...LiLF..?. |
| 4880 | 12 48 84 48 CA CA A0 00 94 01 94 00 AC 41 69 CC | .H.H.........Ai. |
| 4890 | 40 69 F0 1B B9 F0 69 C9 01 D0 14 88 10 02 A0 04 | @i....i......... |
| 48A0 | 8C 41 69 A0 01 95 00 CE D1 68 10 03 EE D1 68 4C | .Ai......h....hL |
| 48B0 | 46 08 88 42 55 4D 50 57 52 41 D0 7D 48 BF 48 38 | F..BUMPWRA.}H.H8 |
| 48C0 | AD 6A 68 ED 64 68 85 8E AD 6B 68 ED 65 68 85 8F | .jh.dh...kh.eh.. |
| 48D0 | 18 AD 6E 68 65 8E 8D 6E 68 AD 6F 68 65 8F 8D 6F | ..nhe..nh.ohe..o |
| 48E0 | 68 CD 6D 68 D0 05 A9 00 8D 6E 68 4C 46 08 89 41 | h.mh.....nhLF..A |
| 48F0 | 46 54 45 52 2E 45 4F D3 B2 48 FC 48 AD 6E 68 8D | FTER.EO..H.H.nh. |
| 4900 | 7A 68 AD 6F 68 8D 7B 68 AD 73 68 8D 7C 68 AD 71 | zh.oh.{h.sh.!h.q |
| 4910 | 68 8D 7D 68 AD 47 69 8D 7E 68 AD 48 69 8D 7F 68 | h.}h.Gi.~h.Hi..h |
| 4920 | AC 66 68 88 8C 67 68 CA CA A9 00 95 01 C0 17 F0 | .fh..gh......... |
| 4930 | 02 A9 01 95 00 4C 46 08 82 3F D8 EE 48 3F 49 CA | .....LF..?..H?I. |
| 4940 | CA A0 00 94 01 AD 61 C0 0D 62 C0 30 05 94 00 4C | ......a..b.0...L |
| 4950 | 46 08 C8 94 00 AD 61 C0 2D 62 C0 10 0D AD 55 69 | F.....a.-b....Ui |
| 4960 | C9 05 F0 03 EE 55 69 4C 46 08 AD 61 C0 30 02 A0 | .....UiLF..a.0.. |
| 4970 | 03 8C 55 69 4C 46 08 87 53 45 54 4C 49 4E C5 38 | ..UiLF..SETLIN.8 |
| 4980 | 49 83 49 B5 00 E8 E8 0A 0A A8 B9 00 68 8D 6E 68 | I.I.........h.nh |
| 4990 | B9 01 68 8D 6F 68 B9 02 68 8D 73 68 B9 03 68 8D | ..h.oh..h.sh..h. |
| 49A0 | 71 68 4C 46 08 82 3F C1 77 49 AC 49 CA CA A0 00 | qhLF..?.wI.I.... |
| 49B0 | 94 01 94 00 AC 41 69 CC 40 69 F0 13 B9 F0 69 C9 | .....Ai.@i....i. |
| 49C0 | 0B D0 0C 88 10 02 A0 04 8C 41 69 A0 01 94 00 4C | .........Ai....L |
| 49D0 | 46 08 82 3F CE A5 49 D9 49 CA CA A9 00 95 01 95 | F..?..I.I....... |
| 49E0 | 00 AC 41 69 CC 40 69 F0 30 B9 F0 69 C9 0C 90 29 | ..Ai.@i.0..i...) |
| 49F0 | 88 10 02 A0 04 8C 41 69 A0 01 94 00 AC 49 69 D0 | ......Ai.....Ii. |

| Address | Hexadecimal | ASCII |
|---|---|---|
| 4A00 | 0B AC D1 68 C0 1F F0 01 C8 B8 50 02 A0 01 8C D1 | ...h......P..... |
| 4A10 | 68 99 D1 68 A0 00 8C 49 69 4C 46 08 85 4C 45 4D | h..h...IiLF..LEM |
| 4A20 | 49 D4 D2 49 26 4A B5 00 E8 E8 AC 21 69 84 37 AC | I..I&J.....!i.7. |
| 4A30 | 20 69 84 36 A0 60 8C F0 FD 20 ED FD A4 37 8C 21 | i.6.`... ...7.! |
| 4A40 | 69 A4 36 8C 20 69 A0 FD 84 37 A0 F0 84 36 A0 C9 | i.6. i...7...6.. |
| 4A50 | 8C F0 FD 4C 46 08 83 53 45 CC 1C 4A 5E 4A 38 CA | ...LF..SE..J^J8. |
| 4A60 | CA AD 64 68 ED 62 68 95 00 AD 65 68 ED 63 68 95 | ..dh.bh...eh.ch. |
| 4A70 | 01 4C 46 08 85 4E 55 44 47 C5 56 4A FC 0E 9C 38 | .LF..NUDG.VJ...8 |
| 4A80 | 2C 08 00 01 71 0D 9C 38 58 09 90 09 9F 0E 07 36 | ,...q..8X......6 |
| 4A90 | 9F 0E 14 0D A2 11 D0 08 0C 00 4E 0E 90 09 6F 0E | ..........N...o. |
| 4AA0 | B1 08 04 00 A6 0C 9F 0F 21 09 E0 FF 36 38 9F 0E | ........!...68.. |
| 4AB0 | 32 36 9F 0E A2 11 D0 08 08 00 4E 0E 36 38 6F 0E | 26........N.68o. |
| 4AC0 | 4E 0E F3 35 6F 0E 4E 0E FD 35 6F 0E 4E 0E 8B 36 | N..5o.N..5o.N..6 |
| 4AD0 | 6F 0E 4E 0E 07 36 6F 0E 4E 0E 80 36 6F 0E 27 36 | o.N..6o.N..6o.'6 |
| 4AE0 | 6F 0E 85 0C 87 52 45 41 4C 49 47 CE 74 4A FC 0E | o....REALIG.tJ.. |
| 4AF0 | FD 35 9F 0E 7F 47 3C 37 9F 0E 4A 36 C3 0E 3C 37 | .5...G<7..J6..<7 |
| 4B00 | 9F 0F 71 0D 9F 0E 4E 0E 24 37 C3 0E E5 37 C3 0E | ..q...N.$7...7.. |
| 4B10 | 3C 37 24 0D B4 0E 6A 36 DB 0E 3C 37 97 0F 71 0D | <7$...j6..<7..q. |
| 4B20 | B4 0E 60 36 DB 0E 32 36 9F 0E 07 36 9F 0E A2 3D | ..`6..26...6...= |
| 4B30 | 14 0D E9 0A E9 43 52 43 FD 42 E5 0C D0 08 F6 FF | .....CRC.B...... |
| 4B40 | BD 48 4A 36 9F 0E 3C 36 9F 0E A2 11 D0 08 0E 00 | .HJ6..<6........ |
| 4B50 | E9 43 52 43 FD 42 2A 0E B1 08 E8 FF 24 37 9F 0E | .CRC.B*.....$7.. |
| 4B60 | 0F 37 C3 0E 60 36 B4 0E 03 37 DB 0E 85 0C 84 4D | .7..`6...7.....M |
| 4B70 | 58 38 B0 E4 4A FC 0E 4B 0C C3 36 DB 0E 66 08 10 | X8..J..K..6..f.. |
| 4B80 | DA 36 DB 0E 66 08 0F E4 36 DB 0E 4B 0C E4 36 14 | .6..f...6..K..6. |
| 4B90 | 0D DB 0E 85 0C 83 49 44 D3 6E 4B FC 0E 4B 0C C3 | ......ID.nK..K.. |
| 4BA0 | 36 DB 0E 4B 0C DA 36 DB 0E 2C 08 1E 1B E4 36 C3 | 6..K..6..,....6. |
| 4BB0 | 0E 2C 08 4A 2C E4 36 24 0D C3 0E 2C 08 36 30 E4 | .,.J,.6$...,.60. |
| 4BC0 | 36 66 08 04 71 0D C3 0E 2C 08 2C 24 E4 36 66 08 | 6f..q...,,$.6f. |
| 4BD0 | 06 71 0D C3 0E 2C 08 1B 52 E4 36 66 08 08 71 0D | .q...,..R.6f..q. |
| 4BE0 | C3 0E 2C 08 2C 31 E4 36 66 08 0A 71 0D C3 0E 2C | ..,.,1.6f..q..., |
| 4BF0 | 08 2C 24 E4 36 66 08 0C 71 0D C3 0E 4B 0C E4 36 | .,$.6f..q...K..6 |
| 4C00 | 66 08 0E 71 0D DB 0E 85 0C 84 46 58 38 B0 95 4B | f..q......FX8..K |
| 4C10 | FC 0E 4B 0C C3 36 DB 0E 4B 0C DA 36 DB 0E 2C 08 | ..K..6..K..6..,. |
| 4C20 | 1B 4D E4 36 C3 0E 2C 08 1B 6C E4 36 24 0D C3 0E | .M.6..,..l.6$... |
| 4C30 | 66 08 08 E4 36 9F 0F 71 0D C3 0E 85 0C 85 51 41 | f...6..q......QA |
| 4C40 | 4E 54 D8 09 4C FC 0E 55 0C C3 36 DB 0E 4B 0C DA | NT..L..U..6..K.. |
| 4C50 | 36 DB 0E 2C 08 1B 5B E4 36 C3 0E 2C 08 36 73 E4 | 6..,..[.6..,.6s. |
| 4C60 | 36 24 0D C3 0E 2C 08 1B 5B E4 36 9F 0F 71 0D C3 | 6$...,..[.6..q.. |
| 4C70 | 0E 2C 08 32 77 E4 36 66 08 06 71 0D C3 0E 4B 0C | .,.2w.6f..q...K. |
| 4C80 | E4 36 66 08 08 71 0D DB 0E 85 0C 84 51 55 4D C5 | .6f..q......QUM. |
| 4C90 | 3D 4C FC 0E 55 0C C3 36 DB 0E 66 08 0C DA 36 DB | =L..U..6..f...6. |
| 4CA0 | 0E 4B 0C E4 36 C3 0E 85 0C 88 45 4E 44 2E 46 4F | .K..6.....END.FO |
| 4CB0 | 52 CD 8B 4C FC 0E 98 36 9F 0E 4A 36 C3 0E 98 36 | R..L...6..J6...6 |
| 4CC0 | 24 0D B4 0E 6A 36 DB 0E 98 36 97 0F 71 0D B4 0E | $...j6...6..q... |
| 4CD0 | 60 36 DB 0E 98 36 9F 0F 71 0D 9F 0E 24 37 C3 0E | `6...6..q...$7.. |
| 4CE0 | 4A 36 9F 0E 3C 36 9F 0E A2 11 D0 08 1C 00 E9 43 | J6..<6.........C |
| 4CF0 | 52 43 FD 42 2A 0E 37 3D 3D 49 E5 0C FD 0B D0 08 | RC.B*.7==I...... |

| Address | Hexadecimal | ASCII |
|---|---|---|
| 4D00 | 04 00 85 0C B1 08 DA FF 52 43 24 37 9F 0E 0F 37 | ........RC$7...7 |
| 4D10 | C3 0E 60 36 B4 0E 03 37 DB 0E 32 36 9F 0E 92 45 | ..`6...7..26...E |
| 4D20 | 85 0C 83 4C 43 D2 A9 4C FC 0E 66 08 0D 24 4A C3 | ...LC..L..f..$J. |
| 4D30 | 36 B4 0E D0 08 07 00 66 08 0A 24 4A 85 0C 85 4C | 6......f..$J...L |
| 4D40 | 54 59 50 C5 22 4D FC 0E DA 36 B4 0E 6C 3D D0 08 | TYP."M...6..l=.. |
| 4D50 | 0F 00 4B 0C 58 09 66 08 20 24 4A F1 08 F9 FF A3 | ..K.X.f. $J..... |
| 4D60 | 36 4E 0E 4E 0E A2 3D 71 0D 33 0E 58 09 90 09 B4 | 6N.N..=q.3.X.... |
| 4D70 | 0E 66 08 7F FD 0B 66 08 20 1A 12 D0 08 06 00 2A | .f....f. ......* |
| 4D80 | 0E 90 09 F1 08 E8 FF 14 0D A3 36 58 09 90 09 B4 | ..........6X.... |
| 4D90 | 0E 66 08 80 C3 11 D0 08 0C 00 90 09 B4 0E 24 4A | .f............$J |
| 4DA0 | B1 08 07 00 66 08 20 24 4A F1 08 E2 FF 85 0C 85 | ....f. $J....... |
| 4DB0 | 50 52 49 4E D4 3E 4D FC 0E 2C 08 00 C1 B9 36 C3 | PRIN.>M..,....6. |
| 4DC0 | 0E E4 36 4E 0E B4 0E 6C 3D D0 08 0A 00 24 4A 14 | ..6N...l=....$J. |
| 4DD0 | 0D B1 08 F0 FF 2A 0E E5 37 9F 0E 1C 48 3C 37 9F | .....*..7...H<7. |
| 4DE0 | 0E 4A 36 C3 0E 3C 37 24 0D B4 0E 6A 36 DB 0E 3C | .J6..<7$...j6..< |
| 4DF0 | 37 97 0F 71 0D B4 0E 60 36 DB 0E DE 40 A0 41 56 | 7..q...`6...@.AV |
| 4E00 | 36 B4 0E D0 08 15 00 66 08 0C 24 4A 28 4D 28 4D | 6......f..$J(M(M |
| 4E10 | 28 4D 28 4D 28 4D B1 08 04 00 46 4D 28 4D FD 42 | (M(M(M....FM(M.B |
| 4E20 | E5 0C D0 08 D7 FF 07 36 9F 0E 36 38 C3 0E 85 0C | .......6..68.... |
| 4E30 | 85 4E 45 57 4E C4 AF 4D FC 0E DC 37 9F 0E 4E 0E | .NEWN..M...7..N. |
| 4E40 | 19 37 9F 0E C3 11 33 0E 19 37 9F 0E 66 08 17 71 | .7....3..7..f..q |
| 4E50 | 0D 1A 12 12 0C 80 36 9F 0E F3 35 9F 0E E6 11 27 | ......6...5....' |
| 4E60 | 36 9F 0E 07 36 9F 0E A2 11 FD 0B 12 0C 4E 0E 7B | 6...6........N.{ |
| 4E70 | 37 DB 0E D0 08 85 00 E5 37 9F 0E 66 08 17 71 0D | 7.......7..f..q. |
| 4E80 | DC 37 9F 0E C3 11 D0 08 0F 00 DC 37 9F 0E 66 08 | .7.........7..f. |
| 4E90 | 0B 89 0D B1 08 26 00 E5 37 9F 0E 66 08 0B 71 0D | .....&..7..f..q. |
| 4EA0 | DC 37 9F 0E 1A 12 D0 08 0F 00 DC 37 9F 0E 66 08 | .7.........7..f. |
| 4EB0 | 0B 89 0D B1 08 06 00 E5 37 9F 0E 4B 0C E9 1A 0F | ........7..K.... |
| 4EC0 | 37 9F 0E 66 08 18 89 0D 4B 0C E9 1A D1 1A 4E 0E | 7..f....K.....N. |
| 4ED0 | 1C 48 19 37 C3 0E 3C 37 9F 0E F3 35 C3 0E 3C 37 | .H.7..<7...5..<7 |
| 4EE0 | 24 0D B4 0E F3 35 24 0D DB 0E 3C 37 97 0F 71 0D | $....5$...<7..q. |
| 4EF0 | B4 0E F3 35 97 0F 71 0D DB 0E 85 0C 86 4E 45 57 | ...5..q......NEW |
| 4F00 | 42 4E C4 30 4E FC 0E 4E 0E 80 36 9F 0E E6 11 DC | BN.0N..N..6..... |
| 4F10 | 37 9F 0E 87 37 C3 0E E5 37 9F 0E D3 37 C3 0E D0 | 7...7...7...7... |
| 4F20 | 08 08 00 2A 0E B1 08 16 00 4E 0E 7F 47 3C 37 9F | ...*.....N..G<7. |
| 4F30 | 0F 71 0D 9F 0E DC 37 C3 0E 80 36 C3 0E 4E 0E 8B | .q....7...6..N.. |
| 4F40 | 36 9F 0E E6 11 D0 08 08 00 2A 0E B1 08 16 00 4E | 6........*.....N |
| 4F50 | 0E 7F 47 3C 37 9F 0F 71 0D 9F 0E E5 37 C3 0E 8B | ..G<7..q....7... |
| 4F60 | 36 C3 0E 85 0C 86 52 45 53 48 4F D7 FC 4E FC 0E | 6.....RESHO..N.. |
| 4F70 | 58 09 90 09 81 49 DE 40 A0 41 90 09 9A 43 E0 3C | X....I.@.A...C.< |
| 4F80 | F1 08 F0 FF 85 0C 84 53 48 4F D7 65 4F FC 0E 4B | .......SHO.eO..K |
| 4F90 | 0C 81 49 66 08 18 66 08 18 4B 0C 58 09 90 09 A6 | ..If..f..K.X.... |
| 4FA0 | 42 2A 0E DE 40 A0 41 90 09 9A 43 FD 42 E5 0C D0 | B*..@.A...C.B... |
| 4FB0 | 08 0A 00 2A 0E 90 09 14 0D A6 0C E0 3C F1 08 DE | ...*........<... |
| 4FC0 | FF 4A 36 9F 0E 32 36 9F 0E A2 11 D0 08 04 00 BD | .J6..26......... |
| 4FD0 | 48 4E 0E 66 08 18 C3 11 D0 08 25 00 66 08 18 33 | HN.f......%.f..3 |
| 4FE0 | 0E 58 09 90 09 A6 42 2A 0E DE 40 A0 41 90 09 9A | .X....B*..@.A... |
| 4FF0 | 43 FD 42 2A 0E E0 3C F1 08 EA FF B1 08 04 00 2A | C.B*..<........* |

| Address | Hexadecimal | ASCII |
|---|---|---|
| 5000 | 0E 85 0C 88 50 52 49 4E 54 45 52 D3 86 4F 57 0F | ....PRINTER..OW. |
| 5010 | 75 4B 9B 4B 10 4C 45 4C 92 4C 8A 53 45 54 50 52 | uK.K.LEL.L.SETPR |
| 5020 | 49 4E 54 45 D2 03 50 FC 0E 2B 38 B4 0E 9F 0F D1 | INTE..P..+8..... |
| 5030 | 1A 56 0D 0E 50 71 0D 9F 0E 8A 08 85 0C 85 3C 53 | .V..Pq........<S |
| 5040 | 48 4F BE 1A 50 FC 0E DC 37 9F 0E 87 37 9F 0E E9 | HO..P...7...7... |
| 5050 | 1A 19 37 9F 0E 89 0D 24 0D 66 08 18 D1 1A E5 37 | ..7....$.f.....7 |
| 5060 | 9F 0E D3 37 9F 0E D1 1A 19 37 9F 0E 89 0D 4C 0D | ...7.....7....L. |
| 5070 | 4B 0C E9 1A 6E 4F 85 0C 83 53 48 CF 3D 50 FC 0E | K...nO...SH.=P.. |
| 5080 | 05 4F 38 4E 7B 37 B4 0E D0 08 08 00 8D 4F B1 08 | .O8N{7.......O.. |
| 5090 | 04 00 45 50 80 36 9F 0E 92 45 85 0C 86 4F 55 54 | ..EP.6...E...OUT |
| 50A0 | 4C 2F D2 78 50 FC 0E 19 37 9F 0E 66 08 17 71 0D | L/.xP...7..f..q. |
| 50B0 | DC 37 9F 0E A2 11 D0 08 0C 00 8B 36 9F 0E 80 36 | .7.........6...6 |
| 50C0 | 9F 0E 7E 50 8B 36 9F 0E FD 35 C3 0E 80 36 9F 0E | ..~P.6...5...6.. |
| 50D0 | 07 36 9F 0E E6 11 D0 08 04 00 85 0C 80 36 9F 0E | .6...........6.. |
| 50E0 | 07 36 9F 0E A2 11 D0 08 32 00 07 36 9F 0E 80 36 | .6......2..6...6 |
| 50F0 | 9F 0E 89 0D C1 0C 80 36 9F 0E 32 36 9F 0E 7B 09 | .......6..26..{. |
| 5100 | 89 0D 7B 09 A1 30 D3 0C 52 2A 32 36 6F 0E 80 36 | ..{..0..R*26o..6 |
| 5110 | 9F 0E 07 36 C3 0E B1 08 A4 00 80 36 9F 0E 32 36 | ...6.......6..26 |
| 5120 | 9F 0E 89 0D C1 0C 07 36 9F 0E F3 35 9F 0E A2 11 | .......6...5.... |
| 5130 | D0 08 10 00 07 36 9F 0E 32 36 9F 0E 89 0D F3 35 | .....6..26.....5 |
| 5140 | 6F 0E 9C 38 2C 08 00 01 71 0D 9C 38 58 09 07 36 | o..8,...q..8X..6 |
| 5150 | 9F 0E 90 09 9F 0E A2 11 D0 08 10 00 07 36 9F 0E | .............6.. |
| 5160 | 32 36 9F 0E 89 0D 90 09 6F 0E 9F 0F 21 09 E0 FF | 26......o...!... |
| 5170 | 32 36 9F 0E 07 36 9F 0E 7B 09 E9 0A 8B 36 9F 0E | 26...6..{....6.. |
| 5180 | 32 36 9F 0E A2 11 E5 0C D0 08 16 00 8B 36 9F 0E | 26...........6.. |
| 5190 | 32 36 9F 0E 89 0D 07 36 9F 0E 71 0D FD 35 C3 0E | 26.....6..q..5.. |
| 51A0 | 7B 09 32 36 6F 0E D3 0C 07 36 6F 0E 07 36 9F 0E | {.26o....6o..6.. |
| 51B0 | 80 36 C3 0E FD 35 9F 0E 8B 36 C3 0E 85 0C 83 4C | .6...5...6.....L |
| 51C0 | 45 D8 9C 50 FC 0E 80 36 9F 0E 07 36 9F 0E 14 0D | E..P...6...6.... |
| 51D0 | A2 11 D0 08 20 00 27 36 9F 0E 07 36 9F 0E AE 36 | ....  '6...6...6 |
| 51E0 | B4 0E 89 0D 80 36 9F 0E 3F 3C 1A 40 6C 3D D0 08 | .....6..?<.@l=.. |
| 51F0 | 04 00 85 0C 32 36 9F 0E 14 0D 80 36 9F 0E 37 0D | ....26.....6..7. |
| 5200 | 28 3C 3C 36 9F 0E 54 3F 85 0C 83 52 45 D8 BE 51 | (<<6..T?...RE..Q |
| 5210 | FC 0E 07 36 9F 0E 80 36 9F 0E 14 0D A2 11 D0 08 | ...6...6........ |
| 5220 | 1C 00 32 36 9F 0E 80 36 9F 0E 37 0D 28 3C 3C 36 | ..26...6..7.(<<6 |
| 5230 | 9F 0E 54 3F 6C 3D D0 08 04 00 85 0C 27 36 9F 0E | ..T?l=......'6.. |
| 5240 | 07 36 9F 0E AE 36 B4 0E 89 0D 80 36 9F 0E 3F 3C | .6...6.....6..?< |
| 5250 | 1A 40 85 0C 86 53 45 41 52 43 C8 0A 52 FC 0E 6E | .@...SEARC..R..n |
| 5260 | 37 B4 0E 55 0C E6 11 D0 08 08 00 C4 51 B1 08 04 | 7..U........Q... |
| 5270 | 00 10 52 6C 3D E5 0C D0 08 08 00 07 36 9F 0E 37 | ..Rl=.......6..7 |
| 5280 | 0D 4E 0E 14 0D 7E 50 85 0C 83 44 45 CC 54 52 FC | .N...~P...DE.TR. |
| 5290 | 0E AE 36 B4 0E D0 08 1A 00 07 36 9F 0E 80 36 C3 | ..6.......6...6. |
| 52A0 | 0E 07 36 9F 0E 37 0D 8B 36 C3 0E 5D 52 B1 08 0E | ..6..7..6..]R... |
| 52B0 | 00 07 36 9F 0E 37 0D 07 36 9F 0E 7E 50 85 0C 84 | ..6..7..6..~P... |
| 52C0 | 53 41 56 C5 89 52 FC 0E 66 08 1E E6 35 DC 35 58 | SAV..R..f...5.5X |
| 52D0 | 09 90 09 F8 0D 4B 0C A1 20 14 0D 2C 08 00 04 21 | .....K.. ..,...! |
| 52E0 | 09 F0 FF 2A 0E 85 0C 84 49 4E 49 D4 BF 52 FC 0E | ...*....INI..R.. |
| 52F0 | DC 35 2C 08 00 30 A4 15 4B 0C 1D 36 DB 0E F3 35 | .5,..0..K..6...5 |

| Address | Hexadecimal | ASCII |
|---|---|---|
| 5300 | 66 08 60 A4 15 4B 0C AE 36 DB 0E BE 38 27 36 C3 | f.`..K..6...8'6. |
| 5310 | 0E 4B 0C 19 37 C3 0E 27 36 9F 0E 4E 0E 8B 36 C3 | .K..7..'6..N..6. |
| 5320 | 0E 14 0D 80 36 C3 0E 2C 08 00 02 71 38 C3 0E 2C | ....6..,...q8..,|
| 5330 | 08 00 01 7B 38 C3 0E 66 08 0C 27 36 9F 0E DB 0E | ...{8..f..'6.... |
| 5340 | E6 35 37 0D 32 36 C3 0E 2C 08 0D 0D 32 36 9F 0E | .57.26..,...26.. |
| 5350 | C3 0E E6 35 3C 36 C3 0E 27 36 9F 0E 4E 0E FD 35 | ...5<6..'6..N..5 |
| 5360 | C3 0E 14 0D 07 36 C3 0E 27 36 9F 0E F3 35 C3 0E | .....6..'6...5.. |
| 5370 | BE 38 91 37 C3 0E BE 38 9B 37 C3 0E 66 08 36 75 | .8.7...8.7..f.6u |
| 5380 | 36 DB 0E 4B 0C 6A 36 DB 0E 4B 0C 60 36 DB 0E 27 | 6..K.j6..K.`6..' |
| 5390 | 36 9F 0E 9C 38 C3 0E 4B 0C EE 36 DB 0E 4B 0C F9 | 6...8..K..6..K.. |
| 53A0 | 36 DB 0E 55 0C 2C 08 0D C0 DB 0E 4B 0C 2B 38 DB | 6..U.,.....K.+8. |
| 53B0 | 0E 10 4C 07 36 9F 0E 36 38 C3 0E 08 3B 85 0C 85 | ..L.6..68...;... |
| 53C0 | 46 52 45 53 C8 E7 52 FC 0E 79 46 12 36 B4 0E A6 | FRES..R..yF.6... |
| 53D0 | 42 2A 0E DE 40 A0 41 12 36 B4 0E 9A 43 52 43 FD | B*..@.A.6...CRC. |
| 53E0 | 42 D0 08 21 00 12 36 B4 0E 66 08 18 E6 11 D0 08 | B..!..6..f...... |
| 53F0 | 10 00 6D 44 A8 0F 12 36 6F 0E 55 0C 19 37 6F 0E | ..mD...6o.U..7o. |
| 5400 | B1 08 C9 FF 55 0C 48 37 DB 0E BD 48 D2 44 FA 48 | ....U.H7...H.D.H |
| 5410 | D0 08 31 00 66 08 18 12 36 B4 0E 58 09 90 09 A6 | ..1.f...6..X.... |
| 5420 | 42 D0 08 12 00 DE 40 90 09 9A 43 52 43 FD 42 2A | B.....@...CRC.B* |
| 5430 | 0E B1 08 0A 00 A6 0C 4B 0C 48 37 DB 0E E0 3C F1 | .......K.H7...<. |
| 5440 | 08 DC FF 48 37 B4 0E D0 08 0F 00 4A 36 9F 0E F3 | ...H7......J6... |
| 5450 | 35 66 08 60 71 0D C3 0E 85 0C 87 52 45 46 52 45 | 5f.`q......REFRE |
| 5460 | 53 C8 BF 53 FC 0E C5 3B C7 53 F8 45 B4 4C 85 0C | S..S...;.S.E.L.. |
| 5470 | 87 3F 53 48 52 49 4E CB 5A 54 FC 0E 8F 0F 07 36 | .?SHRIN.ZT.....6 |
| 5480 | 9F 0E FD 35 9F 0E 89 0D A2 11 D0 08 18 00 07 36 | ...5...........6 |
| 5490 | 9F 0E 37 0D 4E 0E FD 35 C3 0E 07 36 9F 0E 7E 50 | ..7.N..5...6..~P |
| 54A0 | B1 08 12 00 07 36 9F 0E 37 0D 4E 0E FD 35 C3 0E | .....6..7.N..5.. |
| 54B0 | 8B 36 C3 0E 85 0C 82 3F C5 70 54 BD 54 CA CA A0 | .6.....?.pT.T... |
| 54C0 | 00 94 01 AD 55 69 49 01 29 01 95 00 4C 46 08 86 | ....UiI.)...LF.. |
| 54D0 | 45 58 50 41 4E C4 B6 54 FC 0E 66 08 05 6E 37 DB | EXPAN..T..f..n7. |
| 54E0 | 0E 80 36 9F 0E 07 36 9F 0E 89 0D D0 08 2E 00 80 | ..6...6......... |
| 54F0 | 36 9F 0E 07 36 9F 0E A2 11 D0 08 0E 00 8B 36 9F | 6...6.........6. |
| 5500 | 0E 07 36 9F 0E B1 08 0C 00 07 36 9F 0E 37 0D 80 | ..6.......6..7.. |
| 5510 | 36 9F 0E 05 4F 45 50 B1 08 36 00 36 38 9F 0E 07 | 6...OEP..6.68... |
| 5520 | 36 9F 0E 89 0D D0 08 28 00 36 38 9F 0E 32 36 9F | 6......(.68..26. |
| 5530 | 0E A2 11 D0 08 0E 00 36 38 9F 0E 07 36 9F 0E B1 | .......68...6... |
| 5540 | 08 0C 00 07 36 9F 0E 37 0D 36 38 9F 0E 7E 50 85 | ....6..7.68..~P. |
| 5550 | 0C 83 4C 58 D8 CF 54 FC 0E 80 36 9F 0E 07 36 9F | ..LX..T...6...6. |
| 5560 | 0E 14 0D A2 11 D0 08 24 00 27 36 9F 0E 07 36 9F | .......$.'6...6. |
| 5570 | 0E AE 36 B4 0E 89 0D 14 0D 80 36 9F 0E 37 0D 3F | ..6.......6..7.? |
| 5580 | 3C 1A 40 6C 3D D0 08 04 00 85 0C 32 36 9F 0E 80 | <.@l=......26... |
| 5590 | 36 9F 0E 28 3C 3C 36 9F 0E 54 3F 85 0C 83 52 58 | 6..(<<6..T?...RX |
| 55A0 | D8 51 55 FC 0E 07 36 9F 0E 80 36 9F 0E 14 0D A2 | .QU...6...6..... |
| 55B0 | 11 D0 08 1A 00 32 36 9F 0E 80 36 9F 0E 28 3C 3C | .....26...6..(<< |
| 55C0 | 36 9F 0E 54 3F 6C 3D D0 08 04 00 85 0C 27 36 9F | 6..T?l=......'6. |
| 55D0 | 0E 07 36 9F 0E AE 36 B4 0E 89 0D 80 36 9F 0E 37 | ..6...6.....6..7 |
| 55E0 | 0D 3F 3C 1A 40 85 0C 83 52 45 D0 9D 55 FC 0E 6E | .?<.@...RE..U..n |
| 55F0 | 37 B4 0E 55 0C E6 11 D0 08 08 00 57 55 B1 08 04 | 7..U.......WU... |

| Address | Hexadecimal | ASCII |
|---|---|---|
| 5600 | 00 A3 55 6C 3D E5 0C D0 08 08 00 07 36 9F 0E 37 | ..Ul=.......6..7 |
| 5610 | 0D 4E 0E 14 0D 7E 50 85 0C 88 54 4F 2D 46 4F 52 | .N...~P...TO-FOR |
| 5620 | 54 C8 E7 55 FC 0E 4B 0C 2C 08 0C C0 DB 0E 4B 0C | T..U..K.,.....K. |
| 5630 | 2C 08 0E C0 DB 0E A3 19 85 0C 86 4C 45 58 52 45 | ,..........LEXRE |
| 5640 | D8 19 56 FC 0E 55 0C 31 37 DB 0E 55 0C 6E 37 DB | ..V..U.17..U.n7. |
| 5650 | 0E 07 36 9F 0E 7F 47 3C 37 9F 0F 71 0D 9F 0E DC | ..6...G<7..q.... |
| 5660 | 37 C3 0E FD 35 9F 0E 7F 47 3C 37 9F 0F 71 0D 9F | 7...5...G<7..q.. |
| 5670 | 0E E5 37 C3 0E 3D 49 E0 3C E1 3B D0 08 36 00 82 | ..7..=I.<.;..6.. |
| 5680 | 48 D0 08 08 00 C5 3B 8F 52 F8 45 D7 49 D0 08 08 | H.....;.R.E.I... |
| 5690 | 00 C5 3B 5D 52 F8 45 AA 49 D0 08 08 00 C5 3B ED | ..;JR.E.I.....;. |
| 56A0 | 55 F8 45 BB 54 D0 08 08 00 C5 3B D8 54 F8 45 B1 | U.E.T.....;.T.E. |
| 56B0 | 08 C4 FF 80 36 9F 0E 07 36 9F 0E 89 0D D0 08 26 | ....6...6......& |
| 56C0 | 00 80 36 9F 0E 07 36 9F 0E A2 11 D0 08 0A 00 32 | ..6...6........2 |
| 56D0 | 36 9F 0E B1 08 08 00 07 36 9F 0E 37 0D 36 38 C3 | 6.......6..7.68. |
| 56E0 | 0E B1 08 18 00 8B 36 9F 0E FD 35 9F 0E 89 0D D0 | ......6...5..... |
| 56F0 | 08 0A 00 07 36 9F 0E 36 38 C3 0E A5 50 4B 0C 1D | ....6..68...PK.. |
| 5700 | 36 DB 0E 4B 0C 2C 08 10 C0 DB 0E EE 36 B4 0E F9 | 6..K.,......6... |
| 5710 | 36 DB 0E 85 0C 88 45 4E 44 50 41 53 54 C5 3A 56 | 6.....ENDPAST.:V |
| 5720 | FC 0E EE 4A 07 36 9F 0E 7F 47 3C 37 9F 0F 71 0D | ...J.6...G<7..q. |
| 5730 | 9F 0E DC 37 C3 0E 38 4E 4B 0C 1D 36 DB 0E 64 54 | ...7..8NK..6..dT |
| 5740 | 85 0C 87 3C 50 41 53 54 45 BE 15 57 FC 0E C1 0C | ...<PASTE..W.... |
| 5750 | 07 36 9F 0E 90 09 E9 0A D3 0C 4E 0E 07 36 6F 0E | .6........N..6o. |
| 5760 | 80 36 6F 0E 20 57 85 0C 84 47 45 54 D3 42 57 FC | .6o. W...GET.BW. |
| 5770 | 0E 3C 11 66 08 1E 55 0C A1 20 07 36 DC 35 89 0D | .<.f..U.. .6.5.. |
| 5780 | 3C 11 71 0D 9F 0E FD 35 DC 35 89 0D 3C 11 71 0D | <.q....5.5..<.q. |
| 5790 | 9F 0E 4E 0E DC 35 89 0D F0 37 C3 0E 89 0D F9 37 | ..N..5...7.....7 |
| 57A0 | C3 0E F9 37 9F 0E E5 0C D0 08 04 00 85 0C F9 37 | ...7...........7 |
| 57B0 | 9F 0E 2C 08 00 05 71 0D 32 36 9F 0E 07 36 9F 0E | ..,...q.26...6.. |
| 57C0 | 89 0D A2 11 E5 0C D0 08 06 00 5C 3C 85 0C 07 36 | ..........\<...6 |
| 57D0 | 9F 0E 4E 0E FD 35 C3 0E 8B 36 C3 0E 3C 11 F0 37 | ..N..5...6..<..7 |
| 57E0 | 9F 0E 2C 08 00 04 56 1B 66 08 1E 71 0D 55 0C A1 | ..,...V.f..q.U.. |
| 57F0 | 20 3C 11 F0 37 9F 0E 2C 08 FF 03 FD 0B 71 0D 07 |  <..7..,.....q.. |
| 5800 | 36 9F 0E 2C 08 00 04 E9 0A 2C 08 00 04 F0 37 9F | 6..,.....,....7. |
| 5810 | 0E 2C 08 FF 03 FD 0B 89 0D F9 37 9F 0E 14 0D A2 | .,........7..... |
| 5820 | 11 D0 08 61 00 07 36 9F 0E 2C 08 00 04 F0 37 9F | ...a..6..,....7. |
| 5830 | 0E 2C 08 FF 03 FD 0B 89 0D 71 0D F0 37 9F 0E 2C | .,.......q..7..,|
| 5840 | 08 00 04 56 1B 66 08 1F 71 0D F9 37 9F 0E 2C 08 | ...V.f..q..7..,. |
| 5850 | 00 04 F0 37 9F 0E 2C 08 FF 03 FD 0B 89 0D 89 0D | ...7..,......... |
| 5860 | 2C 08 00 04 56 1B 14 0D F8 0D 71 0D 33 0E 58 09 | ,...V.....q.3.X. |
| 5870 | 4E 0E 90 09 55 0C A1 20 2C 08 00 04 71 0D F1 08 | N...U.. ,...q... |
| 5880 | F0 FF 2A 0E F9 37 9F 0E 4E 0E 07 36 6F 0E 80 36 | ..*..7..N..6o..6 |
| 5890 | 6F 0E EE 4A 07 36 9F 0E 7F 47 3C 37 9F 0F 71 0D | o..J.6...G<7..q. |
| 58A0 | 9F 0E DC 37 C3 0E 38 4E 4B 0C 1D 36 DB 0E 64 54 | ...7..8NK..6..dT |
| 58B0 | 07 36 9F 0E 36 38 C3 0E 85 0C 87 3C 45 4E 54 45 | .6..68.....<ENTE |
| 58C0 | 52 BE 68 57 FC 0E 07 36 9F 0E 2C 08 00 01 71 0D | R.hW...6..,...q. |
| 58D0 | 32 36 9F 0E A2 11 D0 08 1C 00 07 36 9F 0E DB 0E | 26........6..... |
| 58E0 | 55 0C 07 36 6F 0E 55 0C 80 36 6F 0E 7A 54 C7 53 | U..6o.U..6o.zT.S |
| 58F0 | B1 08 06 00 2A 0E 5C 3C 85 0C 85 45 4E 54 45 D2 | ....*.\<...ENTE. |

| Address | Hexadecimal | ASCII |
|---|---|---|
| 5900 | BA 58 FC 0E C5 3B C4 58 F8 45 B4 4C 85 0C 83 47 | .X...;.X.E.L...G |
| 5910 | 45 D4 FA 58 FC 0E 66 08 1E E6 35 DC 35 58 09 90 | E..X..f...5.5X.. |
| 5920 | 09 F8 0D 55 0C A1 20 14 0D 2C 08 00 04 21 09 F0 | ...U.. ..,...!.. |
| 5930 | FF 2A 0E 07 36 9F 0E 80 36 C3 0E FD 35 9F 0E 8B | .*..6...6...5... |
| 5940 | 36 C3 0E F3 35 9F 0F 71 0D 66 08 5C A4 15 4B 0C | 6...5..q.f.\..K. |
| 5950 | 1D 36 DB 0E 64 54 85 0C 83 43 55 D4 0E 59 FC 0E | .6..dT...CU..Y.. |
| 5960 | 07 36 9F 0E 4E 0E FD 35 9F 0E 89 0D 71 0D 2C 08 | .6..N..5....q.,. |
| 5970 | 00 01 71 0D 32 36 9F 0E A2 11 D0 08 8E 00 27 36 | ..q.26........'6 |
| 5980 | 9F 0E 91 37 9F 0E 5C 4A 71 0D B0 25 89 0D C1 0C | ...7..\Jq..%.... |
| 5990 | 07 36 9F 0E 27 36 9F 0E 89 0D 90 09 02 0D D0 08 | .6..'6.......... |
| 59A0 | 08 00 A1 30 B1 08 04 00 E9 0A D3 0C 52 2A 7C 4A | ...0........R*|J |
| 59B0 | FD 35 9F 0E 91 37 9F 0E 5C 4A E9 0A 91 37 9F 0E | .5...7..\J...7.. |
| 59C0 | 5C 4A 71 0D 9B 37 C3 0E 27 36 9F 0E FD 35 9F 0E | \Jq..7..'6...5.. |
| 59D0 | A2 11 D0 08 0E 00 A8 0F FD 35 6F 0E A8 0F 8B 36 | .........5o....6 |
| 59E0 | 6F 0E FD 35 9F 0E 14 0D 4E 0E 07 36 C3 0E 80 36 | o..5....N..6...6 |
| 59F0 | C3 0E EE 4A E5 37 9F 0E DC 37 C3 0E 38 4E 4B 0C | ...J.7...7..8NK. |
| 5A00 | 1D 36 DB 0E 64 54 B1 08 73 00 91 37 9F 0E 27 36 | .6..dT..s..7..'6 |
| 5A10 | 9F 0E 91 37 9F 0E 89 0D FD 35 9F 0E 27 36 9F 0E | ...7.....5..'6.. |
| 5A20 | 89 0D 5C 4A 93 3E 5C 4A 91 37 9F 0E 71 0D 27 36 | ..\J.>\J.7..q.'6 |
| 5A30 | 9F 0E 89 0D 7C 4A FD 35 9F 0E 27 36 9F 0E E6 11 | ....|J.5..'6.... |
| 5A40 | D0 08 11 00 66 08 0C FD 35 9F 0E DB 0E 55 0C FD | ....f...5....U.. |
| 5A50 | 35 6F 0E FD 35 9F 0E 4E 0E 07 36 C3 0E 80 36 C3 | 5o..5..N..6...6. |
| 5A60 | 0E 07 36 9F 0E 37 0D 4E 0E FD 35 C3 0E 8B 36 C3 | ..6..7.N..5...6. |
| 5A70 | 0E 27 36 9F 0E 9B 37 C3 0E 20 57 07 36 9F 0E 36 | .'6...7.. W.6..6 |
| 5A80 | 38 C3 0E 85 0C 86 44 45 4C 45 54 C5 58 59 FC 0E | 8.....DELET.XY.. |
| 5A90 | 27 36 9F 0E 14 0D 07 36 9F 0E E6 11 D0 08 04 00 | '6.....6........ |
| 5AA0 | 85 0C 07 36 9F 0E 36 38 9F 0E 14 0D A2 11 36 38 | ...6..68......68 |
| 5AB0 | 9F 0E 32 36 9F 0E A2 11 FD 0B D0 08 08 00 A8 0F | ..26............ |
| 5AC0 | 36 38 6F 0E FD 35 9F 0E 14 0D 07 36 9F 0E E6 11 | 68o..5.....6.... |
| 5AD0 | D0 08 4B 00 A8 0F 4E 0E 07 36 6F 0E 80 36 6F 0E | ..K...N..6o..6o. |
| 5AE0 | A8 0F 4E 0E FD 35 6F 0E 8B 36 6F 0E 07 36 9F 0E | ..N..5o..6o..6.. |
| 5AF0 | F3 35 9F 0E E6 11 D0 08 1F 00 19 37 9F 0E 66 08 | .5.........7..f. |
| 5B00 | 0C 89 0D 4B 0C E9 1A 4E 0E 19 37 C3 0E 1C 48 3C | ...K...N..7...H< |
| 5B10 | 37 F3 35 9F 0F E9 0A 64 54 B1 08 04 00 5E 59 85 | 7.5....dT....^Y. |
| 5B20 | 0C 83 54 41 C2 85 5A FC 0E 32 36 9F 0E 92 45 62 | ..TA..Z..26...Eb |
| 5B30 | 37 B4 0E 66 08 4B A2 11 D0 08 3B 00 66 08 05 62 | 7..f.K....;.f..b |
| 5B40 | 37 B4 0E 66 08 05 A7 1B 89 0D 07 36 9F 0E F8 0D | 7..f.......6.... |
| 5B50 | 66 08 20 10 0B 4E 0E 07 36 6F 0E 80 36 6F 0E 07 | f. ..N..6o..6o.. |
| 5B60 | 36 9F 0E 37 0D 4E 0E FD 35 C3 0E 8B 36 C3 0E 64 | 6..7.N..5...6..d |
| 5B70 | 54 B1 08 07 00 66 08 0D 02 59 85 0C 85 50 41 53 | T....f...Y...PAS |
| 5B80 | 54 C5 21 5B FC 0E 07 36 9F 0E 9B 37 9F 0E 91 37 | T.![...6...7...7 |
| 5B90 | 9F 0E 89 0D 71 0D 2C 08 00 01 71 0D 32 36 9F 0E | ....q.,...q.26.. |
| 5BA0 | A2 11 D0 08 34 00 9B 37 9F 0E 91 37 9F 0E E6 11 | ....4..7...7.... |
| 5BB0 | D0 08 04 00 85 0C 07 36 9F 0E 4E 0E FD 35 C3 0E | .......6..N..5.. |
| 5BC0 | 8B 36 C3 0E 91 37 9F 0E 9B 37 9F 0E 91 37 9F 0E | .6...7...7...7.. |
| 5BD0 | 89 0D 4C 57 B1 08 60 00 91 37 9F 0E 27 36 9F 0E | ..LW..`..7..'6.. |
| 5BE0 | 91 37 9F 0E 89 0D 07 36 9F 0E 27 36 9F 0E 89 0D | .7.....6..'6.... |
| 5BF0 | 67 3E 9B 37 9F 0E 91 37 9F 0E 89 0D C1 0C 91 37 | g>.7...7.......7 |

| Address | Hexadecimal | ASCII |
|---|---|---|
| 5C00 | 9F 0E 27 36 9F 0E 89 0D 7C 4A 07 36 9F 0E 4E 0E | ..'6....|J.6..N. |
| 5C10 | FD 35 C3 0E 8B 36 C3 0E 07 36 9F 0E D3 0C 71 0D | .5...6...6....q. |
| 5C20 | 4E 0E 07 36 C3 0E 80 36 C3 0E 91 37 9F 0E 9B 37 | N..6...6...7...7 |
| 5C30 | C3 0E 20 57 5C 3C 07 36 9F 0E 36 38 C3 0E 85 0C | .. W\<.6..68.... |
| 5C40 | 81 D6 7C 5B FC 0E 2C 08 80 80 12 0C 4B 30 A8 38 | ..|[.,......K0.8 |
| 5C50 | 66 08 6B 71 0D 9F 0E A8 38 66 08 69 71 0D 9F 0E | f.kq....8f.iq... |
| 5C60 | 58 09 4E 0E 90 09 9F 0E E6 11 D0 08 12 00 2A 0E | X.N...........*. |
| 5C70 | 90 09 24 0D D3 0C 2A 0E D3 0C 2A 0E 7F 3C 66 08 | ..$...*...*..<(f. |
| 5C80 | 07 21 09 DF FF 2A 0E 4B 0C 85 0C 82 56 A1 40 5C | .!...*.K....V.@\ |
| 5C90 | FC 0E 44 5C 6C 3D D0 08 0E 00 33 0E 4B 30 33 0E | ..D\l=....3.K03. |
| 5CA0 | C3 0E B1 08 04 00 2A 0E 85 0C 82 56 C0 8B 5C FC | ......*....V..\. |
| 5CB0 | 0E 44 5C 9F 0E 4B 30 85 0C 87 53 45 54 52 4F 4F | .D\..K0...SETROO |
| 5CC0 | CD AA 5C FC 0E 32 36 9F 0E 07 36 9F 0E 89 0D 2C | ..\..26...6....., |
| 5CD0 | 08 00 01 89 0D 2C 08 4F 52 90 5C 85 0C 87 53 45 | .....,.OR.\...SE |
| 5CE0 | 54 56 41 52 D3 B9 5C FC 0E 2B 38 B4 0E 2C 08 52 | TVAR..\..+8..,.R |
| 5CF0 | 50 90 5C 85 0C 8C 43 48 45 43 4B 43 48 41 4E 47 | P.\...CHECKCHANG |
| 5D00 | 45 D3 DD 5C FC 0E 2C 08 52 50 AF 5C 66 08 FF E6 | E..\..,.RP.\f... |
| 5D10 | 11 E5 0C D0 08 20 00 2C 08 52 50 AF 5C 2B 38 B4 | ..... .,.RP.\+8. |
| 5D20 | 0E E6 11 E5 0C D0 08 0E 00 2C 08 52 50 AF 5C 2B | .........,.RP.\+ |
| 5D30 | 38 DB 0E 27 50 85 0C 87 43 4C 45 41 4E 55 D0 F5 | 8..'P...CLEANU.. |
| 5D40 | 5C FC 0E 2C 08 00 03 2C 08 00 02 58 09 90 09 B4 | \..,...,...X.... |
| 5D50 | 0E 6C 3D D0 08 16 00 66 08 20 C3 11 D0 08 09 00 | .l=....f. ...... |
| 5D60 | 66 08 20 90 09 DB 0E B1 08 04 00 A6 0C F1 08 DE | f. ............. |
| 5D70 | FF 85 0C 88 56 41 4C 49 44 41 54 C5 37 5D FC 0E | ....VALIDAT.7].. |
| 5D80 | 2C 08 4F 52 44 5C D0 08 1A 00 2C 08 41 4D 44 5C | ,.ORD\....,.AMD\ |
| 5D90 | D0 08 10 00 2C 08 52 50 44 5C D0 08 06 00 55 0C | ....,.RPD\....U. |
| 5DA0 | 7F 3C CC 38 2C 08 03 01 71 0D A8 38 66 08 69 71 | .<.8,...q..8f.iq |
| 5DB0 | 0D 9F 0E 66 08 18 E9 0A A8 38 66 08 69 71 0D 9F | ...f.....8f.iq.. |
| 5DC0 | 0E 66 08 15 71 0D 4E 0E A8 38 66 08 6B 71 0D C3 | .f..q.N..8f.kq.. |
| 5DD0 | 0E A8 38 66 08 6D 71 0D C3 0E 4B 0C 85 0C 85 42 | ..8f.mq...K....B |
| 5DE0 | 41 53 49 C3 73 5D FC 0E 91 37 9F 0E 2C 08 00 02 | ASI.s]...7..,... |
| 5DF0 | 5C 4A 66 08 50 3F 3C 4B 0C F8 0D 2C 08 00 02 71 | \Jf.P?<K...,...q |
| 5E00 | 0D C3 0E 5E 59 E9 0A 41 5D 7E 5D 2A 0E 66 08 4C | ...^Y..A]~]*.f.L |
| 5E10 | 2C 08 3C D4 DB 0E 2C 08 8F 3A 2C 08 3D D4 C3 0E | ,.<...,..:,.=... |
| 5E20 | 66 08 4C 2C 08 F0 FD DB 0E 2C 08 CF 3A 2C 08 F1 | f.L,.....,..:,.. |
| 5E30 | FD C3 0E 66 08 FF 04 38 DB 0E 4B 0C 1D 38 DB 0E | ...f...8..K..8.. |
| 5E40 | 4B 0C A8 38 FE 39 71 0D DB 0E C3 5C E7 5C 3F 3A | K..8.9q....\.\?: |
| 5E50 | 04 38 B4 0E 66 08 7F C3 11 D0 08 4F 00 04 38 B4 | .8..f......O..8. |
| 5E60 | 0E 6C 3D D0 08 23 00 07 36 9F 0E F8 0D 66 08 20 | .l=..#..6....f. |
| 5E70 | 10 0B 4E 0E 4E 0E 4E 0E 07 36 6F 0E 80 36 6F 0E | ..N.N.N..6o..6o. |
| 5E80 | FD 35 6F 0E 8B 36 6F 0E 12 38 B4 0E 66 08 07 E6 | .5o..6o..8..f... |
| 5E90 | 11 D0 08 08 00 5C 3C B1 08 0D 00 12 38 B4 0E 66 | .....\<.....8..f |
| 5EA0 | 08 0D E9 1A C4 58 B1 08 A6 FF 7E 5D 64 54 D0 08 | .....X....~]dT.. |
| 5EB0 | 04 00 04 5D 2C 08 C9 A0 2C 08 F0 FD C3 0E 66 08 | ...],...,.....f. |
| 5EC0 | 90 2C 08 F2 FD DB 0E 85 0C 86 4C 54 41 42 4C C5 | .,........LTABL. |
| 5ED0 | DE 5D 57 0F 79 3D 8E 5A B7 4D 79 3D C6 52 6F 57 | .]W.y=.Z.My=.RoW |
| 5EE0 | 24 56 84 5B E6 5D 79 3D 79 3D 27 5B 02 59 86 4C | $V.[.]y=y='[.Y.L |
| 5EF0 | 4F 4F 4B 55 D0 C9 5E F9 5E B5 00 C9 0C 90 04 CA | OOKU..^.^....... |

| Address | Hexadecimal | ASCII |
|---|---|---|
| 5F00 | CA A9 0C 0A A8 B9 D4 5E 95 00 B9 D5 5E 95 01 A0 | ........`.....`... |
| 5F10 | 00 4C 8C 08 84 4D 41 49 CE EE 5E FC 0E 55 0C 2C | .L...MAI..`..U., |
| 5F20 | 08 0F C0 DB 0E 55 0C 2C 08 0D C0 DB 0E 3D 49 D0 | .....U.,.....=I. |
| 5F30 | 08 0A 00 43 56 64 54 B1 08 0C 00 57 3D D0 08 06 | ...CVdT....W=... |
| 5F40 | 00 15 3D F7 5E E1 3B B1 08 E4 FF 85 0C 85 52 45 | ..=.`.;.......RE |
| 5F50 | 55 53 C5 14 5F FC 0E 2C 08 8D C0 B4 0E 2A 0E 2C | US.._..,.....*., |
| 5F60 | 08 00 D0 2C 08 00 D0 2C 08 00 30 E9 0A 2C 08 8F | ...,...,..0..,.. |
| 5F70 | C0 B4 0E 2A 0E 2C 08 8F C0 B4 0E 2A 0E 85 0C 82 | ...*.,.....*.... |
| 5F80 | 52 C5 4D 5F FC 0E 66 08 0D 3C 36 9F 0E DB 0E 71 | R.M_..f..<6....q |
| 5F90 | 0C F3 35 9F 0F 71 0D 66 08 5C A4 15 4B 0C 1D 36 | ..5..q.f.\..K..6 |
| 5FA0 | DB 0E 55 0C 2C 08 0F C0 DB 0E 55 0C 2C 08 0D C0 | ..U.,.....U.,... |
| 5FB0 | DB 0E 55 5F 64 54 1B 5F 85 0C 84 4D 53 47 B0 7F | ..U_dT._...MSG.▪ |
| 5FC0 | 5F FC 0E 89 14 3C 20 20 45 44 44 45 20 56 45 52 | _....<  EDDE VER |
| 5FD0 | 53 49 4F 4E 20 36 2E 33 2E 20 20 50 52 4F 50 52 | SION 6.3.  PROPR |
| 5FE0 | 49 45 54 41 52 59 20 54 52 41 44 45 20 53 45 43 | IETARY TRADE SEC |
| 5FF0 | 52 45 54 20 20 20 20 20 20 20 20 20 20 20 20 20 | RET              |
| 6000 | 20 6F 85 0C 84 4D 53 47 B1 BA 5F FC 0E 89 14 3C |  o...MSG.._....< |
| 6010 | 43 6F 70 79 72 69 67 68 74 20 28 63 29 20 31 39 | Copyright (c) 19 |
| 6020 | 38 34 20 62 79 20 49 6E 66 6F 72 6D 61 74 69 6F | 84 by Informatio |
| 6030 | 6E 20 41 70 70 6C 69 61 6E 63 65 20 49 6E 63 2E | n Appliance Inc. |
| 6040 | 20 20 20 20 20 20 20 20 20 20 7C 85 0C 84 4D |           |...M |
| 6050 | 53 47 B2 04 60 FC 0E 89 14 3F 20 20 20 20 20 54 | SG..`....?     T |
| 6060 | 68 69 73 20 70 72 6F 67 72 61 6D 20 69 73 20 61 | his program is a |
| 6070 | 6E 20 75 6E 70 75 62 6C 69 73 68 65 64 20 77 6F | n unpublished wo |
| 6080 | 72 6B 2E 20 20 20 20 20 20 20 20 20 20 20 20 20 | rk.              |
| 6090 | 20 20 20 20 20 20 20 74 6D 85 0C 84 4D 53 47 B3 |        tm...MSG. |
| 60A0 | 4E 60 FC 0E 89 14 1F 20 20 20 20 20 20 20 20 20 | N`......         |
| 60B0 | 20 20 20 41 4C 4C 20 52 49 47 48 54 53 20 52 45 |    ALL RIGHTS RE |
| 60C0 | 53 45 52 56 45 44 85 0C 84 4D 45 53 D3 9B 60 FC | SERVED...MES..`. |
| 60D0 | 0E A3 36 A2 3D 66 08 A0 10 0B 97 0F 71 0D A3 36 | ..6.=f......q..6 |
| 60E0 | F8 0D 37 0D B4 0E 4B 0C 58 09 F8 0D 90 09 71 0D | ..7...K.X.....q. |
| 60F0 | B4 0E 66 08 80 28 0C F8 0D 90 09 71 0D DB 0E F1 | ..f..(.....q.... |
| 6100 | 08 E9 FF 2A 0E 2A 0E 9A 43 85 0C 86 53 49 47 4E | ...*.*..C...SIGN |
| 6110 | 4F CE C8 60 FC 0E 4B 0C 2C 08 C3 5F CF 60 55 0C | O..`..K.,.._.`U. |
| 6120 | 2C 08 0D 60 CF 60 8F 0F 2C 08 57 60 CF 60 97 0F | ,..`.`..,.W`.`.. |
| 6130 | 2C 08 A4 60 CF 60 85 0C 82 47 CF 0B 61 FC 0E 55 | ,..`.`...G..a..U |
| 6140 | 5F EE 52 14 61 2C 08 00 C0 B4 0E 66 08 7F 1A 12 | _.R.a,.....f.▪.. |
| 6150 | D0 08 F3 FF 1B 5F 85 0C 84 52 45 44 CF 38 61 FC | ....._...RED.8a. |
| 6160 | 0E F3 35 66 08 60 A4 15 27 36 9F 0E F3 35 C3 0E | ..5f.`..'6...5.. |
| 6170 | 4B 0C 19 37 C3 0E 9C 38 2C 08 00 01 A4 15 84 5F | K..7...8,......_ |
| 6180 | 85 0C 87 52 45 50 4C 41 43 C5 58 61 FC 0E 61 0C | ...REPLAC.Xa..a. |
| 6190 | 4A 1C AA 13 6D 19 83 19 55 5F EE 52 55 0C 2C 08 | J...m...U_.RU.,. |
| 61A0 | 0F C0 DB 0E 55 0C 2C 08 0D C0 DB 0E 2C 08 05 08 | ....U.,.....,... |
| 61B0 | 2C 08 F2 03 C3 0E 66 08 AD 2C 08 F4 03 DB 0E BF | ,.....f..,...... |
| 61C0 | 3E 14 61 14 59 1B 5F 85 0C 84 57 41 52 CD 82 61 | >.a.Y._...WAR..a |
| 61D0 | FC 0E 6D 19 83 19 62 13 84 5F 85 0C 20 20 20 20 | ..m...b.._..     |

I claim:

1. Apparatus for designating a desired region of the contents of a computer storage apparatus comprising:
   a processing unit coupled to the storage apparatus;
   a display connected to the processing unit;
   a keyboard connected to the processing unit to control the processing unit and the display; and
   first and second switchable designation means coupled to the processing unit for causing the processing unit to search the storage apparatus for a pattern entered into the keyboard while at least one of the first and second switchable designation means is activated, wherein the first designation means causes the processing unit to search for the pattern in a first direction from a selected location on the display and the second designation means causes the processing unit to search in an opposite direction from said selected location.

2. Apparatus as in claim 1 wherein each of the first and second designation means comprise keys on the keyboard.

3. Apparatus as in claim 2 wherein the keys comprise momentary contact push buttons.

4. Apparatus as in claim 3 wherein the first and second designation keys are disposed adjacent a space bar key.

5. Apparatus as in claim 1 wherein the display includes a cursor at a position.

6. Apparatus as in claim 5 wherein the first designation means causes the cursor position to change from a first cursor position to the first occurrence of the pattern to the left of the first cursor position.

7. Apparatus as in claim 6 wherein the second designation means causes the cursor position to change from the first cursor position to the first occurrence of the pattern to the right of the first cursor position.

8. Apparatus as in claim 7 wherein the second designation means causes all of the region on the display between the first cursor position and the first occurrence of the pattern to the right of the first cursor position to be designated.

9. Apparatus as in claim 1 wherein the region on the display comprises a region of text displayed on the display.

10. Apparatus for directing a search to designate a desired segment of alphanumeric material stored in a computer storage apparatus comprising:
    a data processing unit coupled to the storage apparatus;
    a display connected to the processing unit;
    a keyboard connected to the processing unit to control the display;
    first and second switchable designation means coupled to the processing unit for causing the processing unit to search the storage apparatus for a pattern entered into the keyboard, which pattern corresponds to an end of the desired segment while at least one of the first and second switchable designation means is activated, wherein the first designation means causes the processing unit to search for the pattern in a first direction from a present cursor position on the display and the second designation means causes the processing unit to search in an opposite direction.

11. Apparatus as in claim 10 wherein each of the first and second switchable designation means comprises a momentary contact push button key on the keyboard.

* * * * *